(12) United States Patent
Takahashi et al.

(10) Patent No.: US 11,336,780 B2
(45) Date of Patent: May 17, 2022

(54) INFORMATION PROCESSING SYSTEM, INFORMATION PROCESSING APPARATUS, AND INFORMATION PROCESSING METHOD

(71) Applicant: CANON KABUSHIKI KAISHA, Tokyo (JP)

(72) Inventors: Toru Takahashi, Matsudo (JP); Takeshi Matsumura, Abiko (JP); Yuji Naya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/922,910

(22) Filed: Jul. 7, 2020

(65) Prior Publication Data
US 2021/0021723 A1   Jan. 21, 2021

(30) Foreign Application Priority Data
Jul. 16, 2019 (JP) .............................. JP2019-131058

(51) Int. Cl.
*H04N 1/00* (2006.01)
*G10L 15/26* (2006.01)

(52) U.S. Cl.
CPC ......... *H04N 1/00403* (2013.01); *G10L 15/26* (2013.01); *H04N 1/00482* (2013.01); *H04N 2201/0094* (2013.01)

(58) Field of Classification Search
USPC ............. 345/676–689, 9; 358/1.1–3.29, 358/1.11–1.18; 704/1–277; 715/200–207, 273, 705, 715, 726–729, 715/747, 752, 759–767, 783, 796–809
See application file for complete search history.

(56) References Cited

U.S. PATENT DOCUMENTS

| 11,003,418 | B2 * | 5/2021 | Kawamura | G06F 3/167 |
| 2006/0181750 | A1 * | 8/2006 | Lu | H04N 1/00466 358/527 |
| 2011/0223893 | A1 * | 9/2011 | Lau | H04M 3/42382 455/414.1 |
| 2016/0034253 | A1 * | 2/2016 | Bang | G06F 9/5055 715/728 |
| 2019/0068811 | A1 * | 2/2019 | Totsuka | H04N 1/00472 |

(Continued)

FOREIGN PATENT DOCUMENTS

| JP | 2008-197855 A | 8/2008 |
| JP | 2010-049432 A | 3/2010 |

(Continued)

*Primary Examiner* — Marcellus J Augustin
(74) *Attorney, Agent, or Firm* — Canon U.S.A., Inc. IP Division

(57) ABSTRACT

An information processing system includes a microphone configured to acquire sound, a display device configured to display information, and at least one controller. The at least one controller is configured to cause the display device to display a first screen at least including one setting item with a set value that can be changed by an instruction, cause the display device to display a second screen including a selection object for transition to the first screen, and acquire text data based on speech acquired through the microphone during display of the second screen and change the set value of the one setting item on the basis of the text data without causing the display device to display the first screen.

15 Claims, 106 Drawing Sheets

(56) References Cited

U.S. PATENT DOCUMENTS

| | | | | |
|---|---|---|---|---|
| 2019/0260884 A1* | 8/2019 | Nakajima | .......... | H04N 1/00474 |
| 2019/0304453 A1* | 10/2019 | Nakamura | .............. | G10L 15/26 |
| 2020/0137011 A1* | 4/2020 | Guthery | .................. | H04L 51/04 |
| 2020/0312326 A1* | 10/2020 | Kudo | ...................... | G06F 3/167 |

FOREIGN PATENT DOCUMENTS

| | | |
|---|---|---|
| JP | 2019-67258 A | 4/2019 |
| JP | 2019-096978 A | 6/2019 |

\* cited by examiner

FIG. 7B

| GROUP ID | SPEECH RECOGNITION RESULT | |
|---|---|---|
| | KATAKANA | KANA/KANJI |
| OPR00000 | SOSA | 操作 (OPERATION) |
| OPR00001 | TATCHI | |
| | TAPPU | |
| | OSU | 押す (PRESS) |
| | OUKA | 押下 (PRESS) |
| | KURIKKU | |
| OPR00002 | RONGUTATCHI | |
| | RONGUTAPPU | |
| | NAGAOSHI | 長押し (HOLD DOWN) |
| OPR00003 | SUWAIPU | |
| OPR00004 | SURAIDO | |
| OPR00005 | SUKURORU | |
| OPR00010 | OKE | OK |
| | OKKE | |
| | KAKUTEI | 確定 (CONFIRM) |
| | KETTEI | 決定 (DETERMINE) |
| | KIMARI | 決まり (DECIDE) |
| OPR00011 | KAISHI | 開始 (START) |
| | SUTATO | |
| | HAJIME | 始め (BEGIN) |
| OPR00012 | SHURYO | 終了 (END) |
| | OWARI | 終わり (FINISH) |
| | KANRYO | 完了 (COMPLETE) |
| OPR00013 | KYANSERU | |
| | CHUSHI | 中止 (STOP) |
| OPR00014 | TEISHI | 停止 (PAUSE) |
| | POZU | |
| OPR00020 | TOJIRU | 閉じる (CLOSE) |
| | TOJITE | 閉じて (CLOSE) |
| | KUROZU | |
| ⋮ | | |
| OPR00040 | SENTAKU | 選択 (SELECT) |
| | SETTEI | 設定 (SET) |
| | SHITEI | 指定 (SPECIFY) |
| OPR00041 | HENKO | 変更 (CHANGE) |
| | HENSHU | 編集 (EDIT) |
| OPR00042 | HOSEI | 補正 (COMPENSATE) |
| | SHUSEI | 修正 (CORRECT) |
| | CHOSEI | 調整 (ADJUST) |
| OPR00043 | SAKUJO | 削除 (DELETE) |
| | KESHI | 消し (ERASE) |
| | KESU | 消す (ERASE) |
| | SHOKYO | 消去 (DELETE) |
| | JOKYO | 除去 (REMOVE) |
| | NAKUSU | なくす (ELIMINATE) |
| | NAKUSHITE | なくして (ELIMINATE) |
| | KATTO | |
| OPR00044 | KAIJO | 解除 (CLEAR) |
| | KURIA | |
| OPR00045 | RISETTO | |
| | YARINAOSHI | やり直し (RESET) |
| ⋮ | | |

| GROUP ID | SPEECH RECOGNITION RESULT | |
|---|---|---|
| | KATAKANA | KANA/KANJI |
| FNC00000 | KINO | 機能 (FUNCTION) |
| | FANKUSHON | |
| FNC00001 | KOPI | |
| | FUKUSYA | 複写 (COPY) |
| | FUKUSEI | 複製 (DUPLICATE) |
| FNC00002 | INSATSU | 印刷 (PRINT) |
| | PURINTO | |
| FNC00003 | SUKYAN | |
| | YOMITORI | 読み取り (READ) |
| | YOMIKOMI | 読み込み (SCAN) |
| FNC00004 | HOZON | 保存 (SAVE) |
| | HOKAN | 保管 (STORE) |
| | KAKUNO | 格納 (STORE) |
| | NOKOSU | 残す (LEAVE) |
| | HORUDO | |
| | KIROKU | 記録 (RECORD) |
| | KAKIKOMI | 書き込み (WRITE) |
| FNC00005 | SOSHIN | 送信 (TRANSMIT) |
| | SENDO | |
| FNC00006 | JUSHIN | 受信 (RECEIVE) |
| | RESHIBU | |
| FNC00007 | SUPURU | |
| | TAMATTE | 溜まって (SPOOL) |
| FNC00008 | SHOKAI | 紹介 (INTRODUCE) |
| | HERUPU | |
| | GAIDO | |
| | INTORO | |
| ⋮ | | |

| GROUP ID | SPEECH RECOGNITION RESULT | |
|---|---|---|
| | KATAKANA | KANA/KANJI |
| NUM00000 | ZERO | 0、零 (ZERO) |
| | REI | 0、零 (ZERO) |
| | ZEROBAN | 0番、零番 (ZEROTH) |
| | REIBAN | 0番、零番 (ZEROTH) |
| NUM00001 | ICHI | 1、一 (ONE) |
| | ICHIBAN | 1番、一番 (FIRST) |
| | HITOTSUME | 1つ目、一つ目 (FIRST) |
| NUM00002 | NI | 2、二 (TWO) |
| | NIBAN | 2番、二番 (SECOND) |
| | FUTATSUME | 2つ目、二つ目 (SECOND) |
| NUM00003 | SAN | 3、三 (THREE) |
| | SANBAN | 3番、三番 (THIRD) |
| | MITTSUME | 3つ目、三つ目 (THIRD) |
| NUM00004 | YON | 4、四 (FOUR) |
| | YONBAN | 4番、四番 (FOURTH) |
| | YOTTSUME | 4つ目、四つ目 (FOURTH) |
| ⋮ | | |
| NUM99999 | KYUMAN KYUSEN KYUHYAKU KYUJU KYU | 99999、九万九千九百九十九 (NINETY-NINE THOUSAND NINE HUNDRED AND NINETY-NINE) |
| | KYUMAN KYUSEN KYUHYAKU KYUJU KYUBAN | 99999番、九万九千九百九十九番 (NINETY-NINE THOUSAND NINE HUNDRED AND NINETY-NINTH) |

| GROUP ID | SPEECH RECOGNITION RESULT | |
|---|---|---|
| | KATAKANA | KANA/KANJI |
| PAP00000 | YOSHI | 用紙 (SHEET) |
| | KAMI | 紙 (PAPER) |
| | SHITO | |
| | PEPA | |
| PAP00001 | SAIZU | |
| | OKISA | 大きさ (SIZE) |
| PAP00002 | KEIRETSU | 系列 (SERIES) |
| | KEITO | 系統 (SYSTEM) |
| | KATEGORI | |
| | KATEGORII | |
| PAP00003 | ISAIZU | 異サイズ (DIFFERENT SIZE) |
| PAP00004 | DOHABA | 同幅 (SAME WIDTH) |
| PAP00005 | IHABA | 異幅 (DIFFERENT WIDTH) |
| PAP00100 | EISAN | A3 |
| | ESAN | A3 |
| PAP00101 | EIYON | A4 |
| | EYON | A4 |
| PAP00102 | EIGO | A5 |
| | EGO | A5 |
| PAP00103 | BIIYON | B4 |
| | BIYON | B4 |
| ⋮ | | |

| GROUP ID | SPEECH RECOGNITION RESULT | |
|---|---|---|
| | KATAKANA | KANA/KANJI |
| CHR00000 | E | A, a |
| | EI | A, a |
| CHR00001 | BI | B, b |
| CHR00002 | SHI | C, c |
| CHR00003 | DI | D, d |
| | DE | D, d |
| CHR00004 | I | E, e |
| CHR00005 | EFU | F, f |
| CHR00006 | JI | G, g |
| CHR00007 | EICHI | H, h |
| | ETCHI | H, h |
| CHR00008 | AI | I, i |
| ⋮ | | |
| CHR00025 | ZETTO | Z, z |
| | ZI | Z, z |

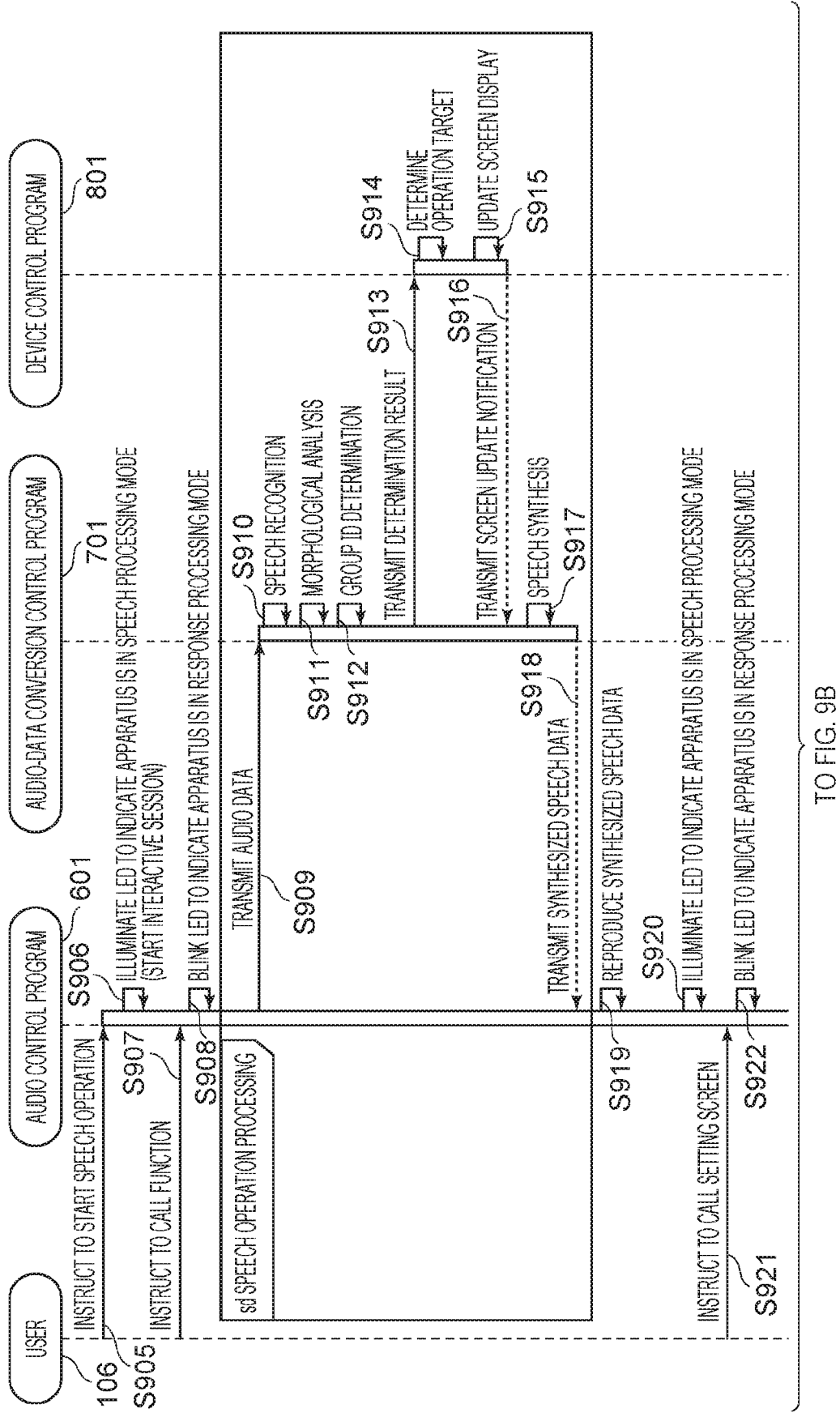

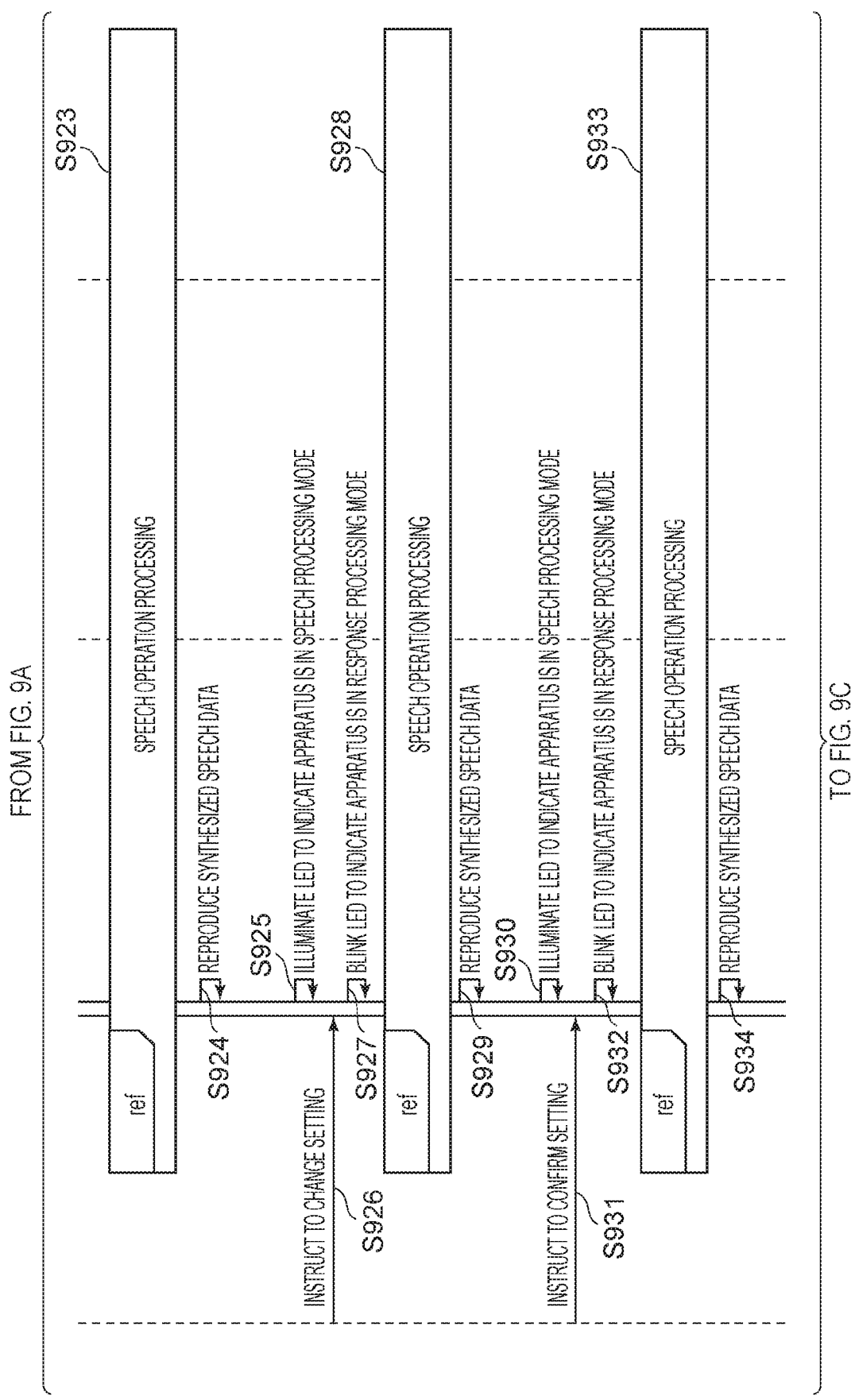

FIG. 10A

| GROUP ID | SPEECH RECOGNITION RESULT | |
| --- | --- | --- |
| | KATAKANA | KANA/KANJI |
| NUM00000 | ZERO | 0、零 (ZERO) |
| | REI | 0、零 (ZERO) |
| | ZEROBAN | 0番、零番 (ZEROTH) |
| | REIBAN | 0番、零番 (ZEROTH) |
| NUM00001 | ICHI | 1、一 (ONE) |
| | ICHIBAN | 1番、一番 (FIRST) |
| | HITOTSUME | 1つ目、一つ目 (FIRST) |
| NUM00002 | NI | 2、二 (TWO) |
| | NIBAN | 2番、二番 (SECOND) |
| | FUTATSUME | 2つ目、二つ目 (SECOND) |
| NUM00003 | SAN | 3、三 (THIRD) |
| | SANBAN | 3番、三番 (THIRD) |
| | MITTSUME | 3つ目、三つ目 (THIRD) |
| NUM00004 | YON | 4、四 (FOUR) |
| | YONBAN | 4番、四番 (FOURTH) |
| | YOTTSUME | 4つ目、四つ目 (FOURTH) |
| NUM00005 | GO | 5、五 (FIVE) |
| | GOBAN | 5番、五番 (FIFTH) |
| | ITSUTSUME | 5つ目、五つ目 (FIFTH) |
| NUM00006 | ROKU | 6、六 (SIX) |
| | ROKUBAN | 6番、六番 (SIXTH) |
| | MUTTSUME | 6つ目、六つ目 (SIXTH) |
| NUM00007 | NANA, SHICHI | 7、七 (SEVEN) |
| | NANABAN | 7番、七番 (SEVENTH) |
| | NANATSUME | 7つ目、七つ目 (SEVENTH) |
| NUM00008 | HACHI | 8、八 (EIGHT) |
| | HACHIBAN | 8番、八番 (EIGHTH) |
| | YATTSUME | 8つ目、八つ目 (EIGHTH) |
| NUM00009 | KYU | 9、九 (NINE) |
| | KYUBAN | 9番、九番 (NINTH) |
| | KOKONOTSUME | 9つ目、九つ目 (NINTH) |
| NUM00010 | JU | 10、十 (TEN) |
| | JUBAN | 10番、十番 (TENTH) |
| NUM00011 | JUICHI | 11、十一 (ELEVEN) |
| | JUICHIBAN | 11番、十一番 (ELEVENTH) |
| NUM00012 | JUNI | 12、十二 (TWELVE) |
| | JUNIBAN | 12番、十二番 (TWELFTH) |
| ⋮ | | |
| NUM99999 | KYUMAN KYUSEN KYUHYAKU KYUJU KYU | 99999、九万九千九百九十九 (NINETY-NINE THOUSAND NINE HUNDRED AND NINETY-NINE) |
| | KYUMAN KYUSEN KYUHYAKU KYUJU KYUBAN | 99999番、九万九千九百九十九番 (NINETY-NINE THOUSAND NINE HUNDRED AND NINETY-NINTH) |

FIG. 10B

| GROUP ID | SPEECH RECOGNITION RESULT | |
|---|---|---|
| | KATAKANA | KANA/KANJI |
| CHR00000 | E | A, a |
| | EI | A, a |
| CHR00001 | BI | B, b |
| CHR00002 | SHI | C, c |
| CHR00003 | DI | D, d |
| | DE | D, d |
| CHR00004 | I | E, e |
| CHR00005 | EFU | F, f |
| CHR00006 | JI | G, g |
| CHR00007 | EICHI | H, h |
| | ETCHI | H, h |
| CHR00008 | AI | I, i |
| ⋮ | | |
| CHR00025 | ZETTO | Z, z |
| | ZI | Z, z |

FIG. 11A

| GROUP ID | SPEECH RECOGNITION RESULT | |
|---|---|---|
| | KATAKANA | KANA/KANJI |
| CHR00100 | HIDARIKAKKO | 左括弧 (LEFT BRACKET) |
| CHR00101 | HIDARIKAGIKAKKO | 左鉤括弧、「 (LEFT CORNER BRACKET) |
| CHR00102 | HIDARIMARUKAKKO | 左丸括弧、( (LEFT ROUND BRACKET) |
| | HIDARISHOKAKKO | 左小括弧、( (LEFT PARENTHESIS) |
| CHR00103 | HIDARICHUKAKKO | 左中括弧、{ (LEFT CURLY BRACKET) |
| CHR00104 | HIDARIDAIKAKKO | 左大括弧、[ (LEFT SQUARE BRACKET) |
| CHR00110 | MIGIKAKKO | 右括弧 (RIGHT BRACKET) |
| | KAKKOTOJI | 括弧閉じ (CLOSING BRACKET) |
| CHR00111 | MIGIKAGIKAKKO | 右鉤括弧、」 (RIGHT CORNER BRACKET) |
| | KAGIKAKKOTOJI | 鉤括弧閉じ、」 (CLOSING CORNER BRACKET) |
| CHR00112 | MIGIMARUKAKKO | 右丸括弧、) (RIGHT ROUND BRACKET) |
| | MARUKAKKOTOJI | 丸括弧閉じ、) (CLOSING PARENTHESIS) |
| | MIGISHOKAKKO | 右小括弧、) (RIGHT PARENTHESIS) |
| | SHOKAKKOTOJI | 小括弧、) (CLOSING PARENTHESIS) |
| CHR00113 | MIGICHUKAKKO | 右中括弧、} (RIGHT CURLY BRACKET) |
| | CHUKAKKOTOJI | 中括弧閉じ、} (CLOSING CURLY BRACKET) |
| CHR00114 | MIGIDAIKAKKO | 右大括弧、] (RIGHT SQUARE BRACKET) |
| | DAIKAKKOTOJI | 大括弧閉じ、] (CLOSING SQUARE BRACKET) |
| CHR00120 | HAIFUN | - |
| | YOKOBO | 横棒 (HORIZONTAL BAR) |
| | YOKOSEN | 横線 (HORIZONTAL LINE) |
| | BOSEN | 棒線 (BAR LINE) |
| CHR00121 | ANDABA | _ |
| | KASEN | 下線 (UNDERSCORE) |
| CHR00122 | KARETTO | ^ |
| | HATTO | ^ |
| CHR00123 | EN | 円 (YEN) |
| | ENKIGO | 円記号 (YEN SIGN) |
| | ENMAKU | 円マーク (YEN SIGN) |
| CHR00124 | ATTOMAKU | @ |
| CHR00125 | KANMA | , |
| | KONMA | , |
| CHR00126 | PIRIODO | . |
| | DOTTO | . |

FROM FIG. 11A

| | | |
|---|---|---|
| CHR00127 | EKUSUKURAMESHON | ! |
| | KANTANFU | 感嘆符 (EXCLAMATION MARK) |
| CHR00128 | DABURUKOTO | " |
| | DABURUKUOTO | " |
| | DABURUKOTESHON | " |
| | DABURUKUOTESHON | " |
| | IN'YOFU | 引用符 (QUOTATION MARK) |
| CHR00129 | SHINGURUKOTO | ' |
| | SHINGURUKUOTO | ' |
| | SHINGURUKOTESHON | ' |
| | SHINGURUKUOTESHON | ' |
| | APOSUTOROFI | ' |
| | AKUSANTEGYU | ' |
| CHR00130 | BAKKUKOTO | ` |
| | BAKKUKUOTO | ` |
| | BAKKUKOTESHON | ` |
| | BAKKUKUOTESHON | ` |
| CHR00131 | IGETA | # |
| | SHAPU | |
| CHR00132 | DORU | $ |
| | DARA | $ |
| CHR00133 | ANDO | & |
| | ANPASANDO | & |
| CHR00134 | CHIRUDA | ~ |
| | NAMISEN | 波線 (WAVY LINE) |
| | NYORO | |
| CHR00135 | TATESEN | 縦線 (VERTICAL BAR) |
| | PAIPU | \| |
| CHR00136 | KORON | : |
| CHR00137 | SEMIKORON | ; |

FIG. 11C

| GROUP ID | SPEECH RECOGNITION RESULT | |
| --- | --- | --- |
| | KATAKANA | KANA/KANJI |
| CHR00138 | ASUTARISUKU | * |
| | ASUTERISUKU | * |
| | KOME | 米 (ASTERISK) |
| CHR00139 | RESUZAN | < |
| | SHONARI | 小なり (LESS THAN) |
| CHR00140 | GURETAZAN | > |
| | DAINARI | 大なり (GREATER THAN) |
| CHR00141 | SURASSHU | ／ |
| | SHASEN | 斜線 (SLASH) |
| | HIDARISHASEN | 左斜線 (DIAGONAL LINE FROM LOWER LEFT TO UPPER RIGHT) |
| CHR00142 | BAKKUSURASSHU | ＼ |
| | MIGISHASEN | 右斜線 (DIAGONAL LINE FROM UPPER LEFT TO LOWER RIGHT) |
| CHR00143 | KUESUCHON | ? |
| | KUESUSHON | ? |
| | HATENA | ? |
| | GIMONFU | 疑問符 (QUESTION MARK) |
| CHR00144 | IKORU | = |
| CHR00145 | KUTEN | 句点 (PERIOD) |
| | MARU | 丸 (CIRCLE) |
| CHR00146 | TOTEN | 読点 (COMMA) |
| | TEN | 点 (POINT) |
| CHR00147 | NAKATEN | 中点 (MIDDLE DOT) |
| | CHUTEN | 中点 (MIDPOINT) |

FIG. 11D

| GROUP ID | SPEECH RECOGNITION RESULT | |
|---|---|---|
| | KATAKANA | KANA/KANJI |
| KEY00000 | TENKI | |
| | KIBODO | |
| KEY00001 | BAKKUSUPESU | |
| KEY00002 | RITAN | |
| KEY00003 | SUPESU | |
| | KUHAKU | 空白 (SPACE) |
| KEY00004 | HENKAN | 変換 (CONVERT) |
| KEY00005 | HANKAKU | 半角 (HALF-WIDTH) |
| KEY00006 | ZENKAKU | 全角 (FULL-WIDTH) |
| KEY00007 | KANAKAN | かな漢 (KANA-KANJI) |
| KEY00008 | KATAKANA | |
| KEY00009 | EIJI | 英字 (ALPHABETIC) |
| | EISUJI | 英数字 (ALPHANUMERIC) |
| | ARUFABETTO | |
| KEY00010 | KIGO | 記号 (SIGN) |
| | MAKU | |
| KEY00011 | KODO | |

FIG. 12A

| GROUP ID | SPEECH RECOGNITION RESULT | |
| --- | --- | --- |
| | KATAKANA | KANA/KANJI |
| OPR00000 | SOSA | 操作 (OPERATION) |
| OPR00001 | TATCHI | |
| | TAPPU | |
| | OSU | 押す (PRESS) |
| | OUKA | 押下 (PRESS) |
| | KURIKKU | |
| OPR00002 | RONGUTATCHI | |
| | RONGUTAPPU | |
| | NAGAOSHI | 長押し (HOLD DOWN) |
| OPR00003 | SUWAIPU | |
| OPR00004 | SURAIDO | |
| OPR00005 | SUKURORU | |
| OPR00010 | OKE | OK |
| | OKKE | |
| | KAKUTEI | 確定 (CONFIRM) |
| | KETTEI | 決定 (DETERMINE) |
| | KIMARI | 決まり (DECIDE) |
| OPR00011 | KAISHI | 開始 (START) |
| | SUTATO | |
| | HAJIME | 始め (BEGIN) |
| OPR00012 | SHURYO | 終了 (END) |
| | OWARI | 終わり (FINISH) |
| | KANRYO | 完了 (COMPLETE) |
| OPR00013 | KYANSERU | |
| | CHUSHI | 中止 (STOP) |
| OPR00014 | TEISHI | 停止 (PAUSE) |
| | POZU | |
| | | |

FROM FIG. 12A

| | | |
|---|---|---|
| OPR00020 | TOJIRU | 閉じる (CLOSE) |
| | TOJITE | 閉じて (CLOSE) |
| | KUROZU | |
| OPR00021 | TSUGINI | 次に (NEXT) |
| | TSUGIE | 次へ (NEXT) |
| | SUSUMU | 進む (PROCEED) |
| | JIGAMEN | 次画面 (EXT SCREEN) |
| OPR00022 | MAENI | 前に (BACK) |
| | MAEE | 前へ (RETURN) |
| | MODORU | 戻る (RETURN) |
| | MODOSU | 戻す (RETURN) |
| | ZENGAMEN | 前画面 (PREVIOUS SCREEN) |
| OPR00030 | HAI | |
| | UN | |
| | IESU | Yes |
| OPR00031 | IIE | |
| | NO | No |
| OPR00032 | ON | ON |
| | YUKO | 有効 (ENABLE) |
| OPR00033 | OFU | OFF |
| | MUKO | 無効 (DISABLE) |
| OPR00034 | ARI | 有り (OK) |
| | SURU | する (YES) |
| OPR00035 | NASHI | 無し (CANCEL) |
| | SHINAI | しない (NO) |

FIG. 12C

| GROUP ID | SPEECH RECOGNITION RESULT | |
|---|---|---|
| | KATAKANA | KANA/KANJI |
| OPR00040 | SENTAKU | 選択 (SELECT) |
| | SETTEI | 設定 (SET) |
| | SHITEI | 指定 (SPECIFY) |
| OPR00041 | HENKO | 変更 (CHANGE) |
| | HENSHU | 編集 (EDIT) |
| OPR00042 | HOSEI | 補正 (COMPENSATE) |
| | SHUSEI | 修正 (CORRECT) |
| | CHOSEI | 調整 (ADJUST) |
| OPR00043 | SAKUJO | 削除 (DELETE) |
| | KIE | 消え (DISAPPEAR) |
| | KESHI | 消し (ERASE) |
| | KESU | 消す (ERASE) |
| | SHOKYO | 消去 (DELETE) |
| | JOKYO | 除去 (REMOVE) |
| | NAKUSU | なくす (ELIMINATE) |
| | NAKUSHITE | なくして (ELIMINATE) |
| | KATTO | |
| OPR00044 | KAIJO | 解除 (CLEAR) |
| | KURIA | |
| | TORIKESHI | 取り消し (CANCEL) |
| OPR00045 | RISETTO | |
| | YARINAOSHI | やり直し (RESET) |
| OPR00046 | CHEKKU | |
| | KAKUNIN | 確認 (CHECK) |
| OPR00047 | TOROKU | 登録 (REGISTER) |
| | REJISUTA | |
| OPR00048 | SHOSAI | 詳細 (DETAILS) |
| | KOMAKAI | 細かい (ADVANCED) |
| | KUWASHI | 詳しい (DETAILED) |
| OPR00049 | RIYO | 利用 (USE) |
| | SHIYO | 使用 (USE) |
| | TSUKAU | 使う (USE) |
| OPR00050 | NYURYOKU | 入力 (INPUT) |
| OPR00051 | SHUTSURYOKU | 出力 (OUTPUT) |
| OPR00060 | KINSHI | 禁止 (PROHIBITED) |
| | DEKINAI | できない (NOT ALLOWED) |
| | FUKYOKA | 不許可 (NOT PERMITTED) |
| | DAME | |
| OPR00061 | ERA | |
| | SHIPPAI | 失敗 (FAILURE) |
| | ENUJI | NG (FAILURE) |

FIG. 12D

| GROUP ID | SPEECH RECOGNITION RESULT | |
|---|---|---|
| | KATAKANA | KANA/KANJI |
| UIP00001 | BOTAN | |
| | KI | |
| UIP00002 | PURUDAUN | |
| | DOROPPUDAUN | |
| UIP00003 | AIKON | |
| UIP00004 | FOMU | |
| UIP00005 | BOKKUSU | |
| UIP00006 | GAMEN | 画面 (SCREEN) |
| | WINDO | |
| UIP00007 | POPPUAPPU | |
| | POPPUOBA | |
| | MODARU | |
| | DAIAROGU | |
| UIP00008 | MENYU | |
| UIP00009 | SURAIDA | |
| UIP00010 | SUITCHI | |
| UIP00011 | HYO | 表 (TABLE) |
| | RISUTO | |
| | ICHIRAN | 一覧 (LIST) |

FIG. 13A

| GROUP ID | SPEECH RECOGNITION RESULT | |
|---|---|---|
| | KATAKANA | KANA/KANJI |
| POS00000 | ICHI | 位置 (POSITION) |
| | POJISHON | |
| POS00001 | BASHO | 場所 (PLACE) |
| | RYOIKI | 領域 (REGION) |
| | ERIA | |
| | BUROKKU | |
| POS00010 | UE | 上 (UP) |
| | REIDO | 0° |
| | ZERODO | 0° |
| POS00011 | MIGIUE | 右上 (UPPER RIGHT) |
| | YONJUGODO | 45° |
| POS00012 | MIGI | 右 (RIGHT) |
| | KYUJUDO | 90° |
| POS00013 | MIGISHITA | 右下 (LOWER RIGHT) |
| | HYAKUSANJUGODO | 135° |
| POS00014 | SHITA | 下 (DOWN) |
| | HYAKUHACHIJUDO | 180° |
| POS00015 | HIDARISHITA | 左下 (LOWER LEFT) |
| | NIHYAKUNIJUGODO | 225° |
| POS00016 | HIDARI | 左 (LEFT) |
| | NIHYAKUNANAJUDO | 270° |
| POS00017 | HIDARIUE | 左上 (UPPER LEFT) |
| | SANBYAKUJUGODO | 315° |
| POS00018 | CHUO | 中央 (CENTER) |
| | SENTA | Center |
| | MANNAKA | 真ん中 (MIDDLE) |
| | CHUSHIN | 中心 (CENTER) |
| POS00020 | JOBU | 上部 (UPPER PART) |
| | TEN | 天 (TOP) |
| | JOHEN | 上辺 (UPPER SIDE) |
| POS00021 | KABU | 下部 (LOWER PART) |
| | CHI | 地 (BOTTOM) |
| | KAHEN | 下辺 (LOWER SIDE) |
| | TEIHEN | 底辺 (BOTTOM SIDE) |
| POS00022 | JOGE | 上下 (UP AND DOWN) |
| | UESHITA | 上下 (UP AND DOWN) |
| POS00023 | SAYU | 左右 (LEFT AND RIGHT) |
| | HIDARIMIGI | 左右 (LEFT AND RIGHT) |
| | MIGIHIDARI | 右左 (RIGHT AND LEFT) |

FIG. 13B

| GROUP ID | SPEECH RECOGNITION RESULT | |
|---|---|---|
| | KATAKANA | KANA/KANJI |
| POS00030 | ZENSHU | 全周 (PERIMETER) |
| | MAWARI | 周り (CIRCUMFERENCE) |
| POS00031 | OKU | 奥 (BACK) |
| | MUKO | 向う (OTHER SIDE) |
| | TOI | 遠い (DISTANT) |
| | TOKU | 遠く (FAR) |
| POS00032 | TEMAE | 手前 (FRONTWARD) |
| | KOTCHI | |
| | KOCHIRA | こちら (THIS SIDE) |
| | CHIKAI | 近い (NEAR) |
| | CHIKAKU | 近く (NEAR) |
| POS00040 | MUKI | 向き (ORIENTATION) |
| | HOKO | 方向 (DIRECTION) |
| POS00041 | TATEYOKO | 縦横 (VERTICAL AND HORIZONTAL) |
| POS00042 | TATE | 縦 (VERTICAL) |
| POS00043 | TATENAGA | 縦長 (PORTRAIT) |
| | POTORETO | |
| POS00045 | YOKO | 横 (HORIZONTAL) |
| POS00046 | YOKONAGA | 横長 (LANDSCAPE) |
| | RANDOSUKEPU | |
| POS00047 | CHOHEN | 長辺 (LONG) |
| | NAGATE | 長手 (LONGITUDINAL) |
| POS00048 | TANPEN | 短辺 (SHORT SIDE) |
| | MIJIKATE | 短手 (LATERAL) |
| | MIJIKADE | 短手 (LATERAL) |
| POS00050 | HANTAI | 反対 (OPPOSITE) |
| | GYAKU | 逆 (REVERSE) |
| | HANTEN | 反転 (INVERSE) |
| POS00051 | SEITAI | 正対 (FACE-TO-FACE) |
| POS00101 | ICHIDANME | 一段目、1段目 (FIRST ROW) |
| | ICHIGYOME | 一行目、1行目 (FIRST ROW) |
| POS00102 | NIDANME | 二段目、2段目 (SECOND ROW) |
| | NIGYOME | 二行目、2行目 (SECOND ROW) |
| POS00103 | SANDANME | 三段目、3段目 (THIRD ROW) |
| | SANGYOME | 三行目、3行目 (THIRD ROW) |
| POS00111 | ICHIRETSUME | 一列目、1列目 (FIRST COLUMN) |
| POS00112 | NIRETSUME | 二列目、2列目 (SECOND COLUMN) |
| POS00113 | SANRETSUME | 三列目、3列目 (THIRD COLUMN) |

FIG. 14A

| GROUP ID | SPEECH RECOGNITION RESULT | |
|---|---|---|
| | KATAKANA | KANA/KANJI |
| FNC00000 | KINO | 機能 (FUNCTION) |
| | FANKUSHON | |
| FNC00001 | KOPI | |
| | FUKUSYA | 複写 (COPY) |
| | FUKUSEI | 複製 (DUPLICATE) |
| FNC00002 | INSATSU | 印刷 (PRINT) |
| | PURINTO | |
| FNC00003 | SUKYAN | |
| | YOMITORI | 読み取り (READ) |
| | YOMIKOMI | 読み込み (SCAN) |
| FNC00004 | HOZON | 保存 (SAVE) |
| | HOKAN | 保管 (STORE) |
| | KAKUNO | 格納 (STORE) |
| | NOKOSU | 残す (LEAVE) |
| | HORUDO | |
| | KIROKU | 記録 (RECORD) |
| | KAKIKOMI | 書き込み (WRITE) |
| FNC00005 | SOSHIN | 送信 (SEND) |
| | SENDO | |
| FNC00006 | JUSHIN | 受信 (RECEIVE) |
| | RESHIBU | |
| FNC00007 | SUPURU | |
| | TAMATTE | 溜まって (SPOOL) |
| FNC00008 | SHOKAI | 紹介 (INTRODUCE) |
| | HERUPU | |
| | GAIDO | |
| | INTORO | |

FROM FIG. 14A

| | | |
|---|---|---|
| FNC00010 | NINSHO | 認証 (AUTHENTICATION) |
| FNC00011 | JOKYO | 状況 (STATUS) |
| | JOTAI | 状態 (STATE) |
| | SUTETASU | |
| FNC00012 | PUREBYU | |
| FNC00013 | HYOJI | 表示 (DISPLAY) |
| FNC00014 | KENSAKU | 検索 (SEARCH) |
| | SACHI | |
| | SHIRABE | 調べ (SEARCH) |
| FNC00015 | TSUCHI | 通知 (NOTIFICATION) |
| | ARAMU | |
| | ANAUNSU | |
| | OSHIE | 教え (TEACH) |
| | TSUTAE | 伝え (INFORM) |
| FNC00016 | RENRAKU | 連絡 (COMMUNICATION) |
| | DENTATSU | 伝達 (TRANSMISSION) |
| FNC00021 | WARIKOMI | 割り込み (INTERRUPT) |
| FNC00022 | YUSEN | 優先 (PRIORITY) |
| FNC00023 | OIKOSHI | 追い越し (PASSING) |
| FNC00024 | TAMESHI | 試し (TEST) |
| | TESUTO | |
| | SANPURU | |

FIG. 14C

| GROUP ID | SPEECH RECOGNITION RESULT | |
| --- | --- | --- |
| | KATAKANA | KANA/KANJI |
| COL00000 | KARA | |
| | IRO | 色 (COLOR) |
| COL00001 | REDDO | |
| | AKA | 赤 (RED) |
| | AKAIRO | 赤色 (RED COLOR) |
| COL00002 | GURIN | |
| | MIDORI | 緑 (GREEN) |
| | MIDORIIRO | 緑色 (GREEN COLOR) |
| COL00003 | BURU | |
| | AO | 青 (BLUE) |
| | AOIRO | 青色 (BLUE COLOR) |
| COL00004 | IERO | |
| | KI | 黄 (YELLOW) |
| | KIIRO | 黄色 (YELLOW COLOR) |
| COL00005 | MAZENTA | |
| | MAZENDA | |
| COL00006 | SHIAN | |
| COL00100 | BURAKKU | |
| | KURO | 黒 (BLACK) |
| | KUROIRO | 黒色 (BLACK COLOR) |
| COL00101 | GURE | |
| | GURESUKERU | |
| | SHIROKUROTACHI | 白黒多値 (BLACK-AND-WHITE MULTIVALUED) |
| COL00102 | SHIROKURO | 白黒 (BLACK AND WHITE) |
| | BIDABURYU | BW |
| | MONOKURO | |
| COL00103 | SHIROKURONICHI | 白黒2値、白黒二値 (BLACK-AND-WHITE BINARY) |
| COL00110 | TANSHOKU | 単色 (SINGLE COLOR) |
| | MONOKARA | |
| COL00111 | NISHOKU | 2色、二色 (TWO COLORS) |
| | BAIKARA | |
| COL00200 | IROBETSU | 色別 (FOR EACH COLOR) |
| | IROGOTO | 色ごと (FOR EACH COLOR) |
| | KAKUSHOKU | 各色 (EACH COLOR) |
| COL00201 | ZENSHOKU | 全色 (FULL COLOR) |
| | FURUKARA | |

FIG. 15A

| GROUP ID | SPEECH RECOGNITION RESULT | |
| --- | --- | --- |
| | KATAKANA | KANA/KANJI |
| NEX00000 | SUJI | 数字 (NUMERAL) |
| | BANGO | 番号 (NUMBER) |
| | NANBA | |
| NEX00001 | NANBARINGU | |
| NEX00002 | KETA | 桁 (DIGIT) |
| NEX00003 | KAUNTO | |
| | KAUNTA | |
| NEX00004 | OFU | of |
| | OBU | of |
| NEX00005 | KASSEN | 括線 (VINCULUM) |
| NEX00006 | BUNNO | 分の (FRACTION OF) |
| NEX00007 | TAN'ITSU | 単一 (SINGLE) |
| | MONO | |
| | TANSU | 単数 (SINGULAR) |
| NEX00008 | MARUCHI | |
| | FUKUSU | 複数 (PLURAL) |

FIG. 15B

| GROUP ID | SPEECH RECOGNITION RESULT | |
| --- | --- | --- |
| | KATAKANA | KANA/KANJI |
| LEN00000 | NAGASA | 長さ (LENGTH) |
| | RENGUSU | |
| | KYORI | 距離 (DISTANCE) |
| LEN00001 | EKKUSU | X |
| | HABA | 幅 (WIDTH) |
| LEN00002 | WAI | Y |
| | TAKASA | 高さ (HEIGHT) |
| LEN00003 | POINTO | |
| LEN00004 | INCHI | |
| LEN00005 | METORU | |
| LEN00006 | BAIRITSU | 倍率 (RATIO) |
| | ZUMU | |
| LEN00007 | TOBAI | 等倍 (SAME SIZE) |
| LEN00008 | PASENTO | % |
| | HYAKUBUNRITSU | 百分率 (PERCENTAGE) |
| | WARIAI | 割合 (RATIO) |
| LEN00009 | DORITSU | 同率 (SAME RATIO) |
| LEN00010 | POSUTA | |

FIG. 15C

| GROUP ID | SPEECH RECOGNITION RESULT | |
| --- | --- | --- |
| | KATAKANA | KANA/KANJI |
| DGR00000 | REBERU | |
| | SUIJUN | 水準 (LEVEL) |
| | DOAI | 度合い (DEGREE) |
| DGR00001 | SAISHO | 最小 (MINIMUM) |
| | MINIMAMU | |
| DGR00002 | SAIDAI | 最大 (MAXIMUM) |
| | MAKKUSU | |
| DGR00003 | MAINASU | |
| | GENSHO | 減少 (DECREASE) |
| | HERASU | 減らす (DECREASE) |
| | CHIISAKU | 小さく (SMALLER) |
| | SHUKUSHO | 縮小 (REDUCE) |
| | SUKUNAKU | 少なく (LESS) |
| | MIJIKAKU | 短く (SHORTER) |
| DGR00004 | PURASU | |
| | ZOKA | 増加 (INCREASE) |
| | FUYASU | 増やす (INCREASE) |
| | OKIKU | 大きく (LARGER) |
| | KAKUDAI | 拡大 (ENLARGE) |
| | OKU | 多く (MORE) |
| | NAGAKU | 長く (LONGER) |
| DGR00005 | ONAJI | 同じ (SAME) |
| | ISSHO | いっしょ (SAME) |
| | KAWARANAI | 変わらない (UNCHANGED) |
| | KIN'ITSU | 均一 (UNIFORM) |
| DGR00006 | CHIGAU | 違う (DIFFERENT) |
| | KOTONARU | 異なる (DIFFERENT) |
| DGR00007 | SONOMAMA | そのまま (REMAIN) |
| DGR00008 | JIDO | 自動 (AUTOMATIC) |
| | OTO | |
| | | |

FROM FIG. 15C

| | | |
|---|---|---|
| DGR00009 | SHUDO | 手動 (MANUAL) |
| | MANYUARU | |
| DGR00010 | FURI | |
| | JIYU | 自由 (FREE) |
| | NIN'I | 任意 (ARBITRARY) |
| DGR00011 | TSUYOI | 強い (STRONG) |
| | TUYOKU | 強く (HARD) |
| | KITSUKU | きつく (TIGHTLY) |
| DGR00012 | YOWAI | 弱い (WEAK) |
| | YOWAKU | 弱く (SOFTLY) |
| | YURUKU | ゆるく (LOOSELY) |
| DGR00013 | TAKAKU | 高く (HIGH) |
| | TAKAME | 高目 (HIGHER) |
| DGR00014 | HIKUKU | 低く (LOW) |
| | HIKUME | 低目 (LOWER) |
| DGR00015 | HIKUI | 低い (LOW) |
| | TEI | 低 (LOW) |
| DGR00016 | CHU | 中 (MIDDLE) |
| DGR00017 | TAKAI | 高い (HIGH) |
| | KOU | 高 (HIGH) |
| DGR00018 | SUKOSHI | 少し (A LITTLE) |
| | CHOTTO | ちょっと (BIT) |
| | BI | 微 (MINUTE) |
| | WAZUKA | 僅か (SLIGHT) |
| DGR00019 | SHOSU | 少数 (FEW) |
| DGR00020 | TASU | 多数 (MANY) |
| | TAKUSAN | たくさん (A LOT OF) |

FIG. 16A

| GROUP ID | SPEECH RECOGNITION RESULT | |
| --- | --- | --- |
| | KATAKANA | KANA/KANJI |
| PAP00000 | YOSHI | 用紙 (SHEET) |
| | KAMI | 紙 (PAPER) |
| | SHITO | |
| | PEPA | |
| PAP00001 | SAIZU | |
| | OKISA | 大きさ (SIZE) |
| PAP00002 | KEIRETSU | 系列 (SERIES) |
| | KEITO | 系統 (SYSTEM) |
| | KATEGORI | |
| | KATEGORII | |
| PAP00003 | ISAIZU | 異サイズ (DIFFERENT SIZE) |
| PAP00004 | DOHABA | 同幅 (SAME WIDTH) |
| PAP00005 | IHABA | 異幅 (DIFFERENT WIDTH) |
| PAP00100 | EISAN | A3 |
| | ESAN | A3 |
| PAP00101 | EIYON | A4 |
| | EYON | A4 |
| PAP00102 | EIGO | A5 |
| | EGO | A5 |
| PAP00103 | BIIYON | B4 |
| | BIYON | B4 |
| PAP00104 | BIIGO | B5 |
| | BIGO | B5 |
| PAP00110 | ERUTIARU | LTR |
| | RETA | |
| PAP00111 | ERUJIERU | LGL |
| | RIGARU | |
| PAP00112 | FORIO | |
| PAP00113 | EFUERUESUPI | FLSP |
| | FURUSUKYAPPU | |

FROM FIG. 16A

| | | |
|---|---|---|
| PAP00114 | REJA | |
| | TABUROIDO | |
| | IREBUNBAISEBUNTIN | 11x17 |
| PAP00115 | IEKKUSUISHI | EXEC |
| | EGUZEKUTIBU | |
| | EGUZEKKU | |
| PAP00116 | ESUTIEMUTI | STMT |
| | SUTETOMENTO | |
| PAP00120 | CHOJAKU | 長尺 (LONG LENGTH) |
| PAP00121 | NOBI | |
| PAP00200 | HAGAKI | 葉書き (POSTCARD) |
| PAP00201 | OEICHIPI | OHP (TRANSPARENCY) |
| | OETCHIPI | OHP (TRANSPARENCY) |
| | TOMEISHI | 透明紙 (TRANSPARENT PAPER) |
| | FIRUMU | |
| PAP00202 | FUTSUSHI | 普通紙 (NORMAL PAPER) |
| PAP00203 | SAISEISHI | 再生紙 (RECYCLED PAPER) |
| PAP00204 | ATSUGAMI | 厚紙 (CARDBOARD) |
| PAP00205 | KOTOSHI | コート紙 (COATED PAPER) |
| | KOTAKUSHI | 光沢紙 (GLOSSY PAPER) |
| PAP00206 | INGASHI | 印画紙 (PHOTOGRAPHIC PAPER) |
| | BUROMAIDO | |
| | FOTOPEPA | |
| PAP00207 | INDEKKUSUSHI | インデックス紙 (INDEX PAPER) |
| | TABUSHI | タブ紙 (TAB PAPER) |
| PAP00208 | MATTOKOTOSHI | マットコート紙 (MATTE COATED PAPER) |
| PAP00209 | HAKUSHI | 白紙 (BLANK PAPER) |
| | SHIROGAMI | 白紙 (BLANK PAPER) |
| PAP00210 | IROGAMI | 色紙 (COLORED PAPER) |
| | SHIKISHI | 色紙 (COLORED PAPER) |

FIG. 16C

| GROUP ID | SPEECH RECOGNITION RESULT | |
|---|---|---|
| | KATAKANA | KANA/KANJI |
| SHT00000 | HYOSHI | 表紙 (FRONT COVER) |
| | KABASHITO | |
| SHT00001 | SONYUSHI | 挿入紙 (INSERT SHEET) |
| SHT00002 | AISHI | 合紙 (INSERTED SHEET) |
| SHT00003 | SHOSHI | 章紙 (CHAPTER PAGE) |
| SHT00004 | SHIKIRISHI | 仕切り紙 (SEPARATOR) |
| SHT00005 | NAKAZASHI | 中差し (INTERLEAF SHEET) |
| SHT00006 | GENKO | 原稿 (ORIGINAL) |
| SHT00007 | AIDIKADO | IDカード (ID CARD) |
| | MENKYOSHO | 免許証 (LICENSE) |
| | MENKYOSHO | 免許書 (LICENSE) |
| | SHOMEISHO | 証明書 (CERTIFICATE) |
| | HOKENSHO | 保険証 (INSURANCE CARD) |
| | HOKENSHO | 保険書 (INSURANCE PAPER) |

FIG. 16D

| GROUP ID | SPEECH RECOGNITION RESULT | |
|---|---|---|
| | KATAKANA | KANA/KANJI |
| SID00000 | RYOMEN | 両面 (BOTH SIDES) |
| | RYANMEN | |
| | OMOTEURA | 表裏 (FRONT AND BACK) |
| | URAOMOTE | 裏表 (BACK AND FRONT) |
| | HYORI | 表裏 (FRONT AND BACK) |
| | RYOGAWA | 両側 (BOTH SIDES) |
| SID00001 | KATAMEN | 片面 (ONE SIDE) |
| | KATAGAWA | 片側 (ONE SIDE) |
| | OMOTEDAKE | 表だけ (FRONT SIDE ONLY) |
| SID00002 | URA | 裏 (BACK) |
| | URAMEN | 裏面 (BACK SIDE) |
| SID00003 | OMOTE | 表 (FRONT) |
| | OMOTEMEN | 表面 (FRONT SIDE) |
| SID00004 | UCHIGAWA | 内側 (INSIDE) |
| SID00005 | SOTOGAWA | 外側 (OUTSIDE) |
| SID00006 | ZENMEN | 全面 (FULL PAGE) |

FIG. 17A

| GROUP ID | SPEECH RECOGNITION RESULT | |
| --- | --- | --- |
| | KATAKANA | KANA/KANJI |
| FIN00000 | SHIAGE | 仕上げ (FINISHING) |
| | ATOSHORI | 後処理 (POSTPROCESSING) |
| FIN00001 | SOTO | |
| | KORETO | |
| | ICHIBUGOTO | 1部ごと (PAGE ORDER) |
| | BUTAN'I | 部単位 (PAGE ORDER) |
| FIN00002 | GURUPU | |
| FIN00003 | PEJIGOTO | ページごと (SAME PAGES) |
| | PEJITAN'I | ページ単位 (SAME PAGES) |
| FIN00004 | KAITEN | 回転 (ROTATION) |
| | MAWASU | 回す (ROTATE) |
| | MAWASHITE | 回して (ROTATE) |
| | ROTESHON | |
| | ROTETO | |
| FIN00010 | HOCHIKISU | |
| | HOTCHIKISU | |
| | SUTEIPURU | |
| | HARI | 針 (STAPLE) |
| | TOJI | 綴じ (STAPLE) |
| FIN00011 | SHIFUTO | |
| | ZURASHI | ずらし (SHIFT) |
| | IDO | 移動 (SHIFT) |
| FIN00012 | PANCHI | |
| | ANA | 穴 (HOLE) |
| FIN00013 | SADORU | |
| FIN00014 | ORI | 折り (FOLD) |
| | FORUDO | |
| | TATAMU | 畳む (FOLD) |

FIG. 17B

| GROUP ID | SPEECH RECOGNITION RESULT | |
| --- | --- | --- |
| | KATAKANA | KANA/KANJI |
| LYT00000 | REIAUTO | |
| | WARITSUKE | 割り付け (LAYOUT) |
| | HAICHI | 配置 (ARRANGEMENT) |
| | HARITSUKE | 貼り付け (PASTE) |
| LYT00001 | SOROE | 揃え (ALIGN) |
| LYT00002 | BUNKATSU | 分割 (SPLIT) |
| | WAKERU | 分ける (DIVIDE) |
| LYT00003 | MATOMERU | まとめる (COPY ONTO ONE SHEET) |
| | MATOMETE | まとめて (ONTO ONE SHEET) |
| | SHUYAKU | 集約 (N IN ONE) |
| LYT00010 | WAN'INWAN | 1in1 |
| | ICHI'IN'ICHI | |
| | WAN'APPU | 1up |
| | WAN'NAPPU | |
| | ICHIAPPU | |
| LYT00011 | TSUINWAN | 2in1 |
| | NI'IN'ICHI | |
| | TSUAPPU | 2up |
| | NIAPPU | |
| LYT00012 | FO'INWAN | 4in1 |
| | YON'IN'ICHI | |
| | FOAPPU | 4up |
| | YON'APPU | |
| LYT00013 | SHIKKUSUINWAN | 6in1 |
| | ROKUIN'ICHI | |
| | SHIKKUSUAPPU | 6up |
| | ROKUAPPU | |
| LYT00014 | EITOINWAN | 8in1 |
| | HACHI'IN'ICHI | |
| | EITOAPPU | 8up |
| | HACHIAPPU | |
| | | |

FROM FIG. 17B

| | | |
|---|---|---|
| LYT00015 | NAIN'INWAN | 9in1 |
| | KYUIN'ICHI | |
| | NAIN'APPU | 9up |
| | KYUAPPU | |
| LYT00016 | SIKKUSUTIN'INWAN | 16in1 |
| | JUROKUIN'ICHI | |
| | SIKKUSUTIN'APPU | 16up |
| | JUROKUAPPU | |
| LYT00020 | RIPITO | |
| | KURIKAESHI | 繰り返し (REPEAT) |
| LYT00021 | HON | 本 (BOOK) |
| | SHOSEKI | 書籍 (BOOK) |
| | ZASSHI | 雑誌 (MAGAZINE) |
| | SEIHON | 製本 (BOOKLET) |
| | BUKKU | |
| LYT00022 | MIHIRAKI | 見開き (TWO-PAGE SPREAD) |
| LYT00023 | HIRAKU | 開く (OPEN) |
| | HIRAKI | 開き (SPREAD) |
| | MEKURU | めくる (TURN OVER) |
| | MEKURI | めくり (FLIP) |
| LYT00024 | TOJISHIRO | 綴じ代 (GUTTER) |
| LYT00025 | WAKU | 枠 (FRAME) |
| | FUREMU | |
| | SHUI | 周囲 (EDGE) |
| | SHIHEN | 四辺 (FOUR SIDES) |
| | YOHAKU | 余白 (MARGIN) |
| LYT00026 | KURIPU | |
| | ZURE | ずれ (DISPLACEMENT) |
| LYT00027 | KYOZO | 鏡像 (MIRROR IMAGE) |
| LYT00028 | YORI | 寄り (SIDE) |
| | GAWA | 側 (SIDE) |
| LYT00030 | PEJI | ページ、頁 (PAGE) |

FIG. 18A

| GROUP ID | SPEECH RECOGNITION RESULT | |
|---|---|---|
| | KATAKANA | KANA/KANJI |
| IMG00000 | IMEJI | |
| | GAZO | 画像 (IMAGE) |
| IMG00001 | MOJI | 文字 (CHARACTER) |
| | JI | 字 (LETTER) |
| IMG00002 | SHASHIN | 写真 (PHOTOGRAPH) |
| | FOTO | |
| IMG00003 | CHIZU | 地図 (MAP) |
| | MAPPU | |
| IMG00004 | NODO | 濃度 (DENSITY) |
| | KOSA | 濃さ (DENSITY) |
| IMG00005 | KOI | 濃い (THICK) |
| | KOKU | 濃く (HEAVY) |
| | KOYUKU | こゆく (BOLD) |
| IMG00006 | USUI | 薄い (LIGHT) |
| | USUKU | 薄く (FAINT) |
| IMG00007 | HAIKEI | 背景 (BACKGROUND) |
| | KOKEI | 後景 (BACKGROUND) |
| | BAKKUGURAUNDO | |
| | BAKKUGURANDO | |
| IMG00008 | URAUTSURI | 裏移り (OFFSET) |
| IMG00009 | SUKE | 透け (TRANSPARENT) |
| | TOKA | 透過 (TRANSPARENT) |
| | SUKASHI | 透かし (WATERMARK) |
| IMG00010 | SHAPUNESU | |
| IMG00011 | SAIDO | 彩度 (SATURATION) |
| | AZAYAKASA | 鮮やかさ (VIVIDNESS) |
| | TON | |

FROM FIG. 18A

| | | |
|---|---|---|
| IMG00012 | SHIKISO | 色相 (HUE) |
| | IROAI | 色合い (GRADATION) |
| IMG00013 | KONTORASUTO | |
| IMG00014 | KYOCHO | 強調 (HIGHLIGHT) |
| | KUKKIRI | くっきり (SHARP) |
| | HAKKIRI | はっきり (CLEAR) |
| IMG00015 | AIMAI | 曖昧 (BLURRY) |
| | BON'YARI | ぼんやり (BLURRY) |
| | BOKASU | ぼかす (BLURRING) |
| | BOKASHI | ぼかし (BLURRING) |
| IMG00016 | AZAYAKA | 鮮やか (VIVID) |
| | TON'APPU | |
| IMG00017 | OCHITSUITA | 落ち着いた (MUTED) |
| | TONDAUN | |
| IMG00018 | KARUKU | 軽く (LIGHT) |
| | RAITO | Light |
| IMG00019 | OMOKU | 重く (HEAVY) |
| | HEBI | Heavy |
| IMG00020 | HAIRAITO | |
| IMG00021 | AKARUI | 明るい (BRIGHT) |
| IMG00022 | KURAI | 暗い (DARK) |
| IMG00023 | RETORO | |
| | FURUI | 古い (OLD) |
| | NATSUKASHII | 懐かしい (NOSTALGIC) |
| | MUKASHIFU | 昔風 (OLD-FASHIONED) |
| IMG00024 | NEGAPOJI | |

FIG. 18C

| GROUP ID | SPEECH RECOGNITION RESULT | |
|---|---|---|
| | KATAKANA | KANA/KANJI |
| SEL00000 | BUSU | 部数 (NUMBER OF COPIES) |
| | CHISU | |
| SEL00001 | PEJISU | ページ数、頁数 (NUMBER OF PAGES) |
| SEL00002 | MAISU | 枚数 (NUMBER OF SHEETS) |
| SEL00003 | BUNKATSUSU | 分割数 (NUMBER OF DIVISIONS) |
| SEL00004 | KONSAI | 混載 (MIXED) |
| | KONDO | 混同 (MIX) |
| | MIKKUSU | |
| SEL00005 | KETSUGO | 結合 (COMBINE) |
| | BIRUDO | |
| | KUMIAWASE | 組み合わせ (COMBINATION) |
| | ITTAI | 一体 (INTEGRATE) |
| | GOSEI | 合成 (COMBINE) |
| SEL00006 | INJI | 印字 (PRINT) |
| SEL00007 | SUTANPU | |
| SEL00008 | MARUHI | 丸秘 (SECRET) |
| SEL00009 | KONFIDENSHARU | Confidential |
| SEL00010 | DORAFUTO | Draft |
| SEL00011 | SHAGAIHI | 社外秘 (INTERNAL USE ONLY) |
| SEL00012 | KIMITSU | 機密 (CLASSIFIED) |
| SEL00013 | SHO | 章 (CHAPTER) |
| SEL00014 | SOPEJI | 総ページ (TOTAL NUMBER OF PAGES) |
| SEL00015 | JUSO | 重送 (DOUBLE FEED) |
| | KASANARI | 重なり (OVERLAPPING) |
| | KASANE | 重ね (OVERLAP) |
| | NIJU | 二重 (DOUBLE) |
| SEL00016 | SUKIPPU | |
| | TOBASHI | 飛ばし (SKIP) |
| SEL00017 | SETSUYAKU | 節約 (SAVING) |
| | HABUKU | 省く (SAVE) |
| SEL00018 | TATEN | 多点 (MULTIPOINT) |
| SEL00019 | SEKYUA | |

FIG. 19A

| GROUP ID | SPEECH RECOGNITION RESULT | |
|---|---|---|
| | KATAKANA | KANA/KANJI |
| SND00000 | ATESAKI | 宛先 (ADDRESS) |
| | OKURISAKI | 送り先 (DESTINATION) |
| | SOSHINSAKI | 送信先 (DESTINATION) |
| | ADORESU | |
| SND00001 | CHO | 帳 (ADDRESS BOOK) |
| SND00010 | MOBAIRU | |
| | SUMAHO | |
| | SUMATOHON | |
| | SUMATOFON | |
| | KEITAI | 携帯 (MOBILE) |
| SND00011 | MERU | |
| SND00012 | FAKKUSU | FAX |
| SND00013 | FAIRU | |
| SND00014 | FORUDA | |
| | DIREKUTORI | |
| SND00020 | MAI | |
| | JIBUN | 自分 (MYSELF) |
| | ORE | 俺 (ME) |
| | WATASHI | 私 (I) |
| | KOJIN | 個人 (PERSONAL) |
| SND00021 | SHISHI | Cc |
| SND00022 | BISHISHI | Bcc |
| SND00023 | ASSHUKU | 圧縮 (COMPRESS) |
| SND00030 | KAIZODO | 解像度 (RESOLUTION) |
| | DIPIAI | dpi |
| | | |

FROM FIG. 19A

| | | |
|---|---|---|
| SND00031 | NOMARU | |
| | HYOJUN | 標準 (STANDARD) |
| | FUTSU | 普通 (NORMAL) |
| SND00032 | FAIN | |
| | RYO | 良 (FINE) |
| SND00033 | SUPA | |
| | SUPAFAIN | |
| SND00034 | URUTORA | |
| | URUTORAFAIN | |
| SND00040 | JEIPEGU | JPEG |
| SND00041 | PIDIEFU | PDF |
| | PIDEEFU | PDF |
| SND00042 | PEDIEFUE | PDFA |
| | PEDEEFUE | PDFA |
| SND00043 | TIFU | TIFF |
| SND00044 | EKKUSUPIESU | XPS |
| SND00050 | SUMISUTANPU | 済みスタンプ (FINISHED STAMP) |
| SND00060 | FAIRUMEI | ファイル名 (FILE NAME) |
| SND00061 | KENMEI | 件名 (SUBJECT) |
| | SABUJEKUTO | |
| SND00062 | HONBUN | 本文 (MESSAGE) |
| SND00063 | HENSIN | 返信 (REPLY) |
| SND00064 | JUYODO | 重要度 (PRIORITY) |

FIG. 19C

| GROUP ID | SPEECH RECOGNITION RESULT | |
|---|---|---|
| | KATAKANA | KANA/KANJI |
| NET00000 | TSUSHIN | 通信 (COMMUNICATION) |
| NET00001 | NETTOWAKU | |
| | TSUSHINMO | 通信網 (COMMUNICATION NETWORK) |
| NET00002 | PUROTOKORU | |
| NET00003 | WINDOZU | Windows |
| | ESUEMUBI | SMB |
| | SANBA | Samba |
| NET00004 | EFUTIPI | FTP |
| NET00005 | WEBUDABU | WebDAV |
| | DABU | DAV |
| | DIEBUI | DAV |
| NET00006 | SABA | |
| NET00007 | HOSUTO | |
| | KURAIANTO | |
| | TANMATSU | 端末 (TERMINAL) |
| NET00008 | PASU | |
| | YUARUERU | URL |
| NET00009 | YUZA | |
| | AKAUNTO | |
| NET00010 | PASUWADO | |
| | PASUKODO | |
| | PINKODO | PINコード (PIN CODE) |
| | OMAJINAI | おまじない (SECRET WORD) |
| | AIKOTOBA | 合言葉 (PASSWORD) |
| NET00011 | KEIYU | 経由 (VIA) |
| NET00012 | DAIREKUTO | |
| | CHOKUSETSU | 直接 (DIRECT) |
| NET00013 | RAN | LAN |
| | ROKARUERIANETTOWAKU | |

FIG. 20

| GROUP ID | SPEECH RECOGNITION RESULT | |
| --- | --- | --- |
| | KATAKANA | KANA/KANJI |
| DEV00000 | SOCHI | 装置 (APPARATUS) |
| | DEBAISU | |
| | KIKI | 機器 (DEVICE) |
| | KIKAI | 機械 (MACHINE) |
| DEV00001 | TEZASHI | 手差し (MANUAL FEED) |
| | SASHIKOMI | 差し込み (INSERT) |
| DEV00002 | TORE | |
| | TOREI | |
| | KUCHI | 口 (SLOT) |
| | KO | 口 (OPENING) |
| | OKI | 置き (LOADING) |
| DEV00003 | KASETTO | |
| | DEKKI | |
| DEV00004 | KYUSHI | 給紙 (PAPER FEEDING) |
| | HIKIKOMI | 引き込み (DRAWING IN) |
| DEV00005 | HAISHI | 排紙 (PAPER OUTPUT) |
| | HAISHUTSU | 排出 (DISCHARGE) |
| DEV00006 | FIDA | |
| | EIDIEFU | ADF |
| | KAMIOKURI | 紙送り (PAPER FEEDER) |
| DEV00007 | GENKODAI | 原稿台 (PLATEN GLASS) |
| DEV00008 | PURINTA | |
| | INSATSUKI | 印刷機 (PRINTER) |
| DEV00009 | SUKYANA | |
| | RIDA | |
| DEV00010 | AKUSESARI | |
| | OPUSHON | |
| | FUZOKU | 付属 (ACCESSORY) |
| DEV00011 | TONA | |
| DEV00012 | INKU | |
| | INKI | |
| DEV00013 | EMUEFUPI | MFP |
| | FUKUGOKI | 複合機 (MFP) |
| DEV00014 | KABA | |
| | DOA | |
| DEV00015 | MAIKU | |
| DEV00016 | SUPIKA | |
| DEV00017 | ONRYO | 音量 (VOLUME) |
| | BORYUMU | |
| DEV00018 | MEMORII | |
| | MEMORI | |
| DEV00019 | DENGEN | 電源 (POWER) |
| DEV00020 | SETSUDEN | 節電 (ENERGY SAVING) |

FIG. 21A

| GROUP ID | SPEECH RECOGNITION RESULT | |
|---|---|---|
| | KATAKANA | KANA/KANJI |
| ELS00000 | YOKUTSUKAU | よく使う (FREQUENTLY USED) |
| | ITSUMOTSUKAU | いつも使う (ALWAYS USED) |
| ELS00001 | TEIKEI | 定型 (STANDARD) |
| | OKIMARI | お決まり (ROUTINE) |
| | ITSUMONO | |
| ELS00002 | WANTATCHI | |
| ELS00003 | HINDO | 頻度 (FREQUENCY) |
| ELS00004 | TSUNENI | 常に (CONSTANTLY) |
| | ITSUMO | いつも (REGULARLY) |
| | KANARAZU | 必ず (ALWAYS) |
| | MAIKAI | 毎回 (EVERY TIME) |
| ELS00005 | KAISU | 回数 (NUMBER OF TIMES) |
| ELS00006 | JUNJO | 順序 (SEQUENCE) |
| | JUNBAN | 順番 (ORDER) |
| ELS00010 | ZENBU | 全部 (ALL) |
| | SUBETE | 全て (ALL) |
| ELS00011 | DOKURITSU | 独立 (INDEPENDENTLY) |
| | SOREZORE | それぞれ (INDIVIDUALLY) |
| | BETSUBETSU | 別々 (SEPARATELY) |
| | KOBETU | 個別 (INDIVIDUALLY) |
| ELS00012 | NOMI | のみ (ONLY) |
| | DAKE | だけ (ALONE) |
| ELS00020 | RIREKI | 履歴 (HISTORY) |
| | HISUTORI | |
| ELS00021 | YOBIDASHI | 呼び出し (RECALL) |
| | YOMIDASHI | 読み出し (READ) |
| | YOBU | 呼ぶ (CALL) |
| | KORU | |
| ELS00022 | MEMO | |
| | KOMENTO | |
| | BIKO | 備考 (REMARKS) |
| | HOSOKUSETSUMEI | 補足説明 (SUPPLEMENTARY EXPLANATION) |
| ELS00030 | GOJUON | 五十音、50音 (50 PHONETIC CHARACTERS) |
| ELS00031 | MEISHO | 名称 (NAME) |
| | NAMAE | 名前 (NAME) |
| ELS00032 | RABERUMEI | ラベル名 (LABEL) |
| | TOROKUMEI | 登録名 (REGISTERED NAME) |
| ELS00033 | SHURUI | 種類 (TYPE) |
| | SHUBETSU | 種別 (TYPE) |
| | TAIPU | |
| ELS00034 | MODO | |
| ELS00040 | BOSHI | 防止 (PREVENT) |
| | FUSEGU | 防ぐ (AVOID) |
| | YOKUSHI | 抑止 (INHIBIT) |
| | SASENAI | させない (PROHIBIT) |
| | SASENAKU | させなく (DISABLE) |

FIG. 21B

| GROUP ID | SPEECH RECOGNITION RESULT | |
|---|---|---|
| | KATAKANA | KANA/KANJI |
| ELS00050 | SAISHO | 最初 (FIRST) |
| | ATAMA | 頭 (HEAD) |
| | SENTO | 先頭 (TOP) |
| ELS00051 | SAIGO | 最後 (LAST) |
| | SAISHU | 最終 (FINAL) |
| | MATSUBI | 末尾 (END) |
| | OSHIRI | お尻 (BOTTOM) |
| ELS00060 | RENZOKU | 連続 (SUCCESSIVE) |
| | TSUZUKETE | 続けて (CONTINUOUSLY) |
| ELS00061 | DOJI | 同時 (SIMULTANEOUSLY) |
| | AWASETE | 合わせて (AT THE SAME TIME) |
| ELS00062 | SHINKI | 新規 (NEW) |
| | ATARASHIKU | 新しく (NEWLY) |
| | ATARASHII | 新しい (NEW) |
| | ARATA | 新た (NEW) |
| ELS00070 | TSUKE | 付け (ADD) |
| | TSUIKA | 追加 (ADDITION) |
| | FUKA | 付加 (ADDED) |
| | TSUKI | 付き (WITH) |
| | FUKUMU | 含む (INCLUDE) |
| | KOMI | 込み (INCLUDED) |
| | TENPU | 添付 (ATTACHED) |
| ELS00071 | MOJIRETSU | 文字列 (CHARACTER STRING) |
| | TEKISUTO | |
| ELS00072 | HAN'I | 範囲 (RANGE) |
| ELS00073 | SHINPURU | |
| | TANJUN | 単純 (SIMPLE) |
| ELS00074 | FURU | |
| ELS00075 | JOKEN | 条件 (CONDITION) |
| ELS00080 | SANSHO | 参照 (REFERENCE) |

FROM FIG. 21B

| | | |
|---|---|---|
| ELS00081 | KOSHIN | 更新 (UPDATE) |
| | APPUDETO | |
| | RIRODO | |
| | SAISHIN | 最新 (LATEST) |
| ELS00082 | JUNKYO | 準拠 (COMPLIANT) |
| ELS00083 | UKETSUKE | 受付 (ACCEPT) |
| ELS00084 | KEKKA | 結果 (RESULT) |
| ELS00085 | REPOTO | |
| | RIPOTO | |
| | HOKOKUSHO | 報告書 (REPORT) |
| ELS00086 | TAIMA | |
| ELS00087 | HIZUKE | 日付 (DATE) |
| | NICHIJI | 日時 (TIME AND DATE) |
| | JIKOKU | 時刻 (TIME) |
| | JIKAN | 時間 (TIME) |
| ELS00090 | MACHI | 待ち (WAIT) |
| | TAIKI | 待機 (STANDBY) |
| ELS00091 | MAE | 前 (BEFORE) |
| ELS00092 | ATO | 後 (AFTER) |
| | GO | 後 (LATER) |
| ELS00093 | SUMI | 済み (FINISHED) |
| | ZUMI | 済み (DONE) |
| ELS00100 | DEFORUTO | |
| ELS00101 | MEIN | |
| | OMONA | 主な (MAIN) |
| | SHUYO | 主要 (MAJOR) |
| ELS00102 | SABU | |
| | FUKUJITEKINA | 副次的な (SUBSIDIARY) |
| | HOJO | 補助 (AUXILIARY) |

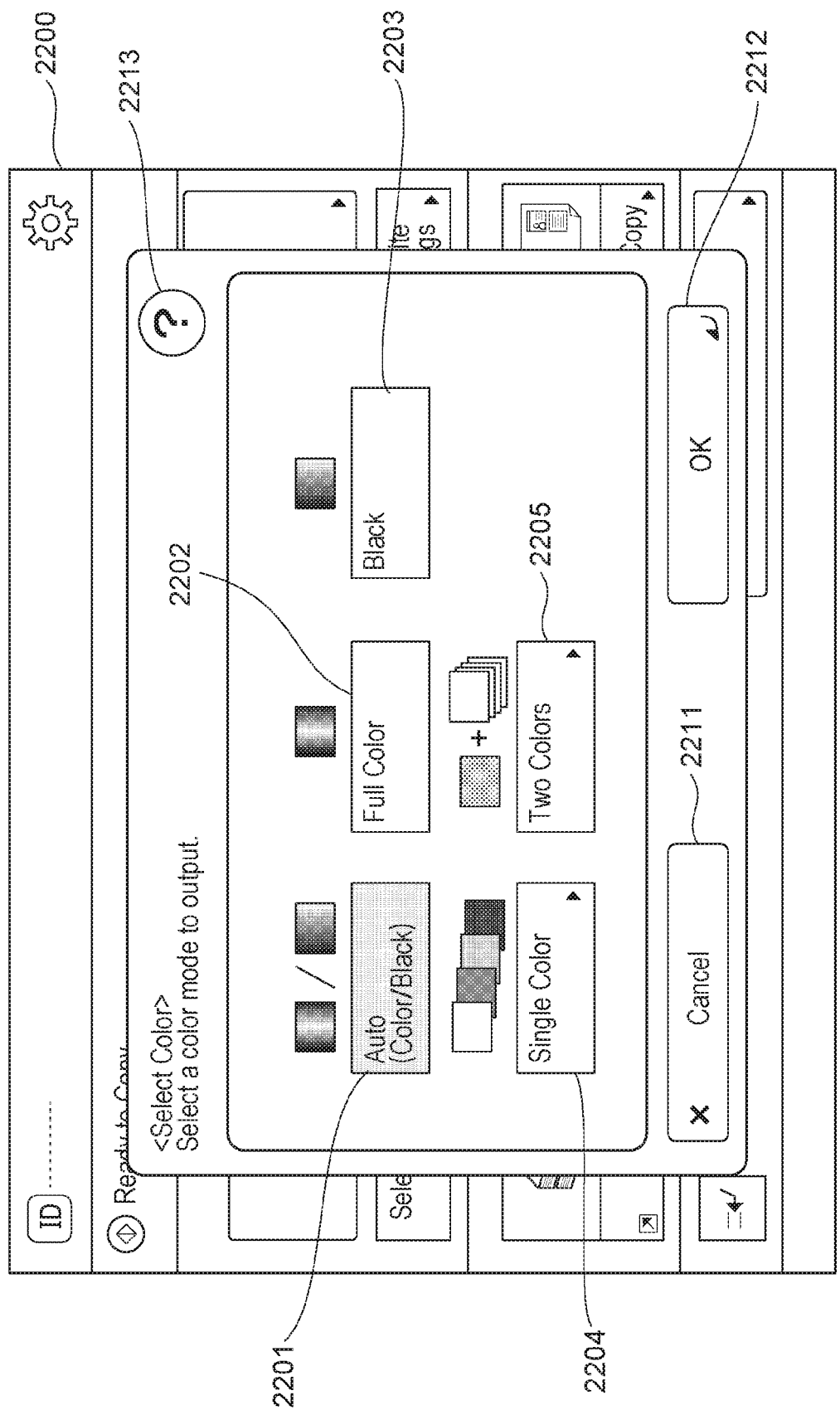

FIG. 22B

| UI COMPONENT (TOUCH AND SPEECH OPERABLE) | | | SCREEN CONTROL DURING OPERATION | INTERNAL PROCESSING DURING OPERATION |
|---|---|---|---|---|
| No. | TYPE | LABEL | | |
| 2201 | BUTTON | Auto (Color/Black) | HIGHLIGHT THE BUTTON | |
| 2202 | BUTTON | Full Color | HIGHLIGHT THE BUTTON | |
| 2203 | BUTTON | Black | HIGHLIGHT THE BUTTON | |
| 2204 | BUTTON | Single Color | TRANSITION TO SINGLE COLOR ADVANCED SETTINGS SCREEN | |
| 2205 | BUTTON | Two Colors | TRANSITION TO TWO COLORS ADVANCED SETTINGS SCREEN | |
| 2211 | BUTTON | Cancel | TRANSITION TO COPY TOP SCREEN | |
| 2212 | BUTTON | OK | TRANSITION TO COPY TOP SCREEN AND DISPLAY SET VALUE ON SCREEN | |
| 2213 | BUTTON | | TRANSITION TO HELP SCREEN | |
| 203 | HARDWARE KEY | | TRANSITION TO COPY TOP SCREEN | RESET JOB PARAMETERS TO DEFAULTS |
| 207 | HARDWARE KEY | | TRANSITION TO COPY JOB START SCREEN | START EXECUTION OF COPY JOB |

FIG. 22C

| UI COMPONENT (SPEECH OPERABLE) | | SCREEN CONTROL DURING OPERATION | INTERNAL PROCESSING DURING OPERATION |
|---|---|---|---|
| No. | TYPE | CONTENT | | |
| | | | | |

FIG. 22D

| No. | GROUP ID SET | EXAMPLE OF USER SPEECH DURING OPERATION | TOUCH COORDINATE RANGE |
|---|---|---|---|
| 2201 | DGR00008<br>DGR00008+COL00000+COL00102 | ・自動 (AUTO)<br>・自動カラー白黒 (AUTO, COLOR, BLACK AND WHITE) | X:165, Y:245<br>W:125, H:45 |
| 2202 | COL00201 | ・フルカラー (FULL COLOR) | X:335, Y:245<br>W:125, H:45 |
| 2203 | COL00102 | ・白黒 (BLACK AND WHITE) | X:505, Y:245<br>W:125, H:45 |
| 2204 | COL00110+COL00000 | ・単色カラー (SINGLE COLOR) | X:165, Y:355<br>W:125, H:45 |
| 2205 | COL00111+COL00000 | ・2色カラー (TWO COLORS) | X:335, Y:355<br>W:125, H:45 |
| 2211 | OPR00013 | ・キャンセル (CANCEL) | X:110, Y:475<br>W:210, H:35 |
| 2212 | OPR00010 | ・OK (OK) | X:480, Y:475<br>W:210, H:35 |
| 2213 | FNC00008 | ・ヘルプ (HELP) | X:655, Y:95<br>W:50, H:50 |
| 203 | OPR00045 | ・リセット (RESET) | |
| 207 | OPR00011 | ・スタート (START) | |

FIG. 23B

| UI COMPONENT (TOUCH AND SPEECH OPERABLE) | | | SCREEN CONTROL DURING OPERATION | INTERNAL PROCESSING DURING OPERATION |
|---|---|---|---|---|
| No. | TYPE | LABEL | | |
| 2301 | BUTTON | 1-Sided ▶ 2-Sided | HIGHLIGHT THE BUTTON | |
| 2302 | BUTTON | 2-Sided ▶ 1-Sided | HIGHLIGHT THE BUTTON | |
| 2303 | BUTTON | 2-Sided ▶ 2-Sided | HIGHLIGHT THE BUTTON | |
| 2304 | BUTTON | Book ▶ 2-Sided | HIGHLIGHT THE BUTTON | |
| 2321 | BUTTON | Set Details | TRANSITION TO FLIPPING-FORMAT ADVANCED SETTINGS SCREEN (2400) | |
| 2331 | BUTTON | Cancel Settings | TRANSITION TO COPY TOP SCREEN | |
| 2332 | BUTTON | OK | TRANSITION TO COPY TOP SCREEN AND DISPLAY SET VALUE ON SCREEN | |
| 2333 | BUTTON | | TRANSITION TO HELP SCREEN | |
| 203 | HARDWARE KEY | | TRANSITION TO COPY TOP SCREEN | RESET JOB PARAMETERS TO DEFAULTS |
| 207 | HARDWARE KEY | | TRANSITION TO COPY JOB START SCREEN | START EXECUTION OF COPY JOB |

FIG. 23C

| UI COMPONENT (SPEECH OPERABLE) | | | SCREEN CONTROL DURING OPERATION | INTERNAL PROCESSING DURING OPERATION |
|---|---|---|---|---|
| No. | TYPE | CONTENT | | |
| 2311 | DISPLAY LABEL | SET VALUE FOR FLIPPING FORMAT | DISPLAY SET VALUE | CHECK THE SET VALUE RANGE BASED ON INFORMATION IN FLIPPING-FORMAT ADVANCED SETTINGS SCREEN (2400) |

FIG. 23D

| No. | GROUP ID SET | EXAMPLE OF USER SPEECH DURING OPERATION | TOUCH COORDINATE RANGE |
|---|---|---|---|
| 2301 | SID00001+SID00000<br>SID00001+SHT00006+SID00000 | ・片面を両面で (FROM 1-SIDED TO 2-SIDED)<br>・片面原稿を両面でコピーして (COPY 1-SIDED ORIGINALS ON BOTH SIDES) | X:87, Y:228<br>W:125, H:45 |
| 2302 | SID00000+SID00001<br>SID00000+SHT00006+SID00001 | ・両面を片面で (FROM 2-SIDED TO 1-SIDED)<br>・両面原稿を片面にして (MAKE 1-SIDED COPIES OF 2-SIDED ORIGINAL) | X:87, Y:388<br>W:125, H:45 |
| 2303 | SID00000+SID00000<br>SID00000+SHT00006+SID00000<br>FNC00003+FNC00002+SID00000 | ・両面から両面 (FROM 2-SIDED TO 2-SIDED)<br>・両面原稿をそのまま両面 (MAKE 2-SIDED COPY OF 2-SIDED ORIGINAL)<br>・スキャンもプリントも両面で (SCAN AND PRINT ON BOTH SIDES) | X:273, Y:228<br>W:125, H:45 |
| 2304 | LYT00022+SID00000<br>POS00023+LYT00030+LYT00000<br>+SID00000 | ・見開きから両面 (FROM BOOK TYPE TO 2-SIDED)<br>・左右のページを分割して両面コピー (SEPARATE LEFT AND RIGHT PAGES AND COPY THEM ON BOTH SIDES) | X:273, Y:388<br>W:125, H:45 |
| 2321 | OPR00048+OPR00040<br>LYT00023+OPR00040 | ・詳細設定 (SET THE DETAILS)<br>・開き方を選択 (SELECT FLIPPING FORMAT) | X:480, Y:405<br>W:50, H:50 |
| 2331 | OPR00013<br>OPR00044 | ・キャンセル、設定を中止 (CANCEL STOP SETTING)<br>・設定を取り消し (CANCEL SETTINGS) | X:43, Y:505<br>W:210, H:35 |
| 2332 | OPR00010<br>OPR00012 | ・OK、この値で確定 (OK, ENTER THIS VALUE)<br>・設定完了 (SETTING HAS BEEN COMPLETED) | X:548, Y:505<br>W:210, H:35 |
| 2333 | FNC00008 | ・ヘルプ (HELP) | X:725, Y:65<br>W:50, H:50 |
| 203 | OPR00045<br>ELS00100+OPR00040+OPR00022 | ・リセット (RESET)<br>・デフォルト設定に戻す (RESET TO DEFAULTS) | |
| 207 | OPR00011 | ・スタート、コピーを開始して (START, START COPYING) | |
| 2311 | LYT00023+POS00023+LYT00023<br>LYT00023+POS00023+LYT00022 | ・開き方を左右開きにして (SET FLIPPING FORMAT TO BOOK TYPE)<br>・コピーの開きを上下開きに変更 (CHANGE PAGE FLIPPING FORMAT TO CALENDAR TYPE) | — |

FIG. 24B

| UI COMPONENT (TOUCH AND SPEECH OPERABLE) | | | SCREEN CONTROL DURING OPERATION | INTERNAL PROCESSING DURING OPERATION |
|---|---|---|---|---|
| No. | TYPE | LABEL | | |
| 2401 | BUTTON | BOOK TYPE | HIGHLIGHT THE BUTTON | |
| 2402 | BUTTON | CALENDAR TYPE | HIGHLIGHT THE BUTTON | |
| 2411 | BUTTON | OK | TRANSITION TO TWO-SIDED COPY SETTINGS SCREEN (2300) AND DISPLAY SET VALUE | |
| 2421 | BUTTON | | TRANSITION TO HELP SCREEN | |
| 203 | HARDWARE KEY | | TRANSITION TO COPY TOP SCREEN | RESET JOB PARAMETERS TO DEFAULTS |
| 207 | HARDWARE KEY | | TRANSITION TO COPY JOB START SCREEN | START EXECUTION OF COPY JOB |

FIG. 24C

| UI COMPONENT (SPEECH OPERABLE) | | SCREEN CONTROL DURING OPERATION | INTERNAL PROCESSING DURING OPERATION |
|---|---|---|---|
| No. | TYPE | CONTENT | | |
| | | | | |

FIG. 24D

| No. | GROUP ID SET | EXAMPLE OF USER SPEECH DURING OPERATION | TOUCH COORDINATE RANGE |
|---|---|---|---|
| 2401 | POS00023+LYT00023 | ・左右開き (BOOK TYPE) | X:215, Y:305 W:125, H:45 |
| 2402 | POS00022+LYT00023 | ・上下開き (CALENDAR TYPE) | X:455, Y:305 W:125, H:45 |
| 2411 | OPR00010<br>OPR00012 | ・OK、この値で確定 (OK, ENTER THIS VALUE)<br>・設定完了 (SETTING HAS BEEN COMPLETED) | X:480, Y:475 W:210, H:35 |
| 2421 | FNC00008 | ・ヘルプ (HELP) | X:655, Y:95 W:50, H:50 |
| 203 | OPR00045<br>ELS00100+OPR00040+OPR00022 | ・リセット (RESET)<br>・デフォルト設定に戻す (RESET TO DEFAULTS) | |
| 207 | OPR00011 | ・スタート、コピーを開始して (START, START COPYING) | |

FIG. 27B

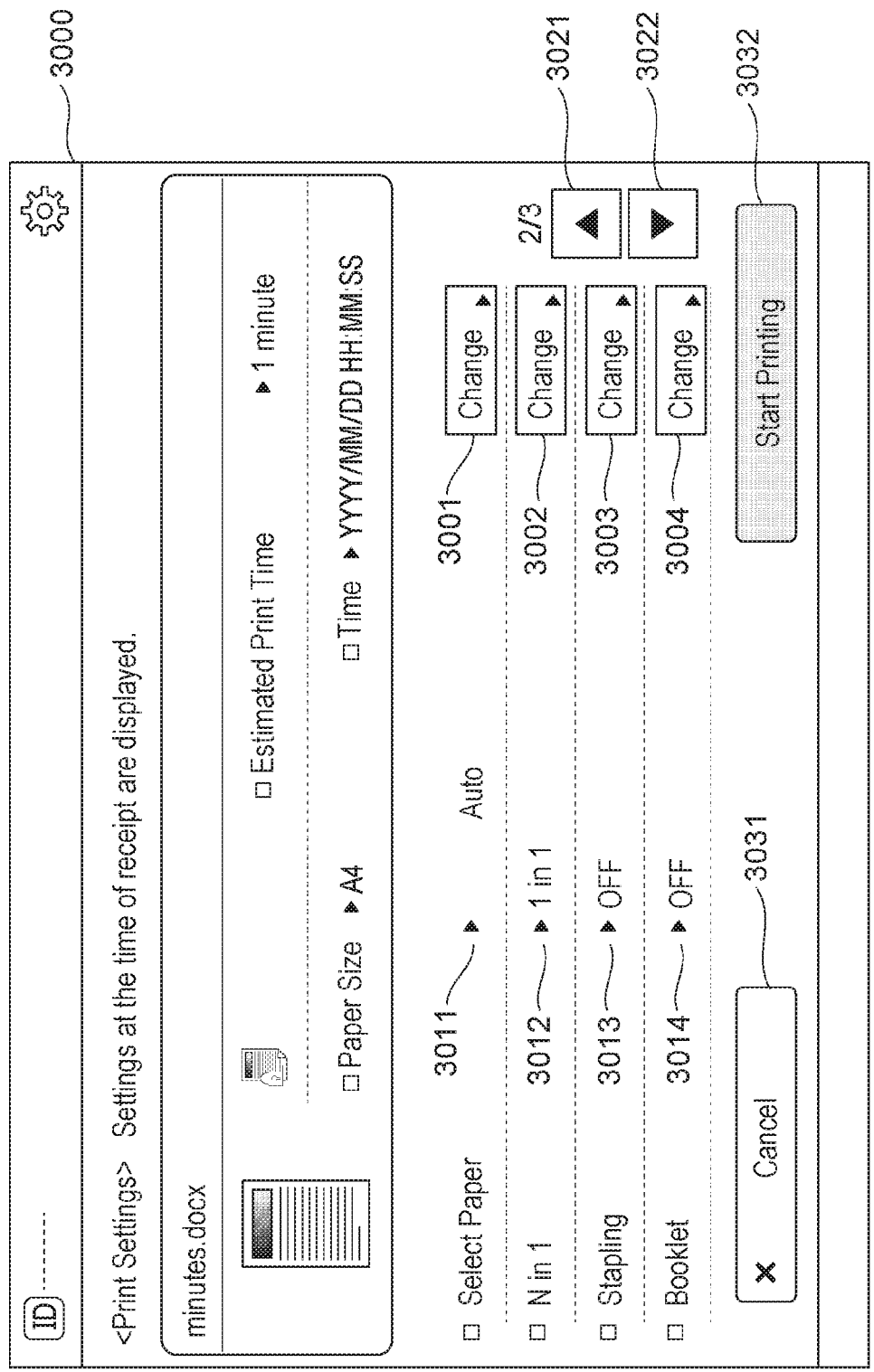

FIG. 30B

| No. | UI COMPONENT (TOUCH AND SPEECH OPERABLE) | | SCREEN CONTROL DURING OPERATION | INTERNAL PROCESSING DURING OPERATION |
|---|---|---|---|---|
| | TYPE | LABEL | | |
| 3001 | BUTTON | Change | TRANSITION TO PAPER SELECTION SCREEN | |
| 3002 | BUTTON | Change | TRANSITION TO "N in 1" SETTINGS SCREEN (3100) | |
| 3003 | BUTTON | Change | TRANSITION TO STAPLING SETTINGS SCREEN | |
| 3004 | BUTTON | Change | TRANSITION TO BOOKLET SETTINGS SCREEN | |
| 3021 | BUTTON | ◀ | TRANSITION TO PRINT SETTINGS SCREEN 1/3 | |
| 3022 | BUTTON | ▶ | TRANSITION TO PRINT SETTINGS SCREEN 3/3 | |
| 3031 | BUTTON | Cancel | TRANSITION TO PRINT JOB LIST SCREEN | |
| 3032 | BUTTON | Start Printing | TRANSITION TO PRINT JOB EXECUTION SCREEN | START EXECUTION OF PRINT JOB |
| 203 | HARDWARE KEY | | TRANSITION TO PRINT JOB LIST SCREEN | |

FIG. 30C

| UI COMPONENT (SPEECH OPERABLE) | | | SCREEN CONTROL DURING OPERATION | INTERNAL PROCESSING DURING OPERATION |
|---|---|---|---|---|
| No. | TYPE | CONTENT | | |
| 3011 | DISPLAY LABEL | SET VALUE FOR PAPER | DISPLAY SET VALUE | CHECK THE SET VALUE RANGE BASED ON INFORMATION IN PAPER SELECTION SCREEN |
| 3012 | DISPLAY LABEL | SET VALUE FOR N in 1 | SET VALUE IS 1 in 1: DISPLAY SET VALUE<br>SET VALUE IS 2 in 1: TRANSITION TO "2 in 1" ADVANCED SETTINGS SCREEN (3200)<br>SET VALUE IS 4 in 1: TRANSITION TO " 4 in 1" ADVANCED SETTINGS SCREEN (3210) | CHECK THE SET VALUE RANGE BASED ON INFORMATION IN "N in 1" SETTINGS SCREEN (3100) |
| 3013 | DISPLAY LABEL | SET VALUE FOR STAPLING | DISPLAY SET VALUE | CHECK THE SET VALUE RANGE BASED ON INFORMATION IN STAPLING SETTINGS SCREEN |
| 3014 | DISPLAY LABEL | SET VALUE FOR BOOKLET | DISPLAY SET VALUE | CHECK THE SET VALUE RANGE BASED ON INFORMATION IN BOOKLET SETTINGS SCREEN |

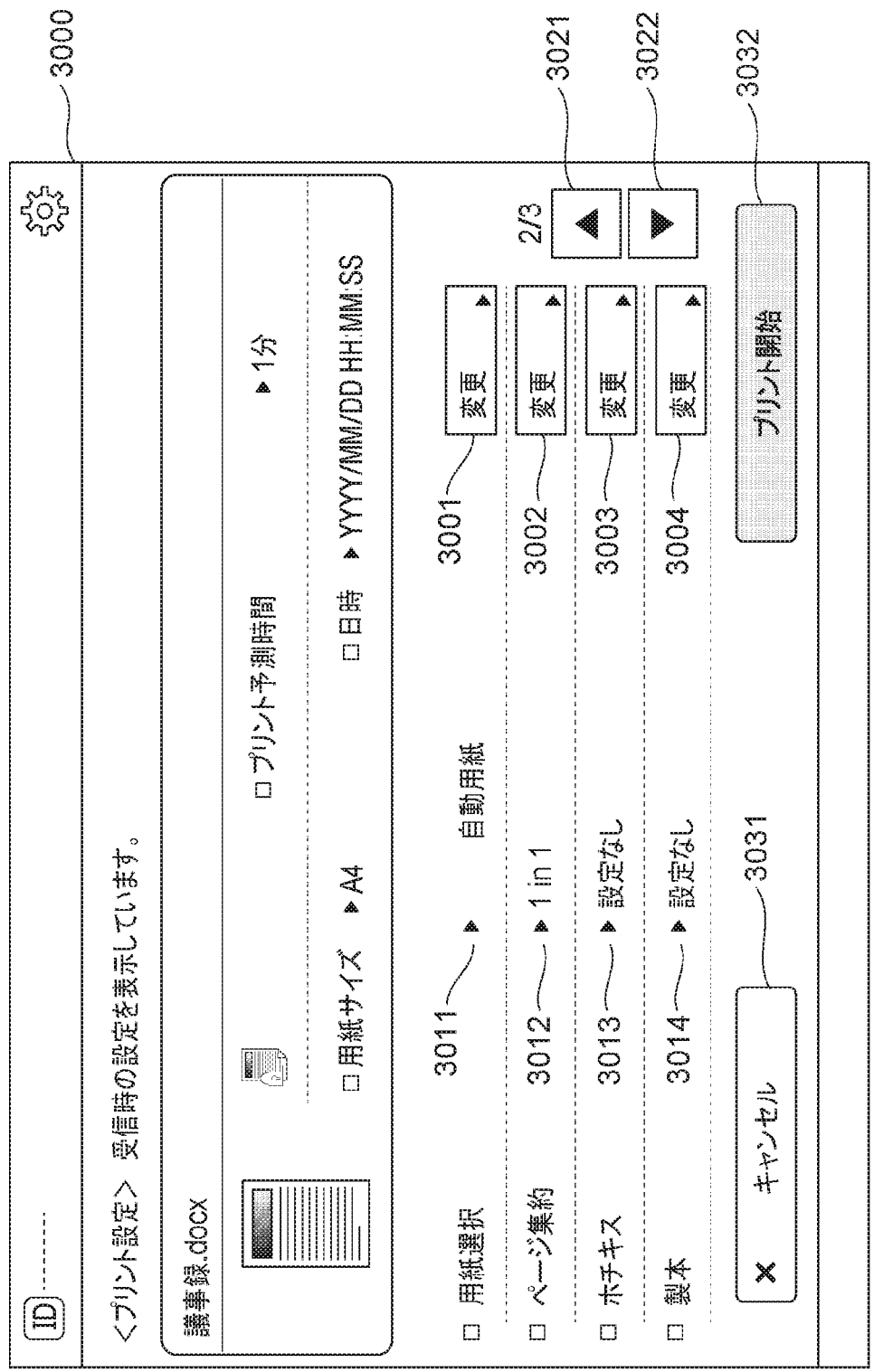

FIG. 30E

| No. | GROUP ID SET | EXAMPLE OF USER SPEECH DURING OPERATION | TOUCH COORDINATE RANGE |
|---|---|---|---|
| 3001 | PAP00000+OPR00041<br>PAP00000+OPR00040 | ・用紙を変更 (CHANGE THE PAPER)<br>・用紙選択の設定を変更 (CHANGE THE PAPER SETTING) | X:625, Y:300<br>W:95, H:30 |
| 3002 | LYT00030+LYT00003+OPR00041<br>LYT00030+LYT00000+OPR00040 | ・ページ集約を変更 (CHANGE "N in 1")<br>・ページの割り付けを変更 (CHANGE PAGE LAYOUT) | X:625, Y:345<br>W:95, H:30 |
| 3003 | FIN00010+OPR00041<br>FIN00010+OPR00040 | ・ホチキスを変更 (CHANGE STAPLING SETTING)<br>・ステイプルを設定 (SELECT STAPLING SETTING) | X:625, Y:390<br>W:95, H:30 |
| 3004 | LYT00021+OPR00041<br>LYT00021+OPR00040 | ・製本を変更 (CHANGE BOOKLET SETTING)<br>・製本を設定 (SELECT BOOKLET SETTING) | X:625, Y:435<br>W:95, H:30 |
| 3021 | OPR00022 | ・前の設定画面 (PREVIOUS SETTING SCREEN) | X:740, Y:370<br>W:40, H:40 |
| 3022 | OPR00021 | ・次の設定画面 (NEXT SETTING SCREEN) | X:740, Y:410<br>W:40, H:40 |
| 3031 | OPR00013<br>OPR00044 | ・キャンセル、設定を中止 (CANCEL, STOP SETTING)<br>・設定を取り消し (CANCEL SETTINGS) | X:43, Y:505<br>W:210, H:35 |
| 3032 | FNC00002+OPR00011 | ・プリント開始 (START PRINTING) | X:548, Y:505<br>W:210, H:35 |
| 203 | OPR00045 | ・リセット (RESET) | |
| 3011 | PAP00000+PAP001**+OPR00041<br>PAP00000+PAP002**+OPR00041<br>PAP00000+PAP001**+PAP002**+OPR00041<br>DEV00003+NUM0000*+PAP00000+OPR00041<br>NUM0000*+DEV00002+PAP00000+OPR00041 | ・用紙をA4に変更 (CHANGE PAPER TO A4)<br>・用紙を普通紙に変更 (CHANGE PAPER TO NORMAL PAPER)<br>・用紙をA3厚紙に変更 (CHANGE PAPER TO A3 CARDBOARD)<br>・カセット1の用紙に変更 (SELECT PAPER IN CASSETTE 1)<br>・2番目のトレイの用紙に変更 (SELECT PAPER IN SECOND TRAY) | — |
| 3012 | LYT00030+LYT00003+LYT0001*+OPR00041 | ・ページ集約を2in1に変更 (CHANGE "N in 1" TO "2 in 1") | — |
| 3013 | FIN00010+OPR00040+OPR00035+OPR00041<br>FIN00010+OPR00035+OPR00041 | ・ホチキスを設定無しに変更 (TURN STAPLING OFF)<br>・綴じ無しに変更 (CANCEL STAPLING) | — |
| 3014 | LYT00021+OPR00040+OPR00035+OPR00041 | ・製本を設定無しに変更 (CANCEL BOOKLET SETTING) | — |

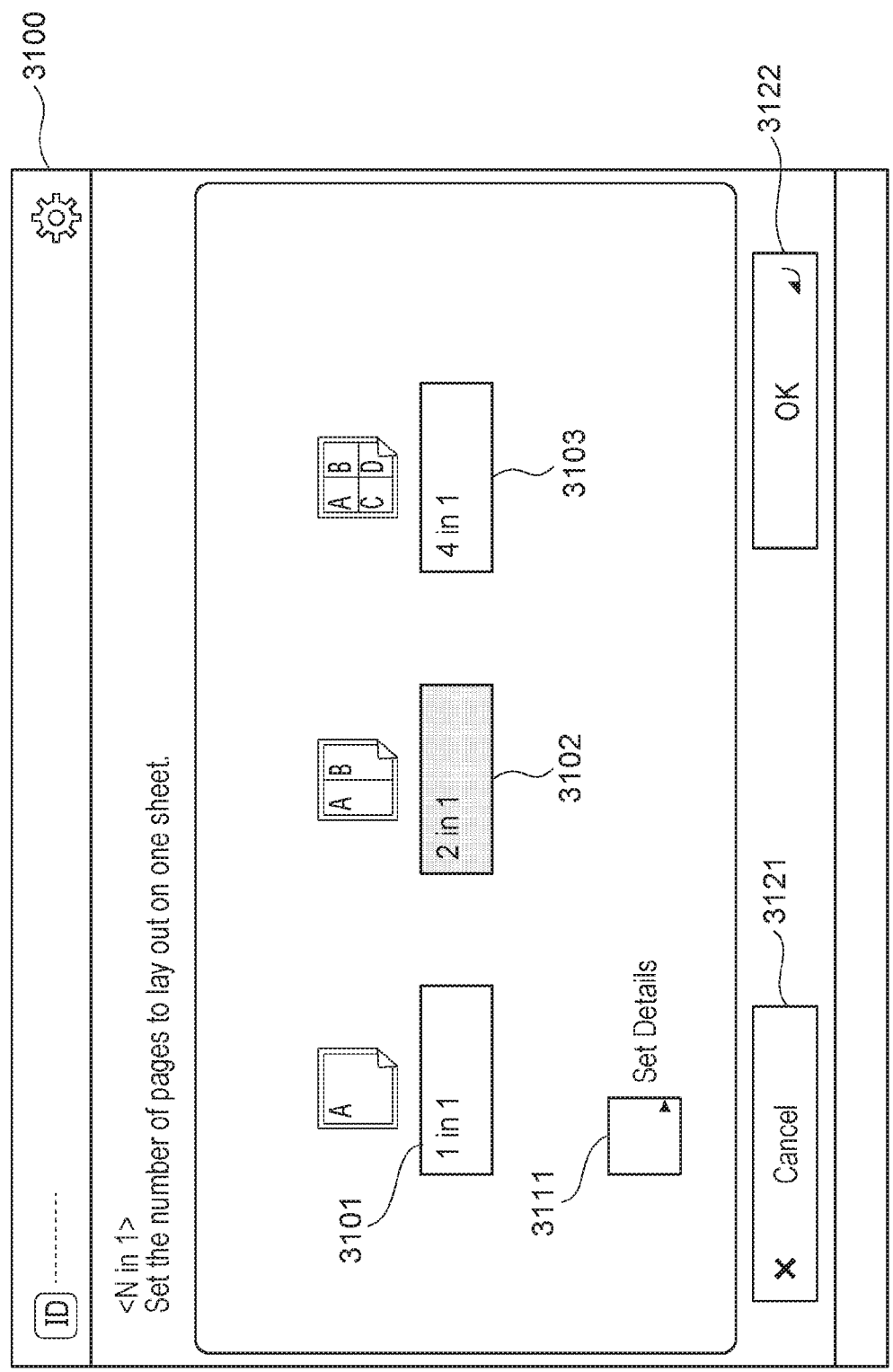

FIG. 31B

| UI COMPONENT (TOUCH AND SPEECH OPERABLE) | | | SCREEN CONTROL DURING OPERATION | INTERNAL PROCESSING DURING OPERATION |
|---|---|---|---|---|
| No. | TYPE | LABEL | | |
| 3101 | BUTTON | 1 in 1 | HIGHLIGHT THE BUTTON, DISABLE BUTTON 3111 | |
| 3102 | BUTTON | 2 in 1 | HIGHLIGHT THE BUTTON, ENABLE BUTTON 3111 | |
| 3103 | BUTTON | 4 in 1 | HIGHLIGHT THE BUTTON, ENABLE BUTTON 3111 | |
| 3111 | BUTTON | Set Details | BUTTON 3102 IS HIGHLIGHTED: TRANSITION TO "2 in 1" ADVANCED SETTINGS SCREEN 3200<br>BUTTON 3103 IS HIGHLIGHTED: TRANSITION TO "4 in 1" ADVANCED SETTINGS SCREEN 3210 | |
| 3121 | BUTTON | Cancel | TRANSITION TO PRINT SETTINGS SCREEN 2/3 | |
| 3122 | BUTTON | OK | TRANSITION TO PRINT SETTINGS SCREEN 2/3 AND DISPLAY SET VALUE ON SCREEN | |
| 203 | HARDWARE KEY | | TRANSITION TO PRINT SETTINGS SCREEN 2/3 | |

FIG. 31C

| UI COMPONENT (SPEECH OPERABLE) | | SCREEN CONTROL DURING OPERATION | INTERNAL PROCESSING DURING OPERATION |
|---|---|---|---|
| No. | TYPE | CONTENT | |
| | | | |

FIG. 31D

| No. | GROUP ID SET | EXAMPLE OF USER SPEECH DURING OPERATION | TOUCH COORDINATE RANGE |
|---|---|---|---|
| 3101 | LYT00010 |・1 in 1 | X:130, Y:285 W:130, H:50 |
| 3102 | LYT00011 | ・2 in 1 | X:330, Y:285 W:130, H:50 |
| 3103 | LYT00012 | ・4 in 1 | X:530, Y:285 W:130, H:50 |
| 3111 | OPR00048+OPR00040 LYT00000+ELS00006+OPR00040 | ・詳細設定 (SET DETAILS) ・割り付け順序を設定 (SET THE LAYOUT ORDER) | X:130, Y:410 W:50, H:50 |
| 3121 | OPR00013 OPR00044 | ・キャンセル、設定を中止 (CANCEL, STOP SETTING) ・設定を取り消し (CANCEL SETTINGS) | X:43, Y:505 W:210, H:35 |
| 3122 | OPR00010 OPR00012 | ・OK、この値で確定 (OK, ENTER THIS VALUE) ・設定完了 (SETTING HAS BEEN COMPLETED) | X:548, Y:505 W:210, H:35 |
| 203 | OPR00045 | ・リセット (RESET) | |

FIG. 34B
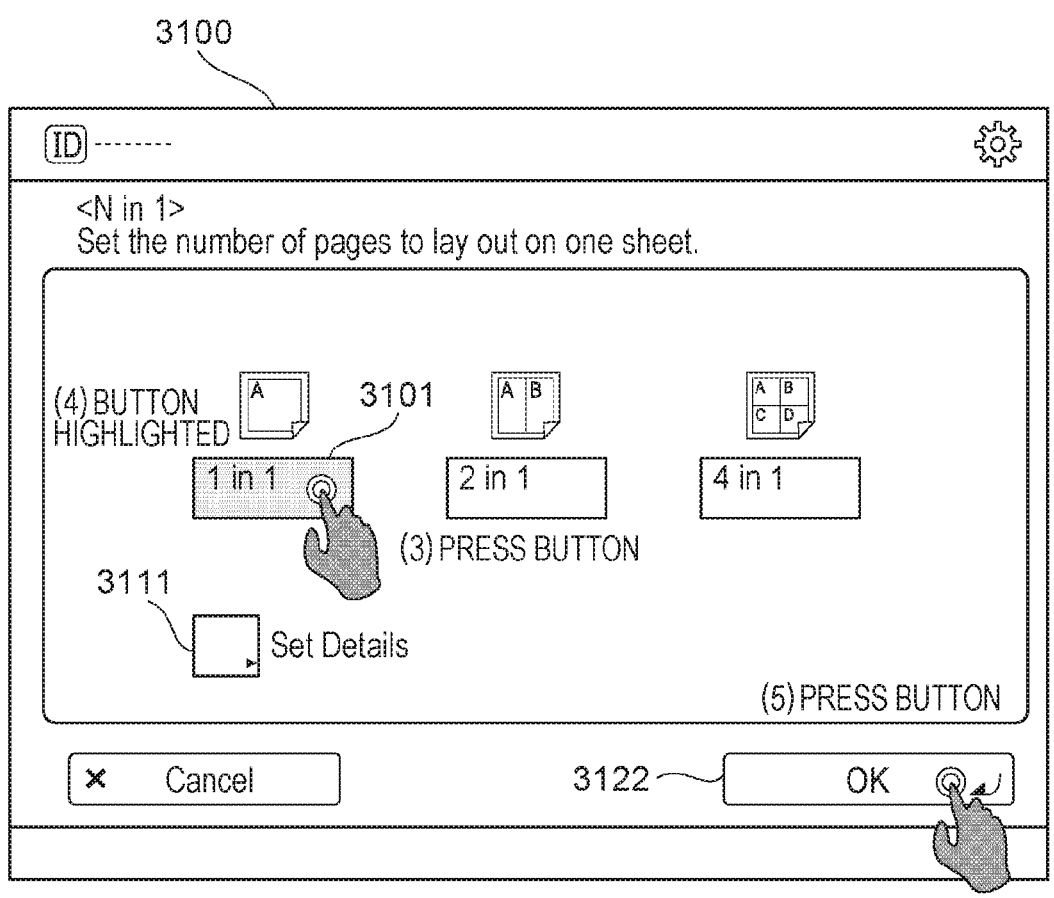
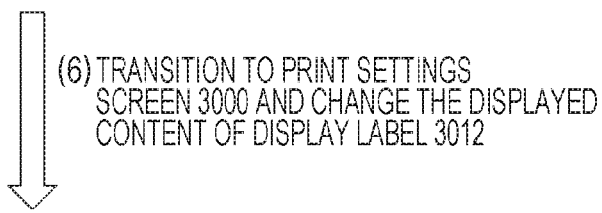

FIG. 34D
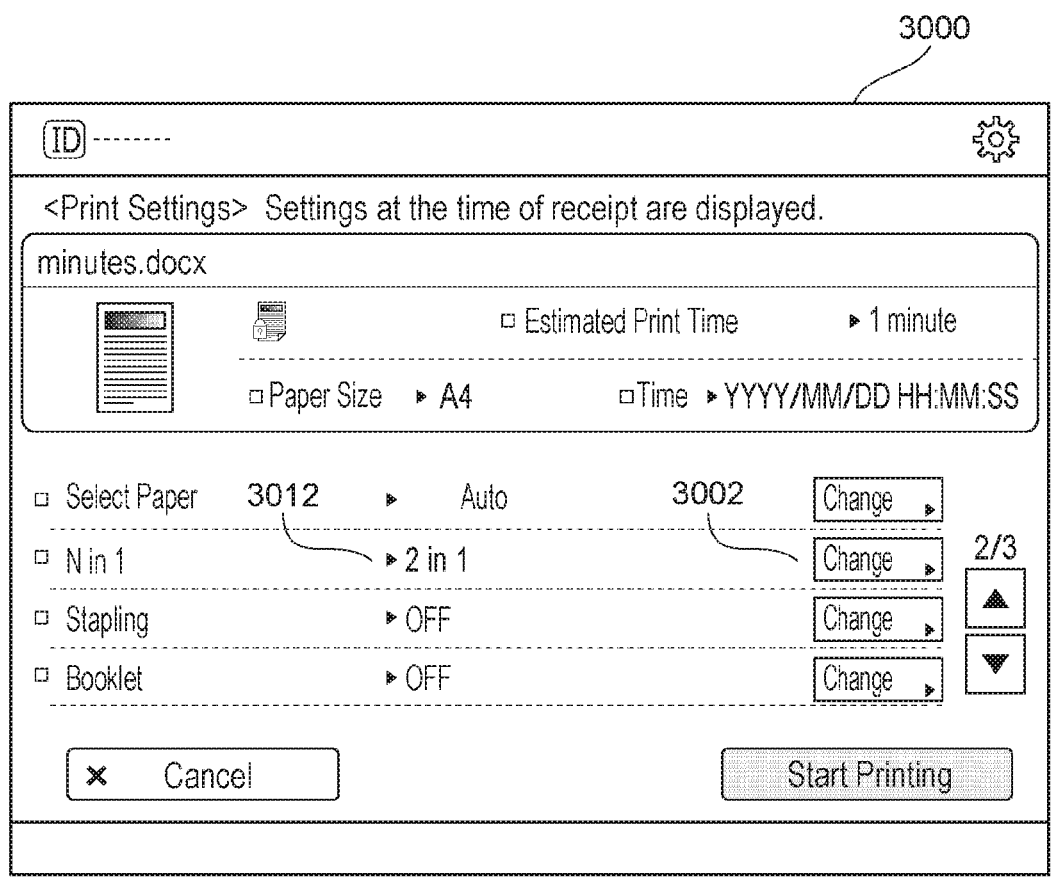
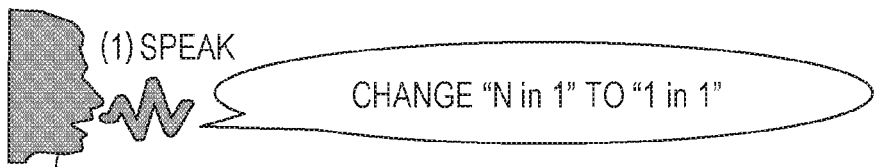
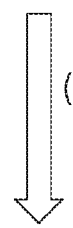

FIG. 35E
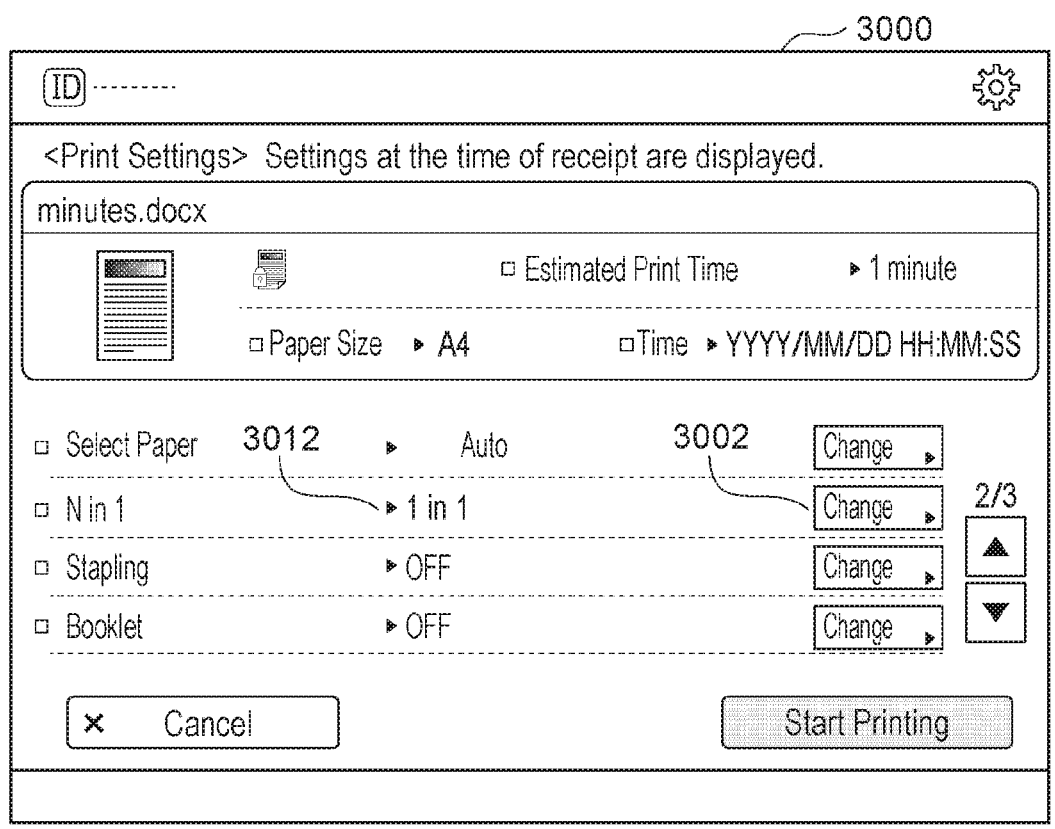
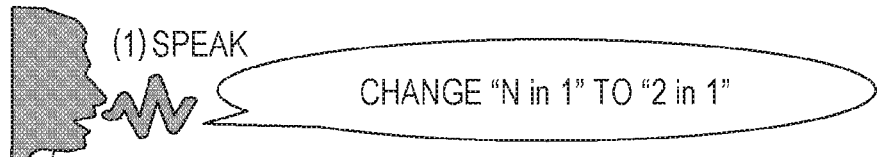

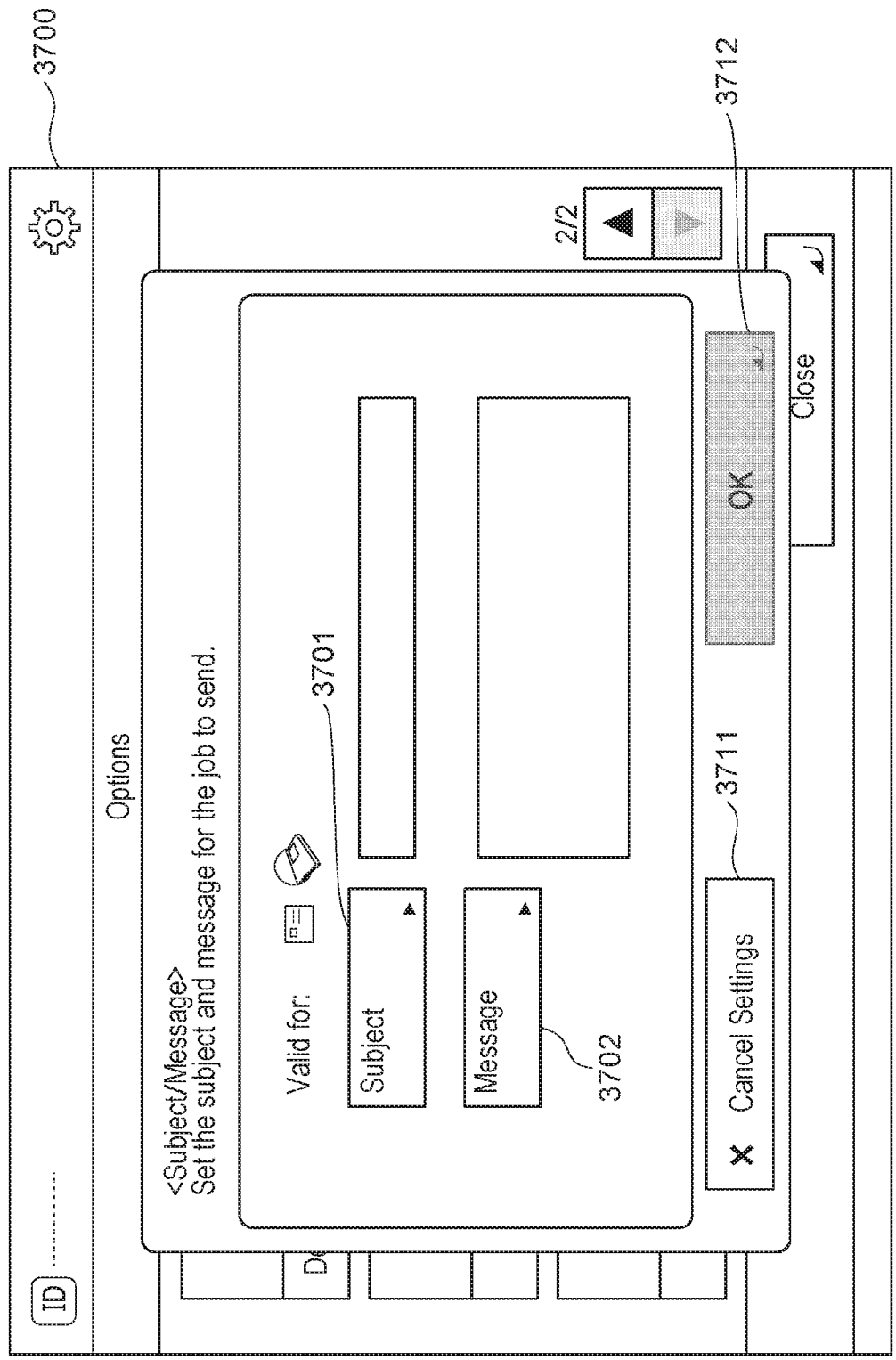

FIG. 37B

| UI COMPONENT (TOUCH AND SPEECH OPERABLE) | | | SCREEN CONTROL DURING OPERATION | INTERNAL PROCESSING DURING OPERATION |
|---|---|---|---|---|
| No. | TYPE | LABEL | | |
| 3701 | BUTTON | Subject | FOR TOUCH OPERATION: TRANSITION TO KEYBOARD INPUT SCREEN<br>FOR SPEECH OPERATION: TRANSITION TO SPEECH INPUT SCREEN | |
| 3702 | BUTTON | Message | FOR TOUCH OPERATION: TRANSITION TO KEYBOARD INPUT SCREEN (3800)<br>FOR SPEECH OPERATION: TRANSITION TO SPEECH INPUT SCREEN (3810) | |
| 3711 | BUTTON | Cancel Settings | TRANSITION TO SEND TOP SCREEN | |
| 3712 | BUTTON | OK | TRANSITION TO SEND TOP SCREEN AND DISPLAY SET VALUE ON SCREEN | |
| 203 | HARDWARE KEY | | TRANSITION TO SEND TOP SCREEN | RESET JOB PARAMETERS TO DEFAULTS |
| 207 | HARDWARE KEY | | TRANSITION TO SEND JOB START SCREEN | START EXECUTION OF SEND JOB |

FIG. 37C

| UI COMPONENT (SPEECH OPERABLE) | | SCREEN CONTROL DURING OPERATION | INTERNAL PROCESSING DURING OPERATION |
|---|---|---|---|
| No. | TYPE | CONTENT | | |
| | | | | |

FIG. 37D

| No. | GROUP ID SET | EXAMPLE OF USER SPEECH DURING OPERATION | TOUCH COORDINATE RANGE |
|---|---|---|---|
| 3701 | SND00061<br>SND00061+OPR00040<br>SND00061+OPR00050 | ・件名 (SUBJECT)<br>・メールのサブジェクトを設定 (SET THE MAIL SUBJECT)<br>・件名を入力したい (I WANT TO ENTER THE SUBJECT) | X:175, Y:230<br>W:125, H:45 |
| 3702 | SND00062<br>SND00062+OPR00040<br>SND00062+OPR00050 | ・本文 (MESSAGE)<br>・メール本文を設定 (SET THE MAIL MESSAGE)<br>・本文を入力したい (I WANT TO ENTER THE MESSAGE) | X:175, Y:310<br>W:125, H:45 |
| 3711 | OPR00013<br>OPR00044 | ・キャンセル、設定を中止 (CANCEL STOP SETTING)<br>設定を取り消し (CANCEL SETTINGS) | X:110, Y:475<br>W:210, H:35 |
| 3712 | OPR00010<br>OPR00012 | ・OK、この値で確定 (OK, ENTER THIS VALUE)<br>設定完了 (SETTING HAS BEEN COMPLETED) | X:480, Y:475<br>W:210, H:35 |
| 203 | OPR00045 | ・リセット (RESET) | |
| 207 | OPR00011 | ・スタート (START) | |

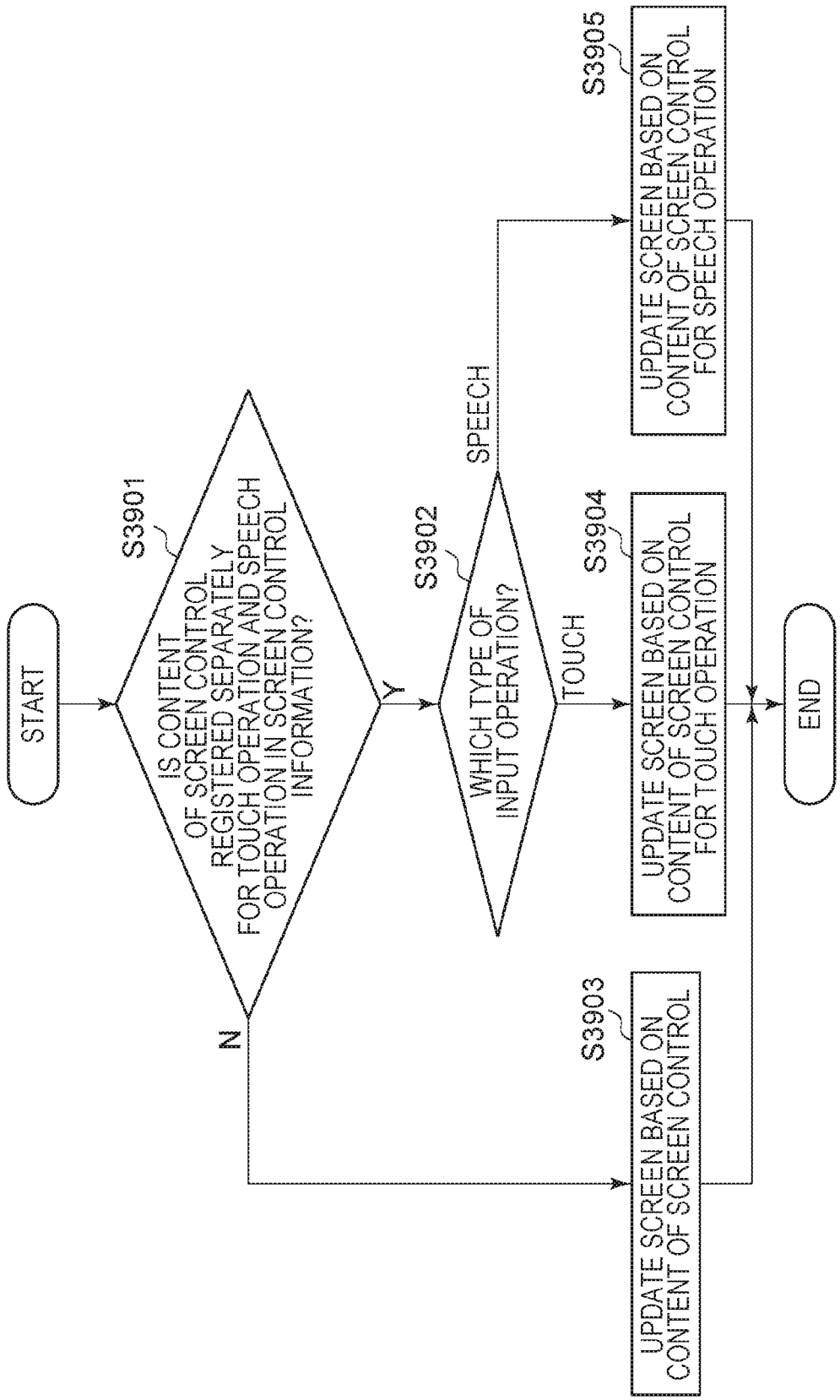

FIG. 40C
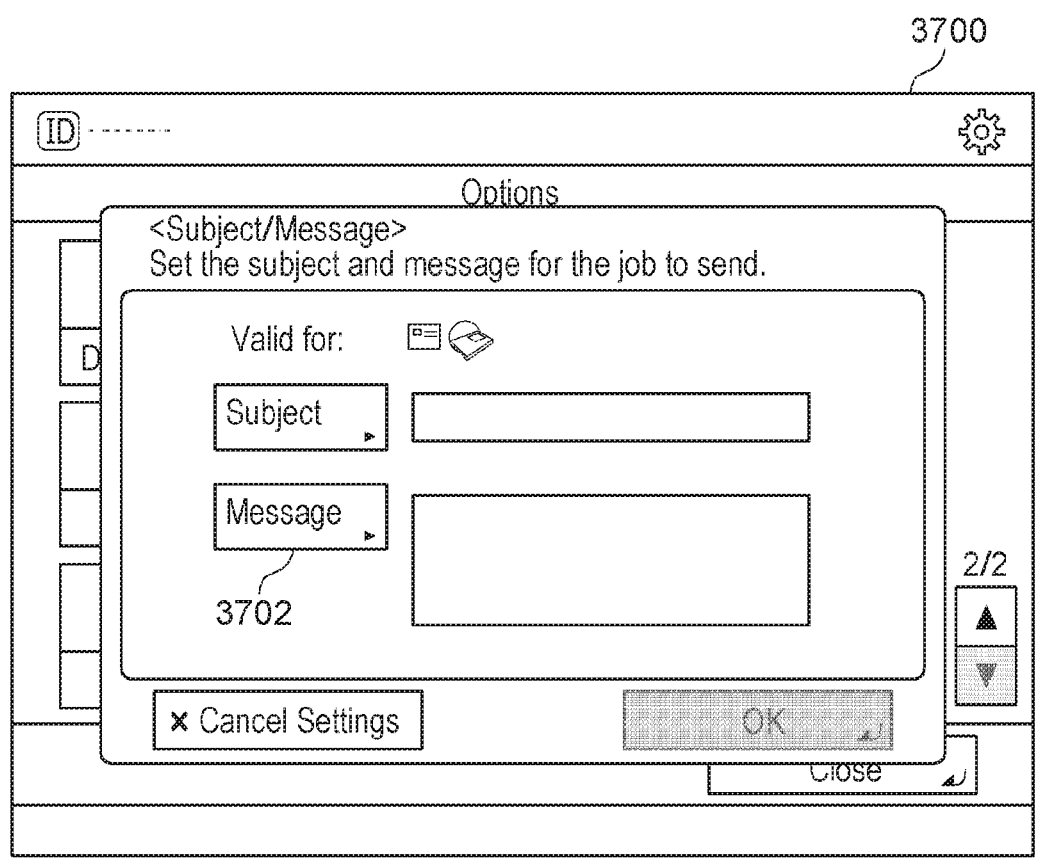
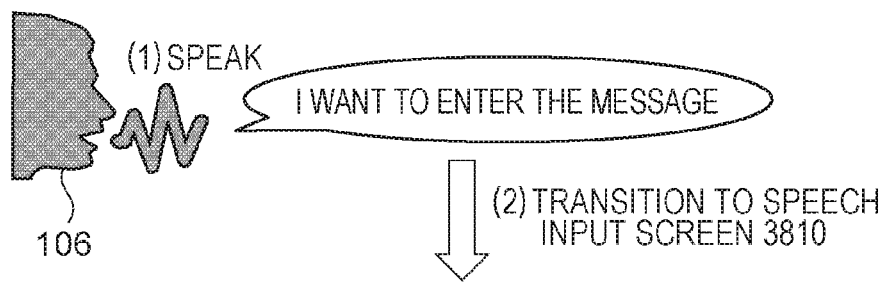

INFORMATION PROCESSING SYSTEM, INFORMATION PROCESSING APPARATUS, AND INFORMATION PROCESSING METHOD

BACKGROUND

Field

The present disclosure relates to an information processing system, an information processing apparatus, and an information processing method that are capable of enabling operation on displayed information by speech input. The information processing apparatus can be used as an image processing apparatus, such as a copier or a multifunction peripheral (MFP), and can also be used as a personal computer (PC) or a mobile terminal.

Description of the Related Art

With advances in speech recognition techniques in recent years, apparatuses that execute processing in response to a speech-based instruction have been widely used. Japanese Patent Laid-Open No. 2019-67258 discloses a system that executes processing for using images in response to an instruction provided by user's voice.

Japanese Patent Laid-Open No. 2019-67258 illustrates a method where major instructions, such as execution instructions directed to an image processing apparatus, are provided by voice. However, this document does not examine a method where detailed instructions, such as instructions to change settings, are provided by voice. Such an apparatus has a wide range of setting items, each of which has various screen configurations and ways of instructions appropriate for the item. To provide a system having high operability, it may be desirable to examine a speech-based instruction method appropriate for the configuration of each setting screen.

SUMMARY

The present disclosure provides an information processing system that is capable of enabling a speech-based instruction to be made in accordance with the configuration of a setting screen. In particular, the present disclosure provides an information processing system that is capable of enabling the user to give a speech-based instruction to change a set value of a setting item for which a selection object used to change the set value is on a destination screen displayed by transition from the current screen.

Specifically, the present disclosure provides an information processing system that includes a microphone configured to acquire sound, a display device configured to display information, and at least one controller. The at least one controller is configured to cause the display device to display a first screen at least including one setting item with a set value that can be changed by an instruction, cause the display device to display a second screen including a selection object for transition to the first screen, and acquire text data based on speech acquired through the microphone during display of the second screen and change the set value of the one setting item on the basis of the text data without causing the display device to display the first screen.

Further features will become apparent from the following description of exemplary embodiments with reference to the attached drawings.

BRIEF DESCRIPTION OF THE DRAWINGS

FIGS. 9A, 9B, and 9C present a sequence diagram illustrating interactions between the apparatuses included in the information processing system and also between the control programs of the apparatuses.

FIGS. 10A and 10B show other examples of group ID lists managed and used by the control program of the server.

FIGS. 11A, 11B, 11C, and 11D show other examples of group ID lists managed and used by the control program of the server.

FIGS. 12A, 12B, 12C, and 12D show other examples of group ID lists managed and used by the control program of the server.

FIGS. 13A and 13B show other examples of group ID lists managed and used by the control program of the server.

FIGS. 14A, 14B, and 14C show other examples of group ID lists managed and used by the control program of the server.

FIGS. 15A, 15B, 15C, and 15D show other examples of group ID lists managed and used by the control program of the server.

FIGS. 16A, 16B, 16C, and 16D show other examples of group ID lists managed and used by the control program of the server.

FIGS. 17A, 17B, and 17C show other examples of group ID lists managed and used by the control program of the server.

FIGS. 18A, 18B, and 18C show other examples of group ID lists managed and used by the control program of the server.

FIGS. 19A, 19B, and 19C show other examples of group ID lists managed and used by the control program of the server.

FIG. 20 shows another exemplary group ID list managed and used by the control program of the server.

FIGS. 21A, 21B, and 21C show other examples of group ID lists managed and used by the control program of the server.

FIG. 22A illustrates a screen displayed by the control program of the image forming apparatus, FIG. 22B illustrates screen control information managed and used by the control program. FIG. 22C illustrates screen control information managed and used by the control program. FIG. 22D illustrates operation-target determination information managed and used by the control program.

FIG. 23B illustrates screen control information managed and used by the control program, FIG. 23C illustrates screen control information managed and used by the control program, FIG. 23D illustrates operation-target determination information managed and used by the control program.

FIG. 24B illustrates screen control information managed and used by the control program. FIG. 24C illustrates screen control information managed and used by the control program. FIG. 24D illustrates operation-target determination information managed and used by the control program.

FIGS. 27A, 27B, 27C, and 27D illustrate interactions between the information processing system and the user.

FIG. 30A illustrates a screen displayed by the control program of the image forming apparatus, FIG. 30B illustrates screen control information managed and used by the control program. FIG. 30C illustrates screen control information managed and used by the control program. FIG. 30D illustrates a Japanese version of the screen illustrated in FIG. 30A, and FIG. 30E illustrates operation-target determination information managed and used by the control program.

FIG. 31A illustrates a screen displayed by the control program of the image forming apparatus, FIG. 31B illustrates screen control information managed and used by the control program, FIG. 31C illustrates screen control information managed and used by the control program. FIG. 31D illustrates operation-target determination information managed and used by the control program.

FIGS. 34A, 34B, 34C, 34D, and 34E are diagrams illustrating how a screen displayed by the control program of the image forming apparatus is updated.

FIGS. 35A, 35B, 35C, 35D, 35E, 35F, and 35G are diagrams illustrating how a screen displayed by the control program of the image forming apparatus is updated.

FIG. 37A illustrates a screen displayed by the control program of the image forming apparatus, FIG. 37B illustrates screen control information managed and used by the control program. FIG. 37C illustrates screen control information managed and used by the control program. FIG. 37D illustrates operation-target determination information managed and used by the control program.

FIG. 39 is a diagram illustrating a processing flow of the control program of the image forming apparatus.

FIGS. 40A, 40B, 40C, and 40D are diagrams illustrating how a screen displayed by the control program of the image forming apparatus is updated.

DESCRIPTION OF THE EMBODIMENTS

Embodiments of the present disclosure will now be described using specific configurations, with reference to the drawings. Note that configurations for implementing the present disclosure are not limited to those described in the embodiments. Some of the configurations described in the embodiments may be omitted or replaced with equivalents as long as similar advantageous effects are achievable.

First Embodiment (System Configuration)

Figure 1:
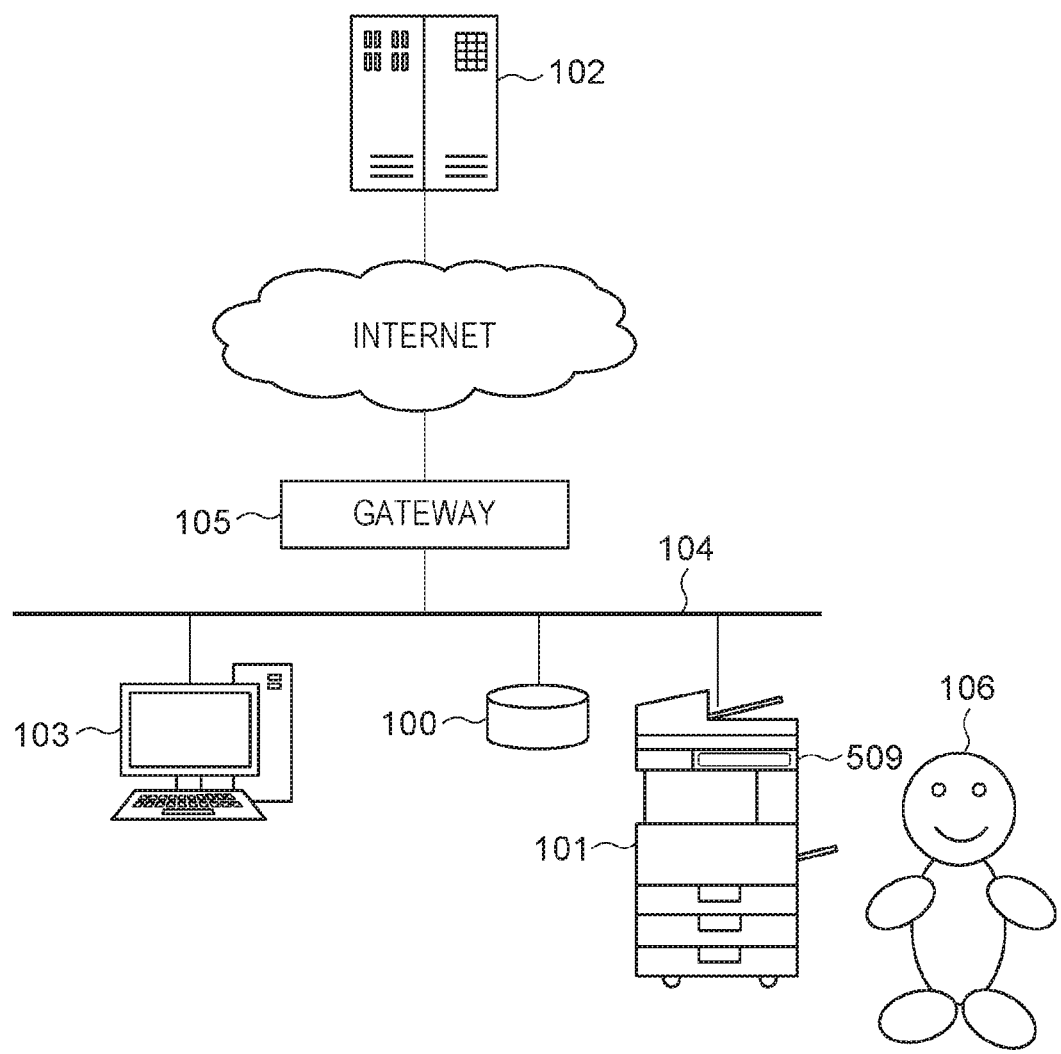
FIG. 1 illustrates a configuration of an information processing system.

FIG. 1 illustrates a configuration of an information processing system according to the present embodiment. As illustrated in FIG. 1, the information processing system includes an audio control apparatus 100, an image forming apparatus 101 (image processing apparatus), a server 102 (information processing apparatus), a client terminal 103, and a gateway 105.

The audio control apparatus 100, the image forming apparatus 101, and the client terminal 103 are capable of communicating with each other via the gateway 105 and a network 104 (local area network or LAN). Note that more than one audio control apparatus 100, more than one image forming apparatus 101, and more than one client terminal 103 may be configured to connect each other. The audio control apparatus 100, the image forming apparatus 101, and the client terminal 103 can communicate with the server 102 via the gateway 105 and the Internet.

In accordance with an instruction to start a speech operation (speech operation start instruction) from a user 106, the audio control apparatus 100 acquires speech of the user 106 and transmits coded audio data (audio information) to the server 102. The audio control apparatus 100 is, for example, a smart speaker. In the present embodiment, the audio control apparatus 100 and the image forming apparatus 101 are configured to be independent of each other. Alternatively, hardware components (or hardware blocks described below with reference to FIG. 3) and software functions (or software blocks described below with reference to FIG. 6) of the audio control apparatus 100 may be included in the image forming apparatus 101. That is, the configuration is not limited to that described above.

Although the image forming apparatus 101 described here is, for example, an MFP having multiple functions, such as copying, scanning, printing, faxing, and e-mailing, the image forming apparatus 101 may be a printer or scanner having a single function. The image forming apparatus 101 includes an operation panel 509. The following description assumes that the image forming apparatus 101 is a color laser beam MFP.

The server 102 performs speech recognition on audio data representing speech of the user 106 and acquired by the audio control apparatus 100. From the speech recognition result, the server 102 determines words (word information) that are related to setting operations and job execution of the image forming apparatus 101. Additionally, the server 102 generates text in accordance with the speech recognition result or the determined words, and synthesizes audio data for the audio control apparatus 100 to reproduce speech from the text. Machine learning using a neural network, such as deep learning, enables the server 102 to provide accurate results of speech recognition. For example, the server 102 performs learning for accurately recognizing speech of a distant user. Also, the server 102 supports natural language processing. For example, through morphological analysis, syntax analysis, semantic analysis, and context analysis, the server 102 can acquire relevant information (words, results of kana-kanji conversion) from natural language received. Such machine learning involves, for example, learning a leaning model on the basis of teacher data containing pairs of audio information and text information. Note that the "job" described above is a unit representing a series of image forming operations implemented by the image forming apparatus 101 (e.g., copying, scanning, or printing) using a print engine 513 or a scanner 515 (see FIG. 5).

The client terminal 103 is, for example, a PC used by the user 106. The client terminal 103 issues a print job for printing an electronic file on the image forming apparatus 101. The electronic file is stored, for example, in the client terminal 103, any server (not shown) on the Internet, or an external storage device 505 (see FIG. 5) of the image forming apparatus 101. The client terminal 103 receives image data scanned by the image forming apparatus 101. The operation of the client terminal 103 will not be described in further detail, as it is irrelevant to the series of descriptions of the present embodiment.

The network 104 enables the audio control apparatus 100, the image forming apparatus 101, the client terminal 103, and the gateway 105 to connect with one another. The network 104 enables transmission and reception of various types of data, such as audio data acquired by the audio control apparatus 100 and transmitted to the server 102, each data transmitted from the server 102, and print jobs and scan jobs.

The gateway 105 is, for example, a wireless LAN router that is compliant with the Institute of Electrical and Electronics Engineers (IEEE) 802.11 standard series, or may be capable of operating in accordance with a different wireless communication system. The gateway 105 may not necessarily need to be a wireless LAN router, and may be a wired LAN router compliant with an Ethernet standard, such as 10BASE-T, 100BASE-T, or 1000BASE-T, or may be capable of operating in accordance with a different wired communication system. Note that the IEEE 802.11 standard series described above includes a series of standards belonging to the IEEE 802.11, such as the IEEE 802.11a and IEEE 802.11b.

(Operation Panel of Image Forming Apparatus)

Figure 2:
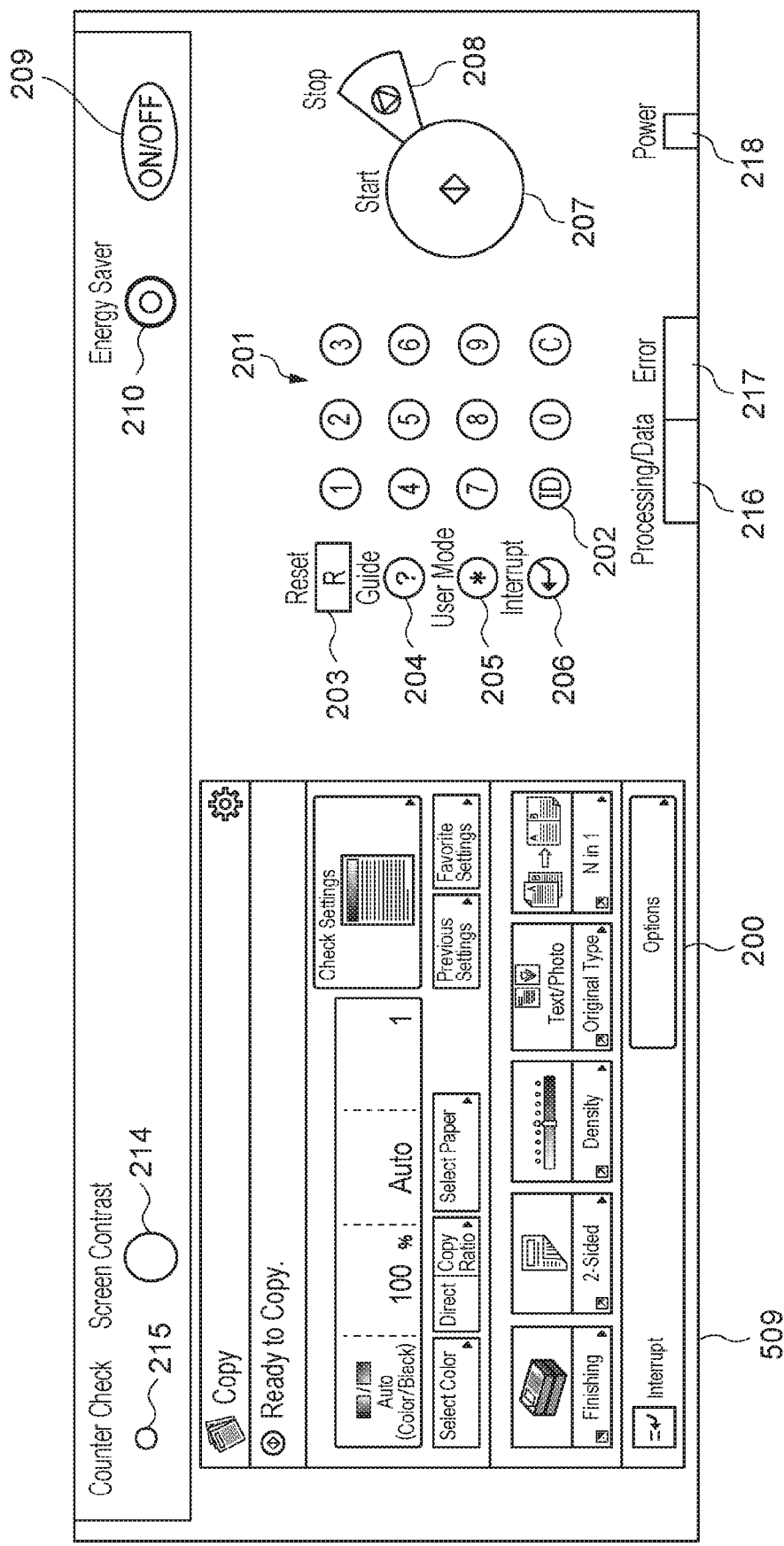
FIG. 2 illustrates a configuration of an operation panel.

FIG. 2 illustrates a configuration of the operation panel 509 of the image forming apparatus 101. The operation panel 509 is a display device that includes light-emitting diodes (LEDs) and a liquid crystal display (LCD), and displays operations of the user 106 and the internal states of the apparatus. The operation panel 509 also functions as an accepting device (input device) that accepts operations from the user 106. The operation panel 509 includes not only a plurality of hardware keys, but also a touch panel integral with the LCD. A display unit 200 is an LCD touch panel where primary mode setting and status display operations take place.

Keys 201 to 210 are hardware keys, such as tactile switches.

The key 201 represents a numeric keypad (including numeric keys) used to enter numeric values from 0 to 9. The key 202 is an identification (ID) key used for an authentication action (such as a login or logout action) when the apparatus is managed through user/department authentication.

The key 203 is a reset key used to reset the set mode, and the key 204 is a guide key used to display a screen showing a description of each mode. The key 205 is a user mode key used to display a user mode screen. The key 206 is an interrupt key used to perform interrupt copying.

The key 207 is a start key used to start copying, and the key 208 is a stop key used to stop a copy job in progress.

The key 209 is a soft power switch. Pressing the key 209 turns off the backlight of the LCD touch panel 200 and brings the apparatus into a low-power state. The key 210 is an energy saver key. Pressing the key 210 brings the apparatus into an energy saving state, and re-pressing the key 210 enables recovery from the energy saving state.

A key 214 is an adjustment key used to adjust the contrast of the LCD touch panel 200.

A key 215 is a counter check key. By pressing the key 215, a count screen showing the total number of copies made so far is displayed on the LCD touch panel 200.

An LED 216 is an LED indicating that a job is in progress or an image is being stored into an image memory. An LED 217 is an error LED indicating that the apparatus is in an error state. For example, the LED 217 indicates that a paper jam has occurred or a door is open. An LED 218 is a power LED indicating that the main switch of the apparatus is ON.

(Hardware Configuration of Audio Control Apparatus)

Figure 3:
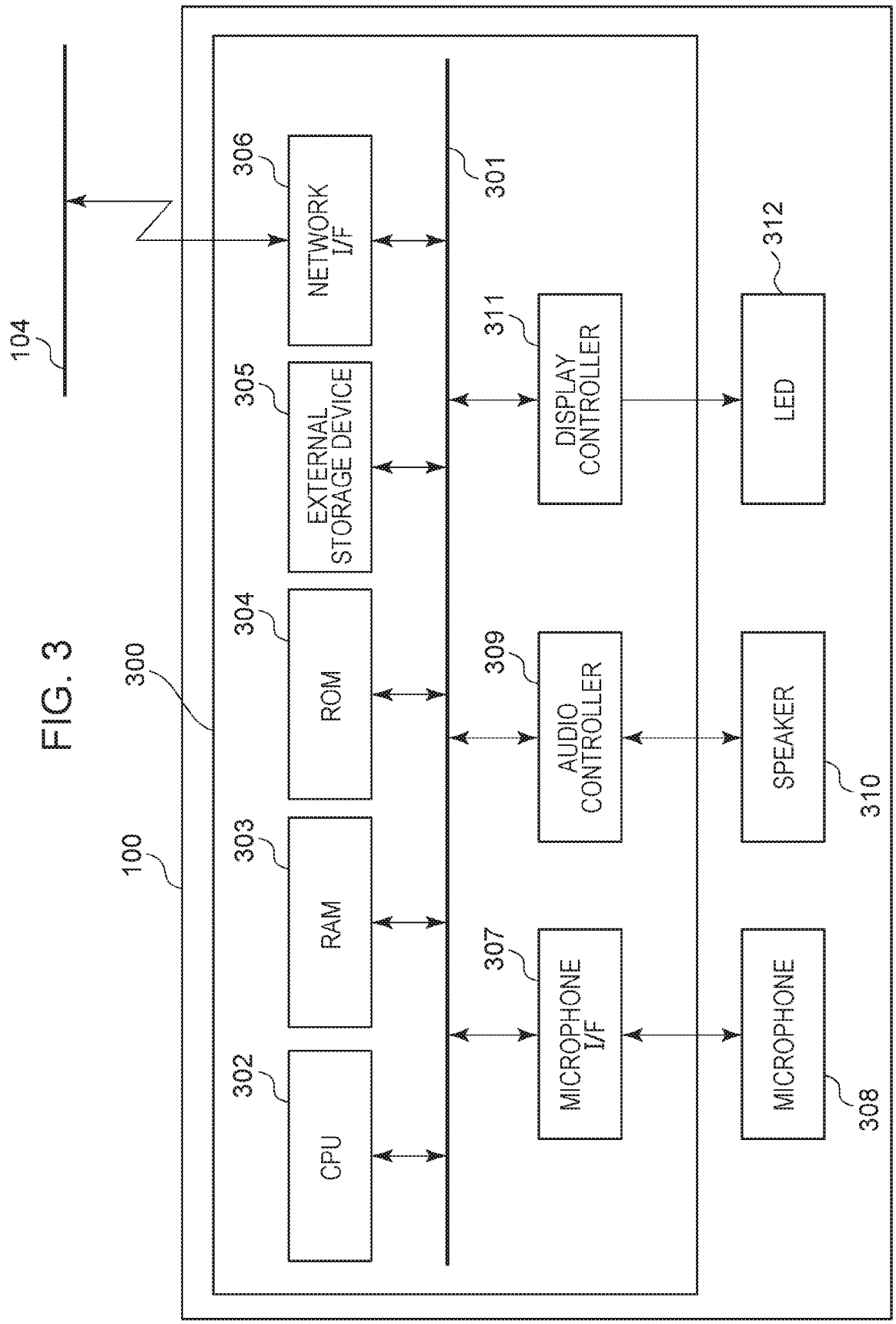
FIG. 3 is a diagram illustrating a hardware configuration of an audio control apparatus.

FIG. 3 is a diagram illustrating a hardware configuration of a controller unit 300 of the audio control apparatus 100 and devices included in the audio control apparatus 100.

As illustrated in FIG. 3, the controller unit 300 includes a central processing unit (CPU) 302, a random-access memory (RAM) 303, a read-only memory (ROM) 304, an external storage device 305, a network interface (I/F) 306, a microphone I/F 307, an audio controller 309, and a display controller 311, which are connected to a system bus 301 and capable of communicating with one another. The audio control apparatus 100 further includes devices accompanying the controller unit 300. The devices include a microphone 308 serving as a speech input device, a speaker 310 serving as an audio output device, and an LED 312 serving as a notification device.

The CPU 302 is a central processing unit that controls the overall operation of the controller unit 300. The RAM 303 is a volatile memory. The ROM 304 is a nonvolatile memory and stores a boot program for the CPU 302. The external storage device 305 (e.g., secure digital memory card or SD card) is a storage device with a larger capacity than the RAM 303. A control program executed by the controller unit 300 to control the audio control apparatus 100 is stored in the external storage device 305. The external storage device 305 may be a flash ROM, not the SD card, or may be replaced with a different type of storage device having a function equivalent to that of the SD card.

At startup (e.g., when the power is turned on), the CPU 302 executes the boot program stored in the ROM 304. The boot program is for reading the control program stored in the external storage device 305 and developing the read control program in the RAM 303. After executing the boot program, the CPU 302 executes the control program developed in the RAM 303 to carry out control. The CPU 302 stores, in the RAM 303, data used during execution of the control program, and performs reading from and writing to the RAM 303. Various settings required during execution of the control program can also be stored in the external storage device 305, and are read and rewritten by the CPU 302. The CPU 302 communicates with other devices on the network 104 via the network I/F 306.

The network I/F 306 includes a circuit and an antenna for performing communication in accordance with a wireless communication system based on the IEEE 802.11 standard series. The communication system does not necessarily need to be a wireless communication system, and may be a wired communication system based on the Ethernet standard.

The microphone I/F 307 connects to the microphone 308, converts speech spoken by the user 106 and received by the microphone 308 into coded audio data, and stores the data in the RAM 303 in accordance with an instruction from the CPU 302.

The microphone 308 is, for example, a small micro-electro mechanical systems (MEMS) microphone mounted on a smartphone, but may be any device capable of acquiring speech of the user 106. Three or more microphones 308 may be arranged at predetermined positions to calculate the direction of the incoming speech spoken by the user 106. However, the present embodiment can be implemented with one microphone 308. The number of the microphones 308 does not necessarily need to be three or more.

The audio controller 309 connects to the speaker 310, converts the audio data into an analog audio signal in accordance with an instruction from the CPU 302, and outputs the resulting speech through the speaker 310.

The speaker 310 reproduces an audio response indicating that the audio control apparatus 100 is responding, and also reproduces speech synthesized by the server 102. The speaker 310 is a sound reproducing device for general purposes.

The display controller 311 connects to the LED 312 and controls the display of the LED 312 in accordance with an instruction from the CPU 302. In the present embodiment, the display controller 311 mainly controls the illumination of the LED 312 for indicating that the audio control apparatus 100 is properly receiving speech input from the user 106.

The LED 312 is, for example, a blue LED visible to the user 106. The LED 312 is a general-purpose device. The LED 312 may be replaced by a display device capable of displaying text and pictures.

(Hardware Configuration of Server)

Figure 4:
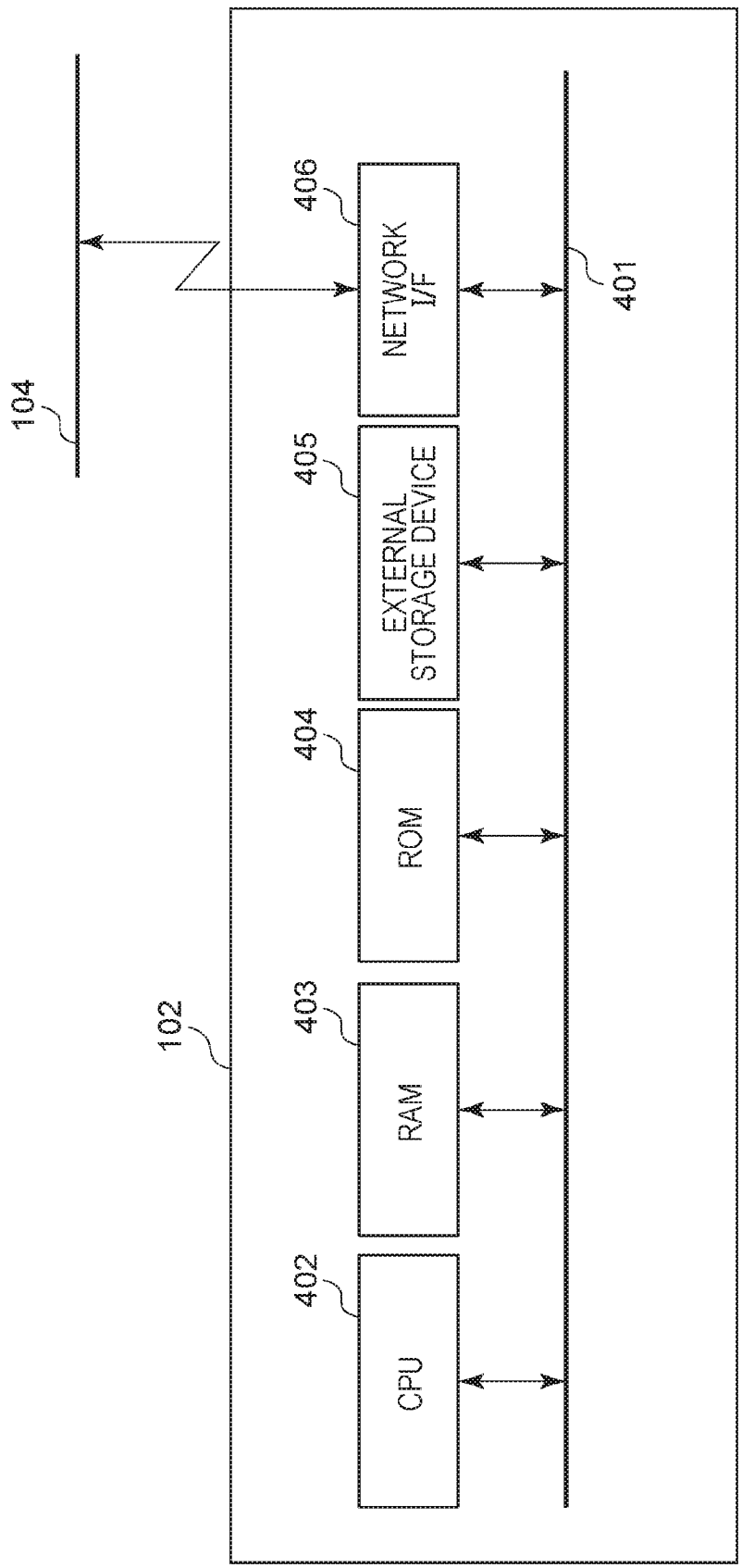
FIG. 4 is a diagram illustrating a hardware configuration of a server.

FIG. 4 is a diagram illustrating a hardware configuration of a controller unit of the server 102.

As illustrated in FIG. 4, the controller unit includes a CPU 402, a RAM 403, a ROM 404, an external storage device 405, and a network I/F 406 that are connected to a system bus 401.

The CPU 402 is a central processing unit that controls the overall operation of the controller unit. The RAM 403 is a volatile memory. The ROM 404 is a nonvolatile memory and stores a boot program for the CPU 402. The external storage device 405 (e.g., hard disk drive or HDD) is a storage device with a larger capacity than the RAM 403. A control program executed by the controller unit to control the server 102 is stored in the external storage device 405. The external storage device 405 may be a solid state drive (SSD), or may be replaced with a different type of storage device having a function equivalent to that of the HDD.

At startup (e.g., when the power is turned on), the CPU 402 executes the boot program stored in the ROM 404. The boot program is for reading the control program stored in the external storage device 405 and developing the read control program in the RAM 403. After executing the boot program, the CPU 402 executes the control program developed in the RAM 403 to carry out control. The CPU 402 stores, in the RAM 403, data used during execution of the control program and performs reading from and writing to the RAM 403. Various settings required during execution of the control program can also be stored in the external storage device 405, and are read and rewritten by the CPU 402. The CPU 402 communicates with other devices on the network 104 via the network I/F 406.

(Hardware Configuration of Image Forming Apparatus)

Figure 5:
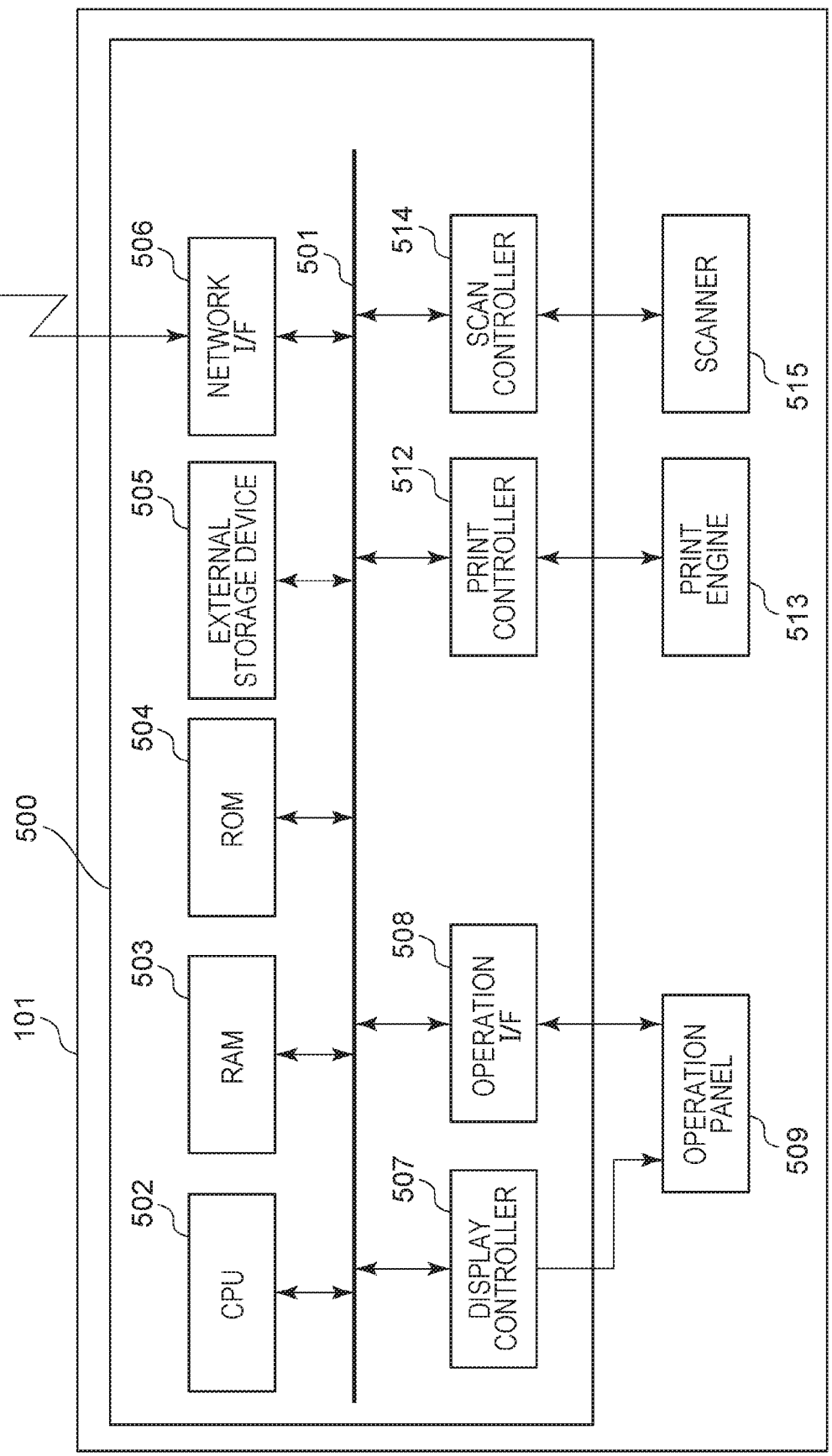
FIG. 5 is a diagram illustrating a hardware configuration of an image forming apparatus.

FIG. 5 is a diagram illustrating a hardware configuration of a controller unit 500 of the image forming apparatus 101 and devices included in the image forming apparatus 101.

As illustrated in FIG. 5, the controller unit 500 includes a CPU 502, a RAM 503, a ROM 504, an external storage device 505, a network I/F 506, a display controller 507, an operation I/F 508, a print controller 512, and a scan controller 514, which are connected to a system bus 501 and capable of communicating with one another.

The CPU 502 is a central processing unit that controls the overall operation of the controller unit 500. The RAM 503 is a volatile memory. The ROM 504 is a nonvolatile memory and stores a boot program for the CPU 502. The external storage device 505 (e.g., HDD) is a storage device with a larger capacity than the RAM 503. A control program executed by the CPU 502 to control the image forming apparatus 101 is stored in the external storage device 505. The external storage device 505 may be an SSD, or may be replaced with a different type of storage device having a function equivalent to that of the HDD.

At startup (e.g., when the power is turned on), the CPU 502 executes the boot program stored in the ROM 504. The boot program is for reading the control program stored in the external storage device 505 and developing the read control program in the RAM 503. After executing the boot program, the CPU 502 executes the control program developed in the RAM 503 to carry out control. The CPU 502 stores, in the RAM 503, data used during execution of the control program and performs reading from and writing to the RAM 503. Various settings required during execution of the control program and image data read by the scanner 515 can also be stored in the external storage device 505, and are read and rewritten by the CPU 502. The CPU 502 communicates with other devices on the network 104 via the network I/F 506.

In accordance with an instruction from the CPU 502, the display controller 507 controls the screen display of the LCD touch panel 200 of the operation panel 509 connected to the display controller 507.

The operation I/F 508 allows input and output of operation signals. The operation I/F 508 is connected to the operation panel 509. When the LCD touch panel 200 is pressed, the CPU 502 acquires, via the operation I/F 508, coordinates corresponding to the press of the LCD touch panel 200. The operation I/F 508 detects the press of each of the hardware keys 201 to 210 on the operation panel 509.

In accordance with an instruction from the CPU 502, the print controller 512 transmits a control command or image data to the print engine 513 connected to the print controller 512.

The print engine 513 is a printing device that prints the received image data (or performs printing) on a sheet in accordance with the control command received from the print controller 512. The print engine 513 will not be described further, as its details are beyond the scope here.

In accordance with an instruction from the CPU 502, the scan controller 514 transmits a control command to the scanner 515 connected to the scan controller 514, and writes image data received from the scanner 515 into the RAM 503.

The scanner 515 is a reading device that reads (or performs reading of) an original on a platen glass (not shown) of the image forming apparatus 101 using an optical unit, in accordance with the control command received from the scan controller 514. The scanner 515 will not be described further, as its details are beyond the scope here.

Combining the print engine 513 and the scanner 515 enables photocopying of the read image of the original.

(Functional Configuration of Audio Control Program of Audio Control Apparatus)

Figure 6:
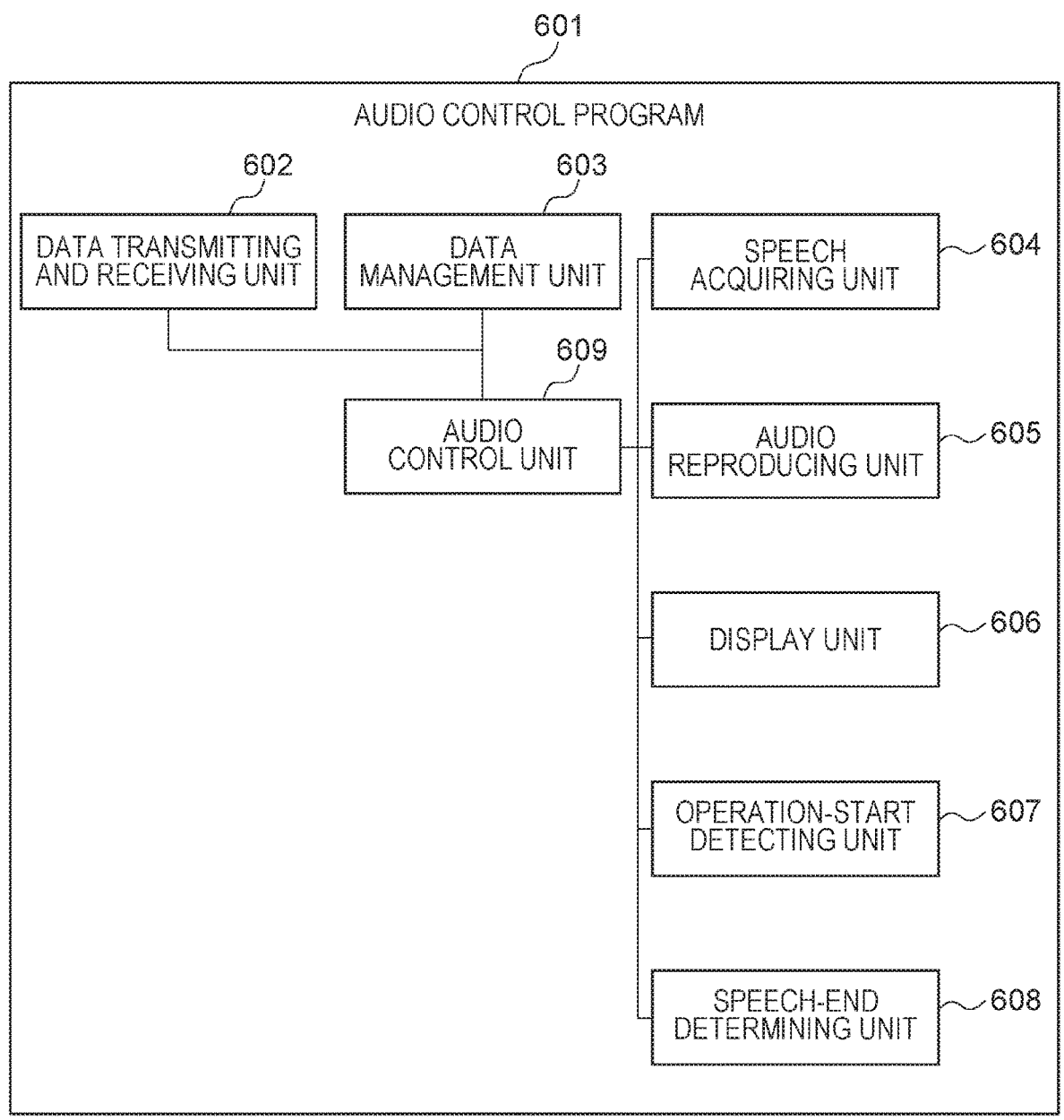
FIG. 6 is a diagram illustrating a functional configuration of a control program of the audio control apparatus.

FIG. 6 is a block diagram illustrating a functional configuration of an audio control program 601 of the audio control apparatus 100, executed by the CPU 302.

The audio control program 601 of the audio control apparatus 100 is stored in the external storage device 305 as described above. At startup, the CPU 302 develops the audio control program 601 in the RAM 303 and executes it.

A data transmitting and receiving unit 602 transmits and receives data to and from other devices on the network 104 via the network I/F 306 in accordance with the Transmission Control Protocol/Internet Protocol (TCP/IP). The data transmitting and receiving unit 602 transmits, to the server 102, audio data representing speech of the user 106 acquired by a speech acquiring unit 604 (described below). The data transmitting and receiving unit 602 receives synthesized speech data generated on the server 102 as a response to the user 106.

A data management unit 603 stores various types of data in a predetermined region of the external storage device 305 and manages the stored data. The various types of data include work data generated during execution of the audio control program 601. Specifically, for example, the data management unit 603 stores and manages volume setting data for setting the volume of speech reproduced by an audio reproducing unit 605 (described below), authentication information required for communicating with the gateway 105, and device information required for communicating with the image forming apparatus 101 and the server 102.

The speech acquiring unit 604 converts analog speech of the user 106 near the audio control apparatus 100, acquired by the microphone 308, into audio data and temporarily stores the audio data. The speech of the user 106 is converted to a predetermined format, such as an MPEG-1 Audio Layer-3 (MP3) format, and temporarily stored in the RAM 303 as coded audio data to be transmitted to the server 102. The start and end timing of processing in the speech acquiring unit 604 is managed by an audio control unit 609 (described below). The audio data may be coded in a general-purpose streaming format, and the coded audio data may be sequentially transmitted by the data transmitting and receiving unit 602.

The audio reproducing unit 605 reproduces, from the speaker 310 via the audio controller 309, synthesized speech data (audio message) received by the data transmitting and receiving unit 602. The timing of audio reproduction in the audio reproducing unit 605 is managed by the audio control unit 609 (described below).

A display unit 606 illuminates the LED 312 via the display controller 311. For example, the display unit 606 controls the illumination of the LED 312 when an operation-start detecting unit 607 (described below) has detected the start of a speech operation. The timing of when the display unit 606 is to illuminate the LED 312 is managed by the audio control unit 609 (described below).

The operation-start detecting unit 607 detects a wake word spoken by the user 106, or a press of an operation start key (not shown) of the audio control apparatus 100. The operation-start detecting unit 607 then transmits an operation start notification to the audio control unit 609. Note that the wake word is a predetermined word to be spoken. The operation-start detecting unit 607 always detects a wake word from analog voice spoken by the user 106 near the audio control apparatus 100 and acquired by the microphone 308. The user 106 can operate the image forming apparatus 101 by saying a wake word and then speaking what he or she wants to do. Speech processing performed after the operation-start detecting unit 607 detects a wake word will be described later on below.

A speech-end determining unit 608 determines the end timing of processing in the speech acquiring unit 604. For example, when the speech of the user 106 stops and a predetermined length of time (e.g., three seconds) elapses, the speech-end determining unit 608 determines that the speech of the user 106 has ended. The speech-end determining unit 608 then transmits a speech end notification to the audio control unit 609. The determination of whether the speech has ended may be made on the basis of a predetermined word spoken by the user 106, not on the basis of the length of time during which no speech takes place (hereinafter referred to as "blank period"). For example, if a predetermined word, such as "Yes", "No", "OK", "Cancel", "Finish", "Start", or "Begin", is received, the speech-end determining unit 608 may determine that the speech has ended, without waiting for a predetermined length of time. The determination of the speech end may be made by the server 102, instead of the audio control apparatus 100. The end of the speech may be determined from the meaning and context of the speech made by the user 106.

The audio control unit 609 serves as a central control unit that enables other modules in the audio control program 601 to operate in a mutually coordinated manner. Specifically, the audio control unit 609 controls the start and end of processing of the speech acquiring unit 604, the audio reproducing unit 605, and the display unit 606. After the speech acquiring unit 604 acquires audio data, the audio control unit 609 performs control such that the data transmitting and receiving unit 602 transmits the audio data to the server 102. After the data transmitting and receiving unit 602 receives synthesized speech data from the server 102, the audio control unit 609 performs control such that the audio reproducing unit 605 reproduces the synthesized speech data.

The start and end timing of processing in the speech acquiring unit 604, the audio reproducing unit 605, and the display unit 606 will now be described.

Upon receiving an operation start notification from the operation-start detecting unit 607, the audio control unit 609 starts the processing in the speech acquiring unit 604. Upon receiving a speech end notification from the speech-end determining unit 608, the audio control unit 609 ends the processing in the speech acquiring unit 604. For example, assume that the user 106 speaks a wake word and then says "I want to make a copy". In this case, the operation-start detecting unit 607 detects the sound of the wake word and transmits an operation start notification to the audio control unit 609. Upon receiving the operation start notification, the audio control unit 609 performs control such that processing in the speech acquiring unit 604 starts. The speech acquiring unit 604 acquires the subsequent analog speech "I want to make a copy", converts the acquired analog speech into audio data, and temporarily stores the audio data. If the speech-end determining unit 608 determines that the speech "I want to make a copy" has been followed by a predetermined blank period, the speech-end determining unit 608 transmits a speech end notification to the audio control unit 609. Upon receiving the speech end notification, the audio control unit 609 ends the processing in the speech acquiring unit 604. Note that the state between the start and end of processing in the speech acquiring unit 604 will be referred to as a speech processing mode. The display unit 606 illuminates the LED 312 to indicate that the audio control apparatus 100 is in the speech processing mode.

After the speech-end determining unit 608 determines that the user 106 has ended the speech, the audio control unit 609 performs control such that the audio data temporarily stored by the speech acquiring unit 604 is transmitted from the data transmitting and receiving unit 602 to the server 102, and then waits for a response from the server 102. The response from the server 102 is, for example, a response message composed of synthesized speech data and a header indicating that this is a response. When the data transmitting and receiving unit 602 receives a response message, the audio control unit 609 performs control such that the audio reproducing unit 605 reproduces synthesized speech data. The synthesized speech data is, for example, "Copy screen will be displayed". Note that the state between the speech end determination and the end of reproduction of the synthesized speech data will be referred to as a response processing mode. The display unit 606 blinks the LED 312 to indicate that the audio control apparatus 100 is in the response processing mode.

After the response processing, as long as the interactive session with the server 102 continues, the user 106 can speak what he or she wants to do without saying any wake word. The determination of whether the interactive session has ended is made by the server 102. The server 102 transmits an end notification to the audio control apparatus 100 to notify that the interactive session has ended. Note that the state between the end of one interactive session and the start of another interactive session will be referred to as a standby mode. The audio control apparatus 100 is always in standby mode until receiving an operation start notification from the operation-start detecting unit 607. The display unit 606 does not illuminate the LED 312 in the standby mode.

(Functional Configuration of Audio-Data Conversion Control Program of Server)

FIG. 7A is a block diagram illustrating a functional configuration of an audio-data conversion control program 701 of the server 102, executed by the CPU 402. FIG. 7B shows examples of group ID lists used by a group-ID determining unit 707 to determine a group ID. In the group ID lists, words having the same meaning or intention in relation to user's operations on the image forming apparatus 101 are grouped under the same ID. The words listed here are results of speech recognition of words spoken to the audio control apparatus 100 by the user 106.

The audio-data conversion control program 701 of the server 102 is stored in the external storage device 405 as described above. At startup, the CPU 402 develops the audio-data conversion control program 701 in the RAM 403 and executes it.

A data transmitting and receiving unit 702 transmits and receives data to and from other devices on the network 104 via the network I/F 406 in accordance with the TCP/IP. The data transmitting and receiving unit 702 receives audio data representing speech of the user 106 from the audio control apparatus 100. Also, the data transmitting and receiving unit 702 transmits the result of group ID determination made by the group-ID determining unit 707 and text data generated through speech recognition processing by a speech recognition unit 705 (described below).

A data management unit 703 stores various types of data in a predetermined region of the external storage device 405 and manages the stored data. The various types of data include work data generated during execution of the audio-data conversion control program 701, and parameters necessary for an audio data converter 704 to perform speech recognition processing. Specifically, for example, the data management unit 703 stores, in a predetermined region of the external storage device 405, acoustic and language models for the speech recognition unit 705 to convert the audio data received by the data transmitting and receiving unit 702 into text, and manages the stored models. Also, for example, the data management unit 703 stores, in a predetermined region of the external storage device 405, dictionaries for a morphological analysis unit 706 to perform morphological analysis on text, and manages the stored dictionaries. Also, for example, the data management unit 703 stores, in a predetermined region of the external storage device 405, group ID lists for the group-D determining unit 707 to determine group IDs, and manages the stored group ID lists. Also, for example, the data management unit 703 stores, in a predetermined region of the external storage device 405, a speech database for a speech synthesis unit 708 to perform speech synthesis, and manages the stored speech database. The data management unit 703 also stores and manages device information required for communicating with the audio control apparatus 100 and the image forming apparatus 101.

The audio data converter 704 includes the speech recognition unit 705, the morphological analysis unit 706, the group-ID determining unit 707, and the speech synthesis unit 708. The audio data converter 704 will now be described.

The speech recognition unit 705 performs speech recognition processing to convert audio data representing speech of the user 106, received by the data transmitting and receiving unit 702, into text. The speech recognition processing involves converting the audio data of speech of the user 106 into phonemes using an acoustic model, and then converting the phonemes into actual text data using a language model. In the present embodiment, the text data is composed of "katakana" text containing one or more katakana characters (one type of kana or Japanese phonetic symbols), and "kanakanji" text obtained by kana-kanji conversion of the katakana text and containing a mixture of hiragana characters (the other type of kana), katakana characters, and kanji characters (non-phonetic characters). The kana/kanji text also contains numbers, alphabetical letters, and signs. A different technique may be used to perform speech recognition processing that converts the audio data into text data, and the technique is not limited to that described above. The speech recognition processing will not be described further, as its details are beyond the scope here.

The morphological analysis unit 706 performs morphological analysis on the text data obtained through conversion by the speech recognition unit 705. The morphological analysis involves extracting morpheme sequences from a dictionary having information about the grammar and parts of speech of the language, and determining the part of speech of each morpheme. The morphological analysis unit 706 can be implemented by known software, such as JUMAN, ChaSen, or MeCab, designed for morphological analysis. The morphological analysis unit 706 analyzes the text data obtained through conversion by the speech recognition unit 705, into a morpheme sequence. For example, text data "Kopi-o-shi-tai (I want to make a copy)" is analyzed into a morpheme sequence "kopi", "o", "shi", and "tai", and text data "Esan-kara-eyon-e (From A3 to A4)" is analyzed into a morpheme sequence "esan", "kara", "eyon", and "e".

The group-ID determining unit 707 compares the result of morphological analysis made by the morphological analysis unit 706 to the group ID lists shown in FIG. 7B to determine a group ID and generates the result of group ID determination (hereinafter referred to as "group-ID determination result"). For example, the group-ID determining unit 707 determines that the morpheme sequence "kopi", "o". "shi", and "tai" matches the group ID "FNC00001" for "kopi (copy)" and generates {ID: FNC00001} as the group-D determination result. Also, the group-ID determining unit 707 determines that the morpheme sequence "esan", "kara", "eyon", and "e" matches two group IDs "PAP00100" and "PAP00101" for "esan (A3)" and "eyon (A4)", respectively, and generates {ID: PAP00100, ID: PAP00101} as the group-ID determination result.

When the group-ID determination result includes a plurality of IDs, they are generated in the order they have been subjected to speech recognition and morphological analysis. For example, when the result of speech recognition and morphological analysis is the morpheme sequence "eyon (A4)", "kara". "esan (A3)", and "e", then {ID: PAP00101, ID: PAP00100} is generated as the group-ID determination result. A combination of adjacent morphemes may be compared to the group ID lists for the determination. In this case, if a match is found for one morpheme in any group ID list and a match is also found for a combination of morphemes including the one morpheme in any group ID list, then the latter result is used to generate a group-ID determination result. For example, if the morpheme sequence is "A" and "4", then {ID: PAP00101} corresponding to "A4" is generated as the group-ID determination result, instead of {ID: CHR00000, ID: NUM00004} corresponding to "A" and "4". Also, katakana text composed of one or more katakana characters included in a result of speech recognition and morphological analysis, and kana/kanji text converted from the katakana text, may be combined and compared to the group ID lists. For example, the group-ID determining unit 707 first compares the kana/kanji text to the text in the column labeled "kana/kanji" of the group ID lists. Men, if no corresponding group ID is found, the group-ID determining unit 707 compares the katakana text to the text in the column labeled "katakana" of the group ID lists to detect the corresponding group ID. If there is an overlap in "katakana" and a plurality of corresponding group IDs are found in the group ID lists, a plurality of group-ID determination results may be generated as candidates. A group-D determination result is thus generated, which accommodates errors in kana-kanji conversion and variations in furigana (or reading aid indicating pronunciation) attached to kanji characters.

The speech synthesis unit 708 performs speech synthesis on the basis of notification data received from the image forming apparatus 101. In the speech synthesis, text prepared in advance to be paired with a predetermined notification is converted to audio data of a predetermined format, such as MP3. Exemplary combinations of received notification data and text to be synthesized into speech will be described later on below with reference to the sequence diagram of FIGS. 9A to 9C. The speech synthesis generates, for example, audio data on the basis of the speech database stored in the data management unit 703. The speech database is, for example, a collection of spoken words with fixed contents. Although speech synthesis is performed using a speech database in the present embodiment, a different technique may be used for speech synthesis. The speech synthesis technique is not limited to that using a speech database. The speech synthesis will not be described further, as its details are beyond the scope here.

(Functional Configuration of Device Control Program of Image Forming Apparatus)

Figure 8:
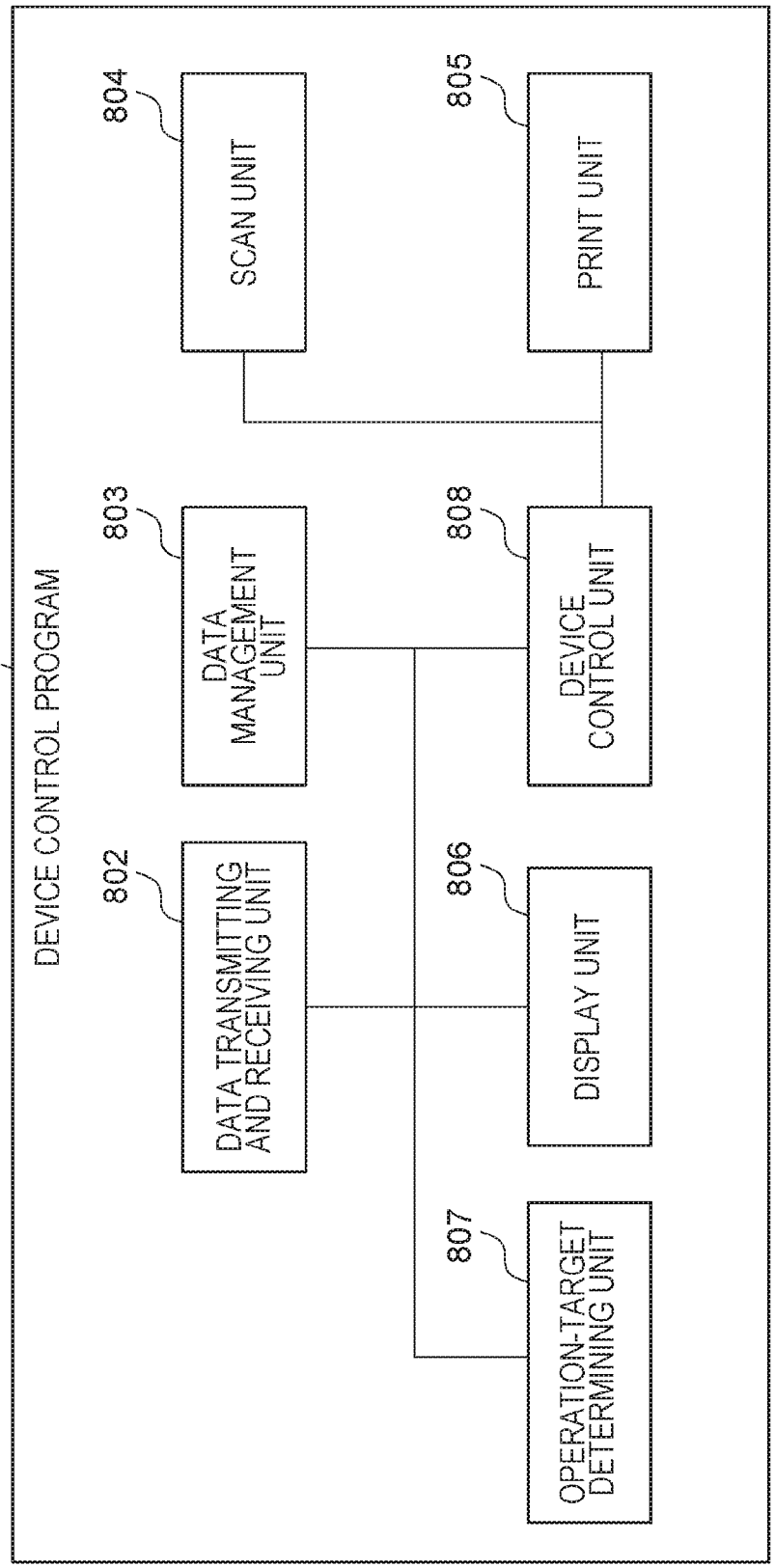
FIG. 8 is a diagram illustrating a functional configuration of a control program of the image forming apparatus.

FIG. 8 is a block diagram illustrating a functional configuration of a device control program 801 of the image forming apparatus 101, executed by the CPU 502.

The device control program 801 of the image forming apparatus 101 is stored in the external storage device 505 as described above. At startup, the CPU 502 develops the device control program 801 in the RAM 503 and executes it.

A data transmitting and receiving unit 802 transmits and receives data to and from other devices on the network 104 via the network I/F 506 in accordance with the TCP/IP. The data transmitting and receiving unit 802 receives a group-ID determination result generated by the group-ID determining unit 707 and text data generated through speech recognition processing by the speech recognition unit 705. The data transmitting and receiving unit 802 transmits, from the image forming apparatus 101 to the server 102, a screen update notification indicating that the screen display content of the LCD touch panel 200 of the operation panel 509 has been updated, and a job state notification indicating the execution state of the job. The details of the notifications will be described later on below with reference to the sequence diagram of FIGS. 9A to 9C.

A data management unit 803 stores various types of data in predetermined regions of the RAM 503 and the external storage device 505 and manages the stored data. The various types of data include work data generated during execution of the device control program 801, and setting parameters necessary for controlling each device. Specifically, for example, the data management unit 803 manages job data including combinations of setting items and set values of jobs executed by a device control unit 808 (described below), and also manages machine setting information defining sheet attributes. Also, the data management unit 803 stores and manages authentication information required for communicating with the gateway 105, and device information required for communicating with the server 102. The data management unit 803 also stores and manages image data used by the image forming apparatus 101 to form images. Also, the data management unit 803 stores screen control information used by a display unit 806 for screen display control, and operation-target determination information used by an operation-target determining unit 807 to determine an operation target. The data management unit 803 manages the screen control information and the operation-target determination information for each screen displayed by the display unit 806.

A scan unit 804 causes the scanner 515 to execute scanning via the scan controller 514 on the basis of scan job parameter settings for the device control unit 808 (described below). The scan unit 804 stores the read image data in the data management unit 803.

A print unit 805 causes the print engine 513 to execute printing via the print controller 512 on the basis of print job parameter settings for the device control unit 808 (described below).

The display unit 806 controls the operation panel 509 via the display controller 507. Specifically, the display unit 806 displays user operable user interface (UI) components (e.g., buttons, pull-down lists, and checkboxes) on the LCD touch panel 200. The display unit 806 updates the screen on the basis of the screen control information. Also, the display unit 806 displays, on the LCD touch panel 200, text data representing a speech recognition result received by the data transmitting and receiving unit 802.

The operation-target determining unit 807 acquires the coordinates of a touched point on the LCD touch panel 200 via the operation I/F 508 and determines, as an operation target, a UI component that is displayed on the LCD touch panel 200 and operable by the user 106. Also, when a press of one of the hardware keys 201 to 210 on the operation panel 509 is detected, the operation-target determining unit 807 determines the one of the hardware keys 201 to 210 as the UI component to be operated (operation target). Also, the operation-target determining unit 807 determines the operation target on the basis of the group-ID determination result received by the data transmitting and receiving unit 802. The operation target is, for example, any of the UI components included in the screen of the LCD touch panel 200 and operable by the user 106, or any of the hardware keys 201 to 210 included in the operation panel 509.

Additionally, the operation-target determining unit 807 reads screen control information corresponding to the UI component determined as the operation target and determines, on the basis of the read screen control information, processing to be performed upon accepting the operation. For example, the operation-target determining unit 807 instructs the display unit 806 to update the displayed content on the screen, or transmits parameters for a job specified by a user's operation and an instruction to start the job to the device control unit 808. The processing performed by the operation-target determining unit 807 will be described in detail later on below with reference to FIG. 26.

The device control unit 808 instructs the print controller 512 and the scan controller 514 to control the print engine 513 and the scanner 515, respectively. For example, when the display unit 806 detects a press of the start key 207 during display of a copy function screen, the device control unit 808 receives parameters for a copy job and a job start instruction from the operation-target determining unit 807. Then, on the basis of the job parameters, the device control unit 808 performs control such that image data read by the scanner 515 is printed on a sheet by the print engine 513. The mechanism of scan and print control will not be described further, as it is beyond the scope here.

(System Control Sequence)

Figure 9C:
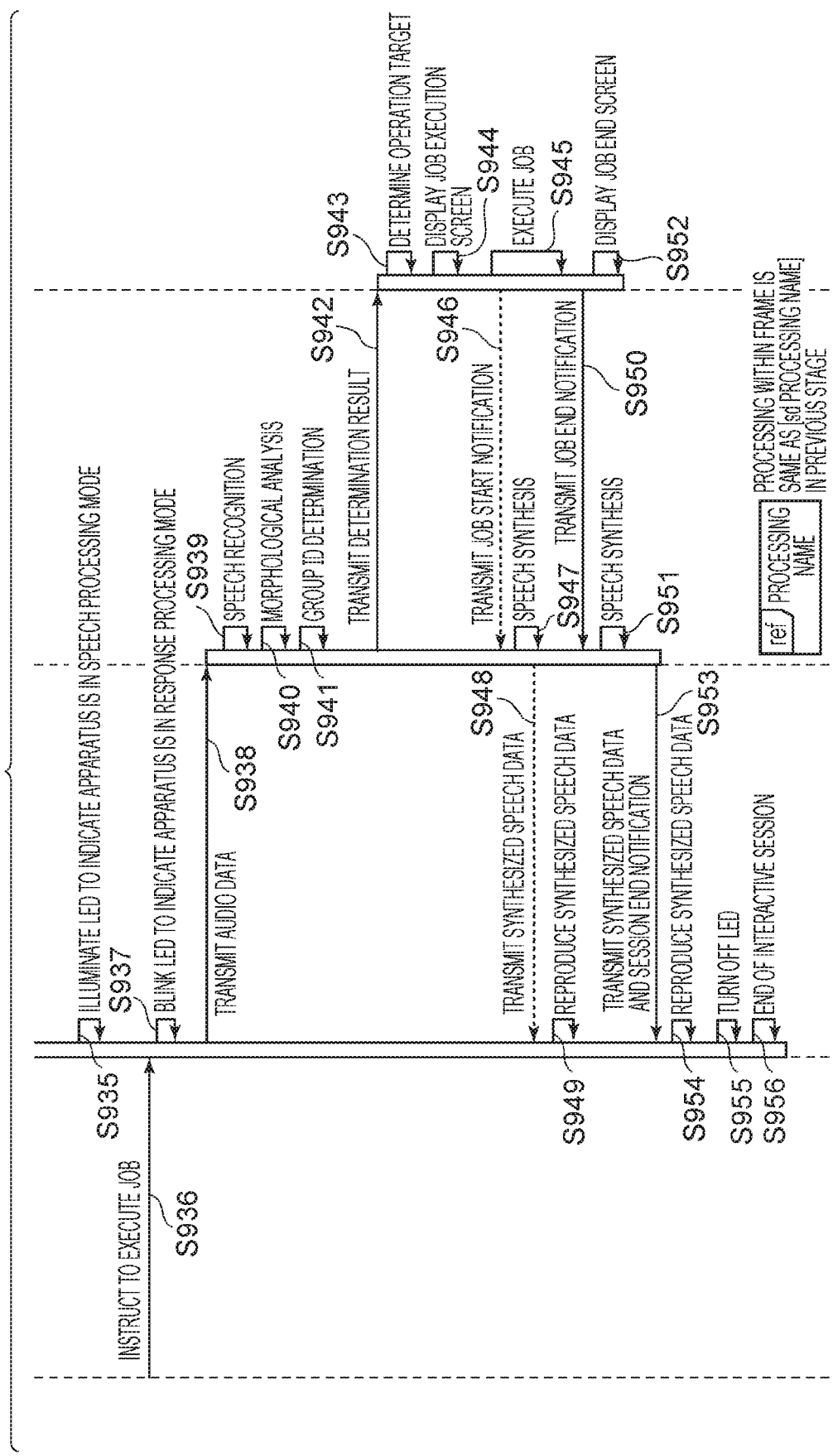

FIGS. 9A to 9C present a sequence diagram illustrating interactions between the apparatuses included in the information processing system illustrated in FIG. 1 and also between the control programs of the apparatuses illustrated in FIG. 6, FIG. 7A, and FIG. 8. FIGS. 9A to 9C illustrate a sequence in which, after the audio control apparatus 100 receives a speech operation based on voice of the user 106, the image forming apparatus 101 executes the corresponding processing and returns an audio response representing the result of the execution to the user 106. This sequence example illustrated in FIGS. 9A to 9C assumes that the audio control apparatus 100, the image forming apparatus 101, and the server 102 are ready to communicate with each other. This sequence example also assumes that after startup (e.g., after the power is turned on), the image forming apparatus 101 displays a main menu screen which allows the user 106 to call a function, such as copying, scanning, or printing.

First, in step S905 (hereinafter referred to as S905 and so on), the user 106 instructs the audio control apparatus 100 to start a speech operation. The instruction to start the speech operation is sent when the user 106 says a wake word or presses the operation start key of the audio control apparatus 100. The instruction to start the speech operation is detected by the operation-start detecting unit 607.

When the instruction to start the speech operation is detected, the display unit 606 of the audio control program 601 illuminates the LED 312 in S906 to indicate that the audio control apparatus 100 is in the speech processing mode. At the same time, the speech acquiring unit 604 starts to perform processing.

In S907, the user 106 instructs the audio control apparatus 100 to call a function. This function calling instruction is sent when the user 106 speaks, for example, "I want to make a copy" or "Display the copy screen" after saying a wake word in S905. From the speech acquired by the speech acquiring unit 604, audio data is generated. After the elapse of a predetermined blank period, the speech-end determining unit 608 determines that the speech has ended.

In response to the speech-end determination, the display unit 606 of the audio control program 601 blinks the LED 312 in S908 to indicate that the audio control apparatus 100 is in the response processing mode. At the same time, the speech acquiring unit 604 ends its processing.

After the audio data representing the function calling instruction received in S907 is generated, the data transmitting and receiving unit 602 transmits the generated audio data to the server 102 in S909.

In S910, the speech recognition unit 705 of the audio-data conversion control program 701 performs speech recognition on the audio data received by the data transmitting and receiving unit 702. By the speech recognition, for example, text is generated from the speech "Kopi-shi-tai (I want to make a copy)" spoken by the user 106.

In S911, the morphological analysis unit 706 of the audio-data conversion control program 701 performs morphological analysis on the text generated in S910. By morphological analysis, for example, the text "Kopi-shi-tai" is analyzed into a morpheme sequence "kopi", "shi", and "tai".

In S912, the group-ID determining unit 707 of the audio-data conversion control program 701 performs group ID determination on the text analyzed into a morpheme sequence. By the group ID determination, for example, the morpheme sequence "kopi", "shi", and "tai" is compared to the group ID lists shown in FIG. 7B, and {ID: FNC00001} is generated as the group-ID determination result.

In S913, the data transmitting and receiving unit 702 of the audio-data conversion control program 701 transmits the group-ID determination result obtained in S912 to the image forming apparatus 101.

In S914, the operation-target determining unit 807 of the device control program 801 performs operation target determination on the group-ID determination result received by the data transmitting and receiving unit 802. For example, from the group-ID determination result {ID: FNC00001}, the operation-target determining unit 807 determines that the "Copy" button in the main menu screen has been selected as the operation target.

In S915, in accordance with the determination made in S914, the display unit 806 updates the displayed content of the screen. For example, on the basis of the processing described above, if it is determined, from the speech "Kopi-shi-tai" spoken by the user 106, that the target of the operation is the "Copy" button displayed on the screen, the display unit 806 displays the copy function screen in the same manner as when the "Copy" button is touched on the LCD touch panel 200.

In S916, the data transmitting and receiving unit 802 transmits, to the server 102, a screen update notification indicating that displayed content on the screen has been updated. For example, when the display unit 806 switches the display from the main menu screen to the copy function screen, the data transmitting and receiving unit 802 transmits text data "copy function screen displayed" as a screen update notification.

In S917, the speech synthesis unit 708 of the audio-data conversion control program 701 performs speech synthesis on the screen update notification received by the data transmitting and receiving unit 702. Specifically, the speech synthesis unit 708 synthesizes speech from predetermined text data corresponding to the screen update notification. For example, if the screen update notification is "copy function screen displayed", the speech synthesis unit 708 synthesizes the speech "Copy screen has been displayed" from the corresponding text data.

In S918, the audio data (synthesized speech data) generated through speech synthesis in S917 by the speech synthesis unit 708 is transmitted by the data transmitting and receiving unit 702 to the audio control apparatus 100. The synthesized speech data is received by the data transmitting and receiving unit 602 of the audio control program 601.

In S919, the audio reproducing unit 605 reproduces the synthesized speech data received in S918. For example, the synthesized speech data "Copy screen has been displayed" generated in S917 is reproduced through the speaker 310.

In S920, after the synthesized speech data is reproduced, the display unit 606 of the audio control program 601 illuminates the LED 312 again to indicate that the audio control apparatus 100 is in the speech processing mode. At the same time, the speech acquiring unit 604 starts processing again.

In S921, the user 106 instructs the audio control apparatus 100 to call a setting screen. The instruction to call a setting screen is sent when the user 106 speaks, for example, "Yoshi-o-sentaku (Select paper)". From the speech acquired by the speech acquiring unit 604, audio data is generated. When a predetermined blank period elapses after the speech of the user 106, the speech-end determining unit 608 determines that the speech has ended.

In S922, the same operation as that in S908 is performed.

In S923, the speech operation processing similar to that performed in S909 to S918 is performed. The difference is that in S923, the display unit 806 updates the screen in accordance with the instruction (sent in S921) to call a setting screen. For example, when the group-ID determination result {ID: PAP00000, ID: OPR00040} is obtained during display of the copy function screen, the display unit 806 displays a paper selection screen.

In S924, the audio reproducing unit 605 reproduces the synthesized speech data generated by speech synthesis in S923. For example, when the paper selection screen is displayed as a setting screen in S923, the audio reproducing unit 605 reproduces the synthesized speech data "Paper selection screen has been displayed. Please select the paper" through the speaker 310.

In S925, the same operation as that in S920 is performed.

In S926, the user 106 instructs the audio control apparatus 100 to change the setting. The setting change instruction is sent when the user 106 speaks, for example, "Eyon (A4)". When a predetermined blank period elapses after the speech of the user 106, the speech-end determining unit 608 determines that the speech has ended.

In S927, the same operation as that in S908 is performed.

In S928, the speech operation processing similar to that performed in S909 to S918 is performed. The difference is that in S928, the display unit 806 changes a set value displayed on the setting screen (i.e., the display unit 806 executes processing that accepts an instruction to change a set value) in accordance with the instruction (sent in S926) to change the setting. For example, when the group-ID determination result {ID: PAP00101)} is obtained during display of the paper selection screen, the display unit 806 updates the paper selection screen to change the set value for the type of paper to A4.

In S929, the audio reproducing unit 605 reproduces the synthesized speech data generated by speech synthesis in S928. For example, when the set value for the type of paper is changed and displayed in S928, the audio reproducing unit 605 reproduces the synthesized speech data "A4 paper has been selected" through the speaker 310.

In S930, the same operation as that in S920 is performed.

In S931, the user 106 instructs the audio control apparatus 100 to confirm the setting. The instruction to confirm the setting is sent when the user 106 speaks, for example, "Yoshi-no-sentaku-o-kanryo (Paper section has been completed)". When a predetermined blank period elapses after the speech of the user 106, the speech-end determining unit 608 determines that the speech has ended.

In S932, the same operation as that in S908 is performed.

In S933, the speech operation processing similar to that performed in S909 to S918 is performed. The difference is that in S933, the display unit 806 updates the displayed content on the LCD touch panel 200 to enable transition to the original screen, in accordance with the instruction to confirm the setting in S931. For example, when the group-ID determination result (ID: PAP00000, ID: OPR00040, ID: OPR00012) is obtained during display of the paper selection screen, the display unit 806 displays the copy function screen displayed at the point of S921.

In S934, the audio reproducing unit 605 reproduces the synthesized speech data generated by speech synthesis in S928. For example, the synthesized speech data "You can start copying" is reproduced through the speaker 310.

In S935, the same operation as that in S920 is performed.

In S936, the user 106 instructs the audio control apparatus 100 to execute a job. The job execution instruction is sent when the user 106 speaks, for example, "Kopi-sutato (Start copying)". When a predetermined blank period elapses after the speech of the user 106, the speech-end determining unit 608 determines that the speech has ended.

The processing in S937 to S942 is similar to that performed in S908 to S913.

In S943, the operation-target determining unit 807 of the device control program 801 performs operation target determination on the group-ID determination result received by the data transmitting and receiving unit 802. If the group-ID determination result is {ID: FNC00001, ID: OPR00011}, the operation-target determining unit 807 determines that the "Copy Start" button displayed on the screen or the start key 207, which is a hardware key, has been operated.

In S944, the display unit 806 displays the job execution screen in accordance with the determination made in S943. For example, if the operation-target determining unit 807 determines, on the basis of the processing performed so far, that the speech "Kopi-sutato (Start copying)" spoken by the user 106 is an operation on the start key 207, the display unit 806 displays a copy job start screen.

In S945, a job is executed in accordance with job parameters set on the screen of the image forming apparatus 101.

In S946, the data transmitting and receiving unit 802 transmits a job state notification to the server 102. Specifically, the data transmitting and receiving unit 802 transmits information (job start notification) indicating that job execution has started. For example, when a copy job has started, the text data "copy job started" is transmitted as a job state notification to the server 102.

In S947, the data transmitting and receiving unit 702 of the audio-data conversion control program 701 receives the job state notification, and the speech synthesis unit 708 synthesizes speech from predetermined text data corresponding to the job state notification (job start notification) received. For example, if the job state notification is "copy job started", the speech synthesis unit 708 synthesizes the speech "Copying will start" from the corresponding text data.

In S948, the same operation as that in S918 is performed.

In S949, the audio reproducing unit 605 reproduces the synthesized speech data received in S948. For example, the synthesized speech data "Copying will start" generated in S947 is reproduced through the speaker 310.

In S950, the data transmitting and receiving unit 802 transmits a job state notification to the server 102. Specifically, the data transmitting and receiving unit 802 transmits information (job end notification) indicating that job execution has ended. For example, when the copy job has ended, the text data "copy job completed" is transmitted as a job state notification to the server 102.

In S951, the data transmitting and receiving unit 702 of the audio-data conversion control program 701 receives the job state notification, and the speech synthesis unit 708 synthesizes speech from predetermined text data corresponding to the job state notification (job end notification) received. For example, if the job state notification is "copy job completed", the speech synthesis unit 708 synthesizes the speech "Copying has been completed" from the corresponding text data.

In S952, in response to completion of the job executed in S945, the display unit 806 displays a job end screen. For example, when execution of a copy job ends, the display unit 806 displays a copy job end screen.

In S953, the data transmitting and receiving unit 602 receives, from the server 102, the synthesized speech data generated in S951. The data transmitting and receiving unit 602 also receives, from the server 102, a session end notification notifying the audio control apparatus 100 that the interactive session with the user 106 is to be completed.

In S954, the audio reproducing unit 605 reproduces the synthesized speech data received in S953. For example, the synthesized speech data "Copying has been completed" generated in S951 is reproduced through the speaker 310.

In S955, in response to receiving the session end notification in S953, the display unit 606 of the audio control program 601 turns off the LED 312 to indicate that the audio control apparatus 100 is in standby mode.

In S956, in response to receiving the session end notification in S953, the audio control apparatus 100 is brought into standby mode.

Even when the sequence diagram shows that the LED 312 is blinking to indicate that the audio control apparatus 100 is in the response processing mode, the audio control apparatus 100 is ready to receive input of a wake word. Therefore, after speaking a wake word, the user 106 may say "Cancel" or "Stop" to forcibly terminate the interactive session.

(Screen Control Information and Operation-Target Determination Information)

Figure 22E:
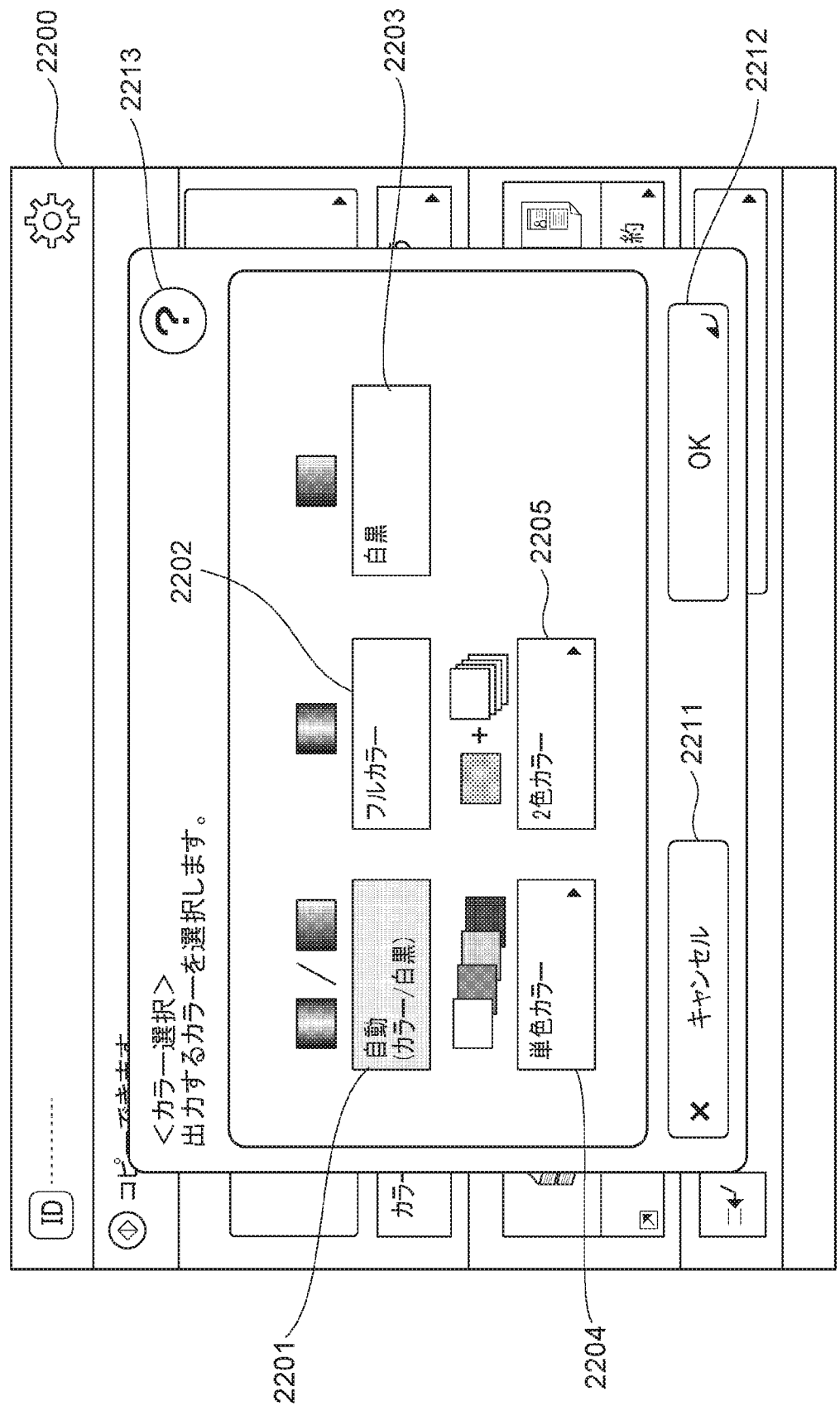
FIG. 22E illustrates a Japanese version of the screen illustrated in FIG. 22A.
Figure 23A:
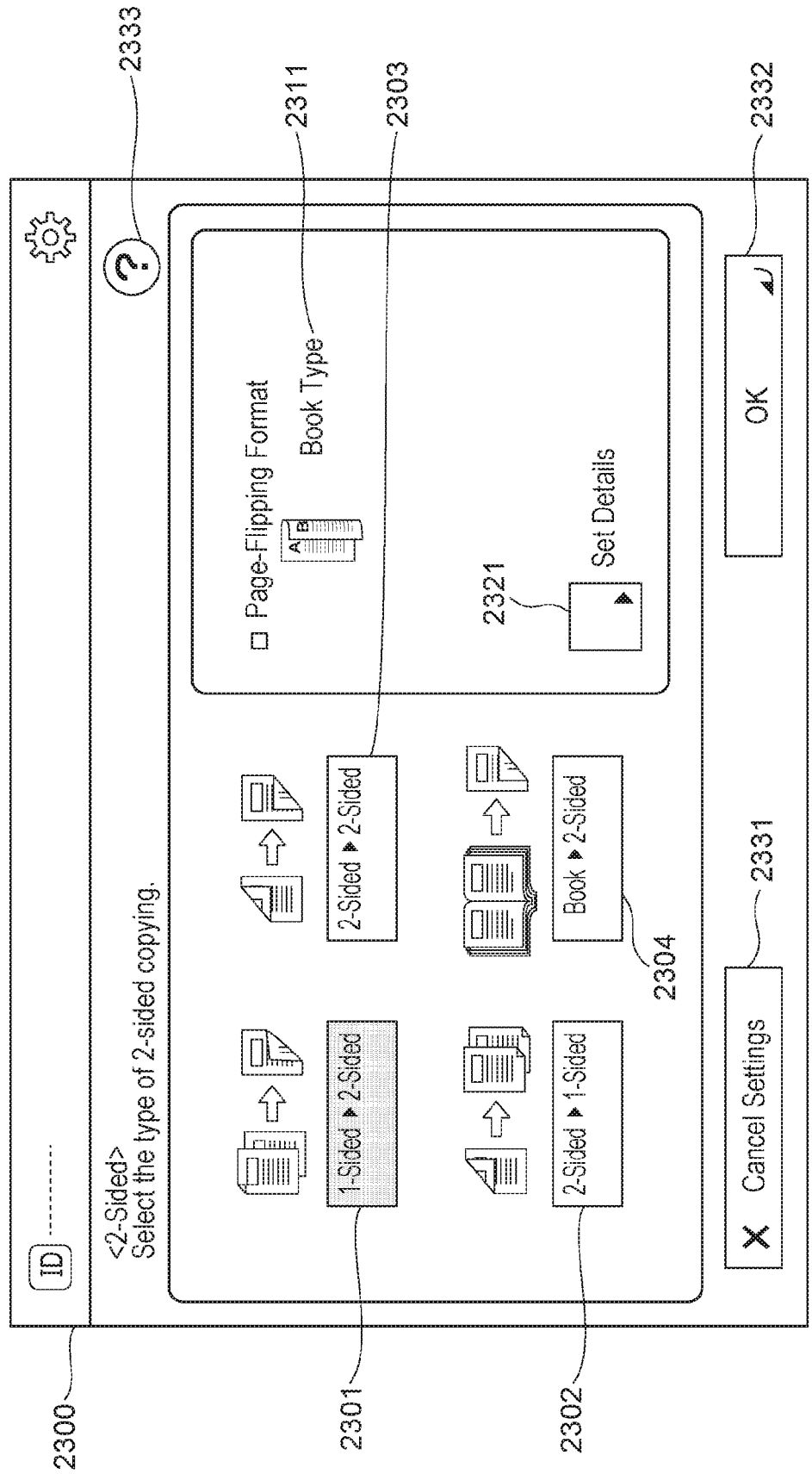
FIG. 23A illustrates a screen displayed by the control program of the image forming apparatus.
Figure 24A:
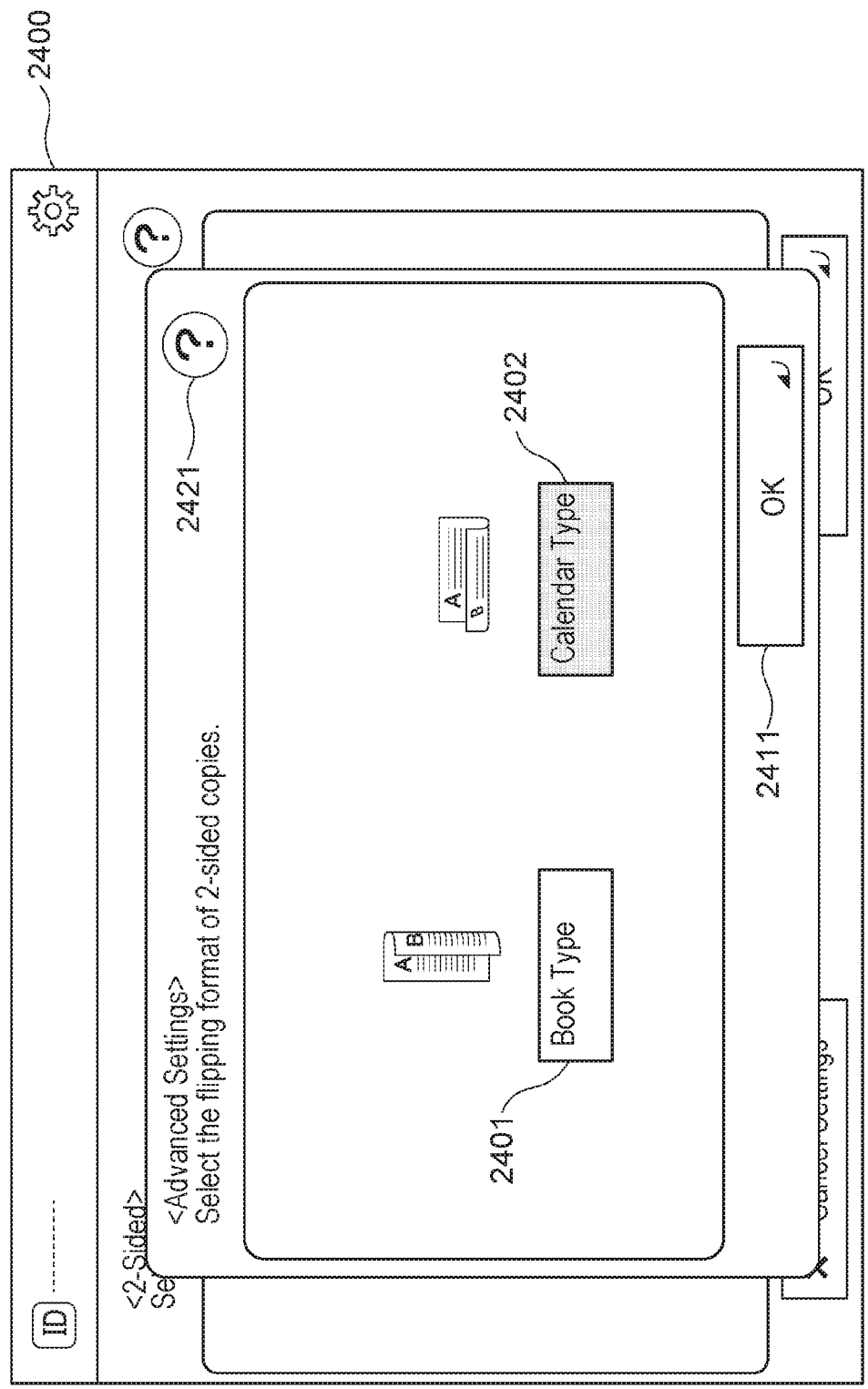
FIG. 24A illustrates a screen displayed by the control program of the image forming apparatus.
Figure 24E:
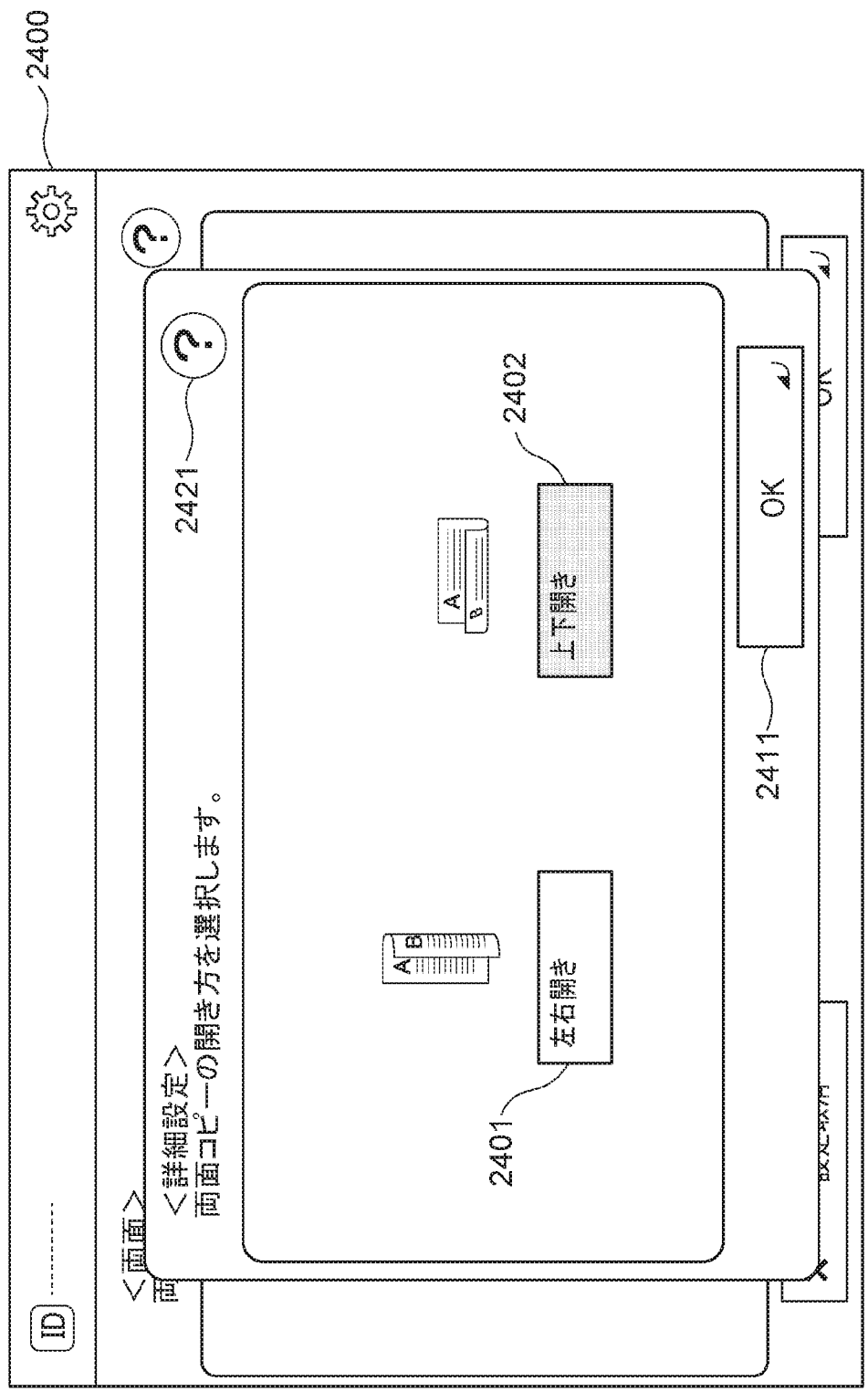
FIG. 24E illustrates a Japanese version of the screen illustrated in FIG. 24A.

FIGS. 10A and 10B, 11A to 11D, 12A to 12D, 13A and 13B, 14A to 14C, 15A to 15D, 16A to 16D, 17A to 17C, 18A to 18C, 19A to 19C, 20, and 21A to 21C present other examples of the group ID lists shown in FIG. 7B. FIG. 22A illustrates a screen displayed by the display unit 806, and FIG. 22E illustrates a Japanese version of the screen illustrated in FIG. 22A. FIG. 23A illustrates a screen displayed by the display unit 806, and 23E illustrates a Japanese version of the screen illustrated in FIG. 23A. FIG. 24A illustrates a screen displayed by the display unit 806, and FIG. 24E illustrates a Japanese version of the screen illustrated in FIG. 24A.

The screen control information is generally divided into two types: the information such as that shown in FIG. 22B, FIG. 23B, and FIG. 24B, and the information such as that shown in FIG. 22C, FIG. 23C, and FIG. 24C. The data management unit 803 manages the screen control information for each screen.

The screen control information of the former type includes UI components each included in the screen and determined as an operation target by a press of the LCD touch panel 200 or a press of the hardware keys 201 to 210, and screen control and internal processing executed when the corresponding UI component is determined as an operation target. The UI components each listed as "UI component (touch and speech operable)" in the screen control information is also determined as an operation target by speech of the user 106 through operation target determination performed by the operation-target determining unit 807.

The screen control information of the latter type includes UI components each included in the screen and determined as an operation target only by speech of the user 106 through operation target determination, and screen control and internal processing executed when the corresponding UI component is determined as an operation target.

FIGS. 22B and 22C, FIGS. 23B and 23C, and FIGS. 24B and 24C show text that describes "screen control during operation" and "internal processing during operation" in the screen control information. However, the data management unit 803 manages such information in a data format that can be identified by the display unit 806 and the operation-target determining unit 807 that use the information.

In the operation-target determination information shown in FIG. 22D, FIG. 23D, and FIG. 24D, the UI components of the screen are each associated in advance with at least one group-ID set. Each of the group ID sets included in the operation-target determination information may either be a group ID in the group ID lists shown in FIGS. 10A and 10B, 11A to 11D. 12A to 12D, 13A and 13B, 14A to 14C, 15A to 15D, 16A to 16D, 17A to 17C, 18A to 18C, 19A to 19C, 20, and 21A to 21C, or a combination of such group IDs. For example, the group 1D set "COL00110+COL00000" matches the group-ID determination result {ID: COL00110, ID: COL00000}. The data management unit 803 manages the operation-target determination information for each screen such that there is no overlap in group ID set within one piece of operation-target determination information. The "example of user speech during operation" shown in FIG. 22D, FIG. 23D, and FIG. 24D is merely reference information for describing the present embodiment, and does not necessarily need to be included in the operation-target determination information managed by the data management unit 803.

Figure 23E:
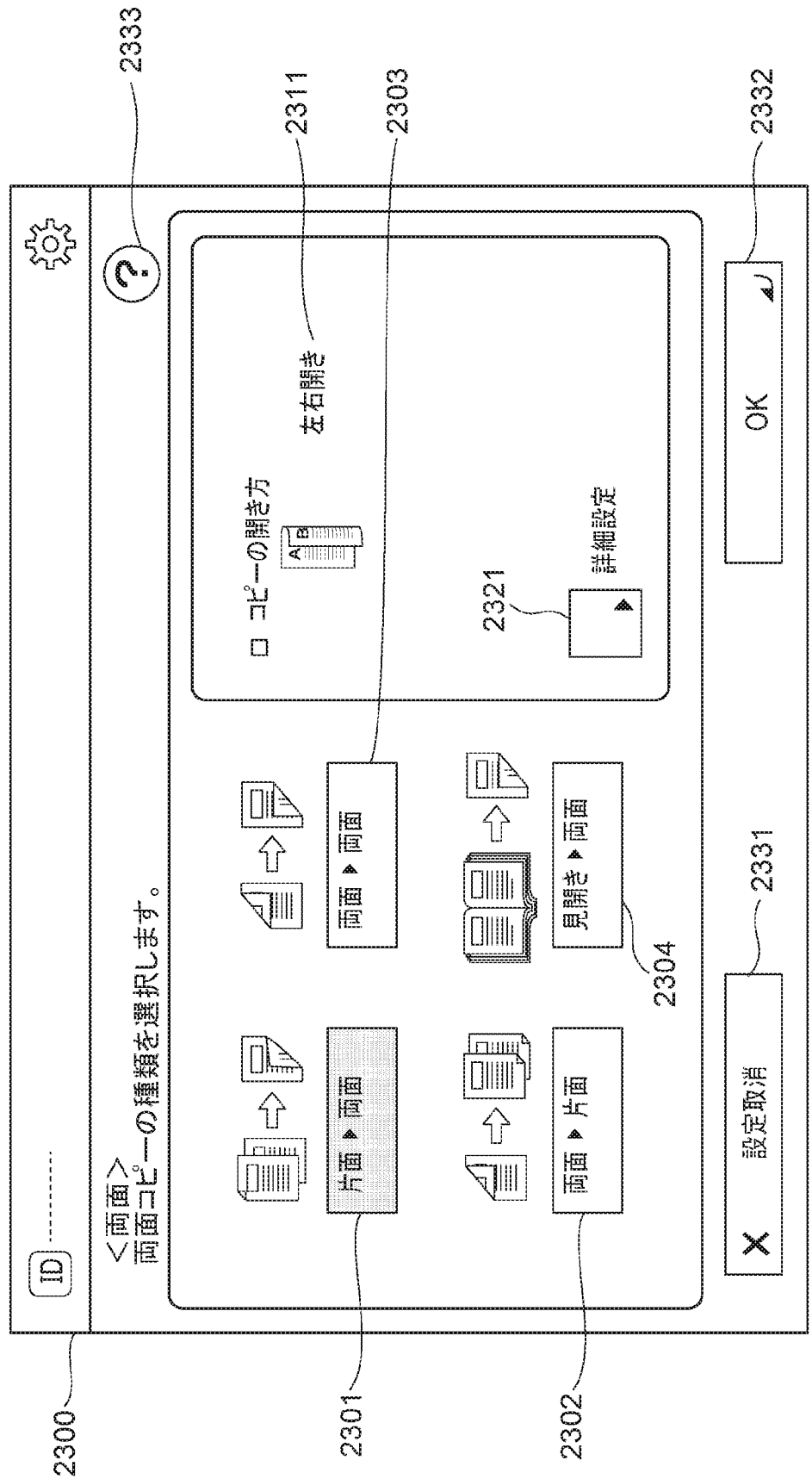
FIG. 23E illustrates a Japanese version of the screen illustrated in FIG. 23A.

FIG. 22D shows exemplary speech operations performed by the user 106 who views the screen illustrated in FIG. 22E. FIG. 23D shows exemplary speech operations performed by the user 106 who views the screen illustrated in FIG. 23E. FIG. 24D shows exemplary speech operations performed by the user 106 who views the screen illustrated in FIG. 24E.

In the operation-target determination information shown in FIG. 22D, FIG. 23D, and FIG. 24D, the UI components of the screen are each associated in advance with a coordinate range for accepting a touch operation on the LCD touch panel 200. The "touch coordinate range" in the operation-target determination information shows a range for accepting a touch operation on the corresponding UI component, and basically matches the display position and range of the UI component on the screen. The "touch coordinate range" in the operation-target determination information is represented by rectangle information, which includes X and Y coordinate values indicating the upper-left position of the rectangle and the width (W) and height (H) values of the rectangle.

FIG. 22A illustrates a color selection screen 2200 displayed by the display unit 806 for the user 106 to select a print color. The color selection screen 2200 includes UI components 2201, 2202, 2203, 2204, 2205, 2211, 2212, and 2213 that can be operated by the user 106.

The screen control information in FIG. 22B shows that when, for example, the button 2201 labeled "Auto (Color/Black)" is determined as the operation target, the display unit 806 performs control so as to highlight the button 2201. Also, when the button 2204 labeled "Single Color" is determined as the operation target, the display unit 806 performs control so as to enable transition to a single-color advanced settings screen (not shown). Also, when the hardware key (start key) 207 is determined as the operation target, the device control unit 808 starts execution of a copy job and the display unit 806 performs control so as to enable transition to a copy job start screen (not shown).

The screen control information in FIG. 22C is empty. This indicates that the color selection screen 2200 does not have a UI component that can be operated only by speech.

The operation-target determination information in FIG. 22D shows that when the group-ID determination result is {ID: DRG00008} or {ID: DRG00008, ID: COL00000, ID: COL00102}, the button 2201 is determined as the operation target. For example, assume that the user 106 speaks "Jido (Auto)" during display of the color selection screen 2200. In this case, from the group-ID determination result {ID: DRG00008} generated by the group-ID determining unit 707, the operation-target determining unit 807 determines that the button 2201 is the operation target.

The operation-target determination information in FIG. 22D also shows that the buttons 2201, 2202, 2203, 2204, 2205, 2211, 2212, and 2213, each having rectangle information representing the touch coordinate range, are capable of accepting a touch operation on the LCD touch panel 200. For example, when touch coordinates are (X: 200, Y: 250), the operation-target determining unit 807 determines the button 2201 included in the touch coordinate range in the operation-target determination information as the operation target. The hardware keys 203 and 207, for which the corresponding cells of the touch coordinate ranges in FIG. 22D are each provided with a diagonal line, are UI components that are each determined as the operation target on the basis of the detection of a press of the hardware key included in the operation panel 509.

FIG. 23A illustrates a two-sided copy settings screen 2300 displayed by the display unit 806 for the user 106 to select the type of two-sided copying. The two-sided copy settings screen 2300 includes UI components 2301, 2302, 2303, 2304, 2311, 2321, 2331, 2332, and 2333 that can be operated by the user 106.

The screen control information in FIG. 23B shows that when, for example, the button 2321 labeled "Set Details" is determined as the operation target, the display unit 806 performs control so as to enable transition to a flipping-format advanced settings screen 2400 illustrated in FIG. 24A.

The screen control information in FIG. 23C shows information about a UI component that can be operated only by speech of the user 106. For example, unlike the UI components (selection objects) included in the screen control information in FIG. 23B, the display label 2311 shown in the screen control information in FIG. 23C cannot be operated by touch of the user 106. The display label 2311 is a UI component for displaying a set value that is set on the flipping-format advanced settings screen 2400 illustrated in FIG. 24A.

The operation-target determination information in FIG. 23D shows that when the group-ID determination result is {ID: OPR00048, ID: OPR00040} or {ID: LYT00023, ID: OPR00040}, the button 2321 is determined as the operation target. For example, assume that the user 106 speaks "Shosai-settei (Set details)" during display of the two-sided copy settings screen 2300. In this case, from the group-ID determination result {ID: OPR00048, ID: OPR00040} generated by the group-ID determining unit 707, the operation-target determining unit 807 determines that the button 2321 is the operation target. Then, on the basis of this determination result and the screen control information, the flipping-format advanced settings screen 2400 illustrated in FIG. 24A is displayed.

The operation-target determination information in FIG. 23D shows that when the group-ID determination result is {ID: LYT00023, ID: POS00023, ID: LYT00023} or {ID: LYT00023, ID: POS00022, ID: LYT00023}, the display label 2311 is determined as the operation target. For example, assume that the user 106 speaks "Hiraki-kata-o-joge-biraki-ni-henko (Change the flipping format to calendar type (up and down))" during display of the two-sided copy settings screen 2300. In this case, from the group-ID determination result {ID: LYT00023, ID: POS00022, ID: LYT00023} generated by the group-ID determining unit 707, the operation-target determining unit 807 determines that the display label 2311 is the operation target. Then, on the basis of this determination result and the screen control information, the displayed content of the display label 2311 is updated. That is, the data management unit 803 manages the group ID sets in the operation-target determination information such that they include group IDs corresponding to UI components of the destination screen subsequently displayed by transition.

The operation-target determination information in FIG. 23D also shows that the buttons 2301, 2302, 2303, 2304, 2321, 2331, 2332, and 2333, each having rectangle information representing the touch coordinate range, are capable of accepting a touch operation on the LCD touch panel 200.

The hardware keys 203 and 207, for which the corresponding cells of the touch coordinate ranges in FIG. 23D are each provided with a diagonal line, are UI components that are each determined as the operation target on the basis of the detection of a press of the hardware key included in the operation panel 509. In FIG. 23D, the touch coordinate range of the display label 2311 is indicated by "-". This means that the display label 2311 appears on the LCD touch panel 200, but is not designed to accept a touch operation.

FIG. 24A illustrates the flipping-format advanced settings screen 2400 displayed by the display unit 806 for the user 106 to select the flipping format of two-sided copies. The flipping-format advanced settings screen 2400 includes UI components 2401, 2402, 2411, and 2421 that can be operated by the user 106. FIGS. 24B and 24C show screen control information of the flipping-format advanced settings screen 2400, and FIG. 24D shows operation-target determination information of the flipping-format advanced settings screen 2400.

(Processing Flow of Device Control Program of Image Forming Apparatus)

Figure 25:
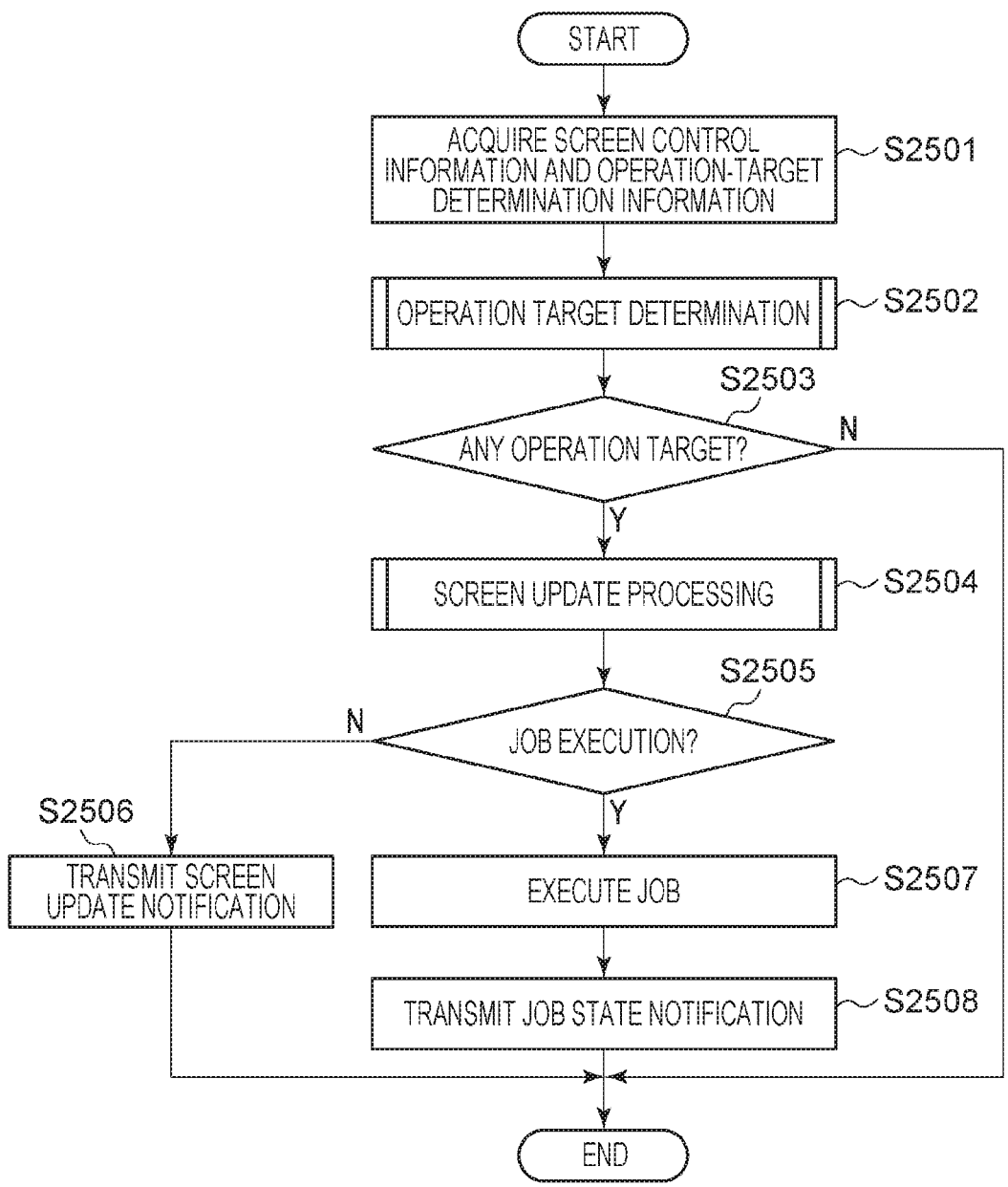
FIG. 25 is a diagram illustrating a processing flow of the control program of the image forming apparatus.
Figure 26:
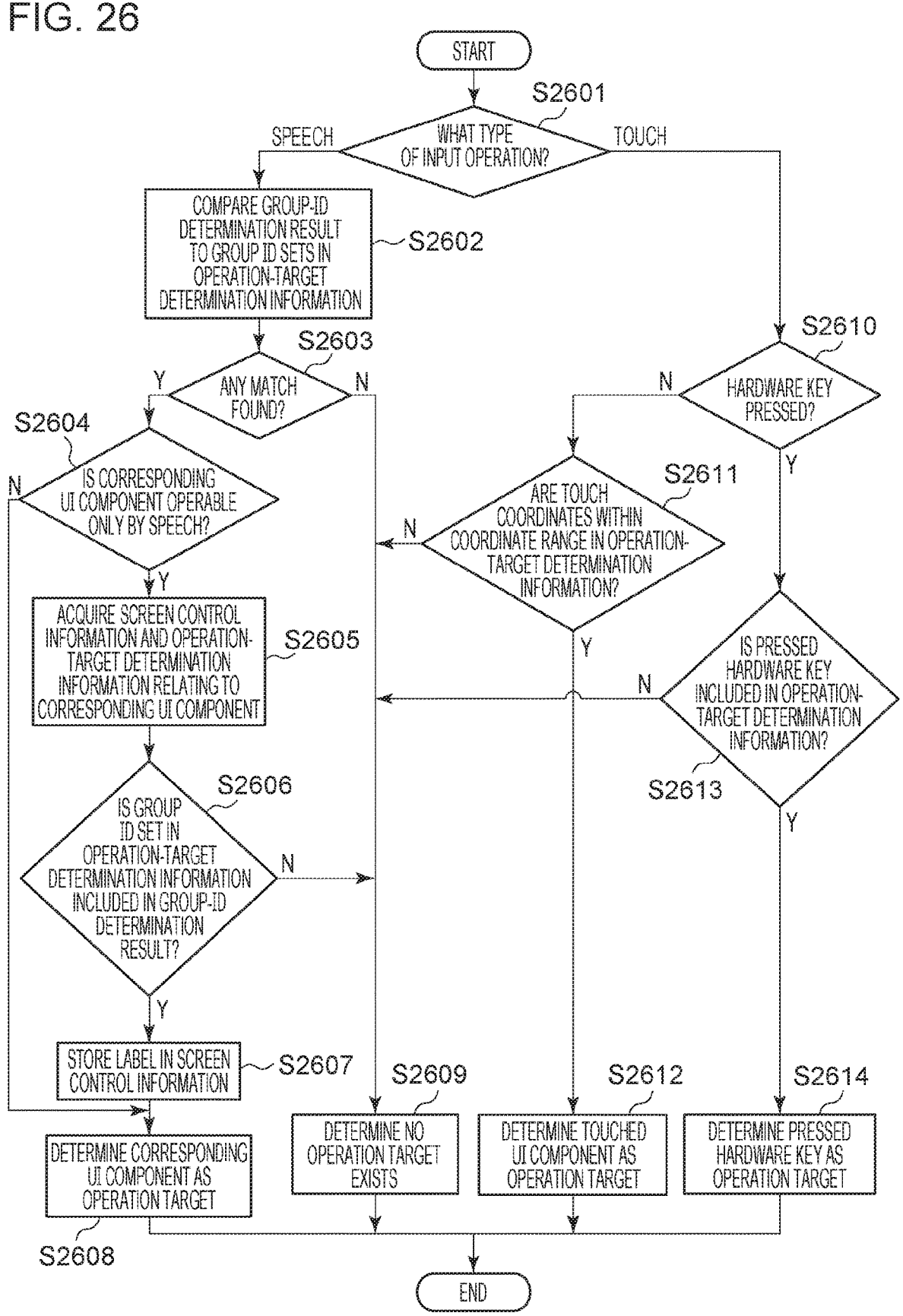
FIG. 26 is a diagram illustrating another processing flow of the control program of the image forming apparatus.
Figure 27A:
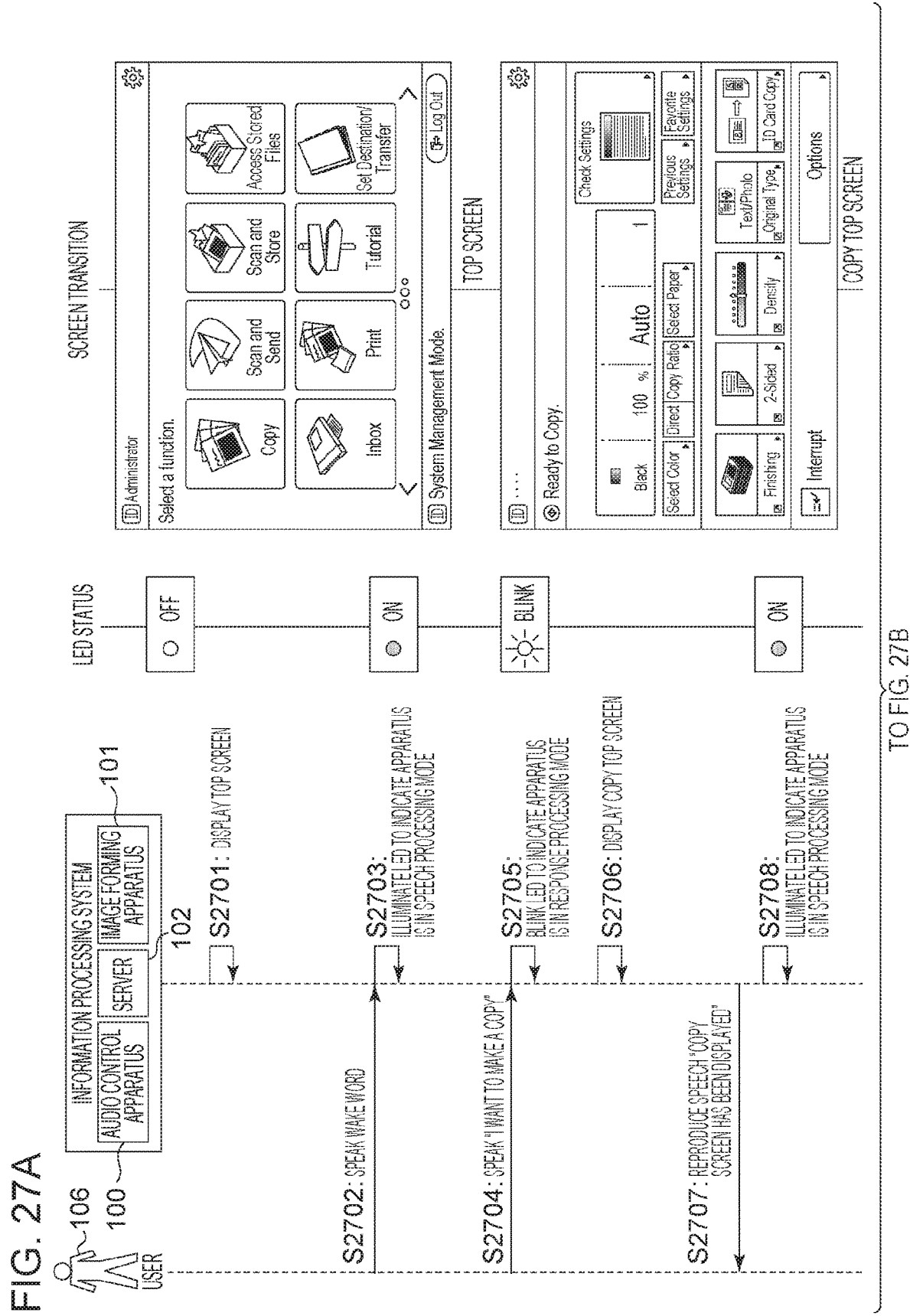
Figure 27C:
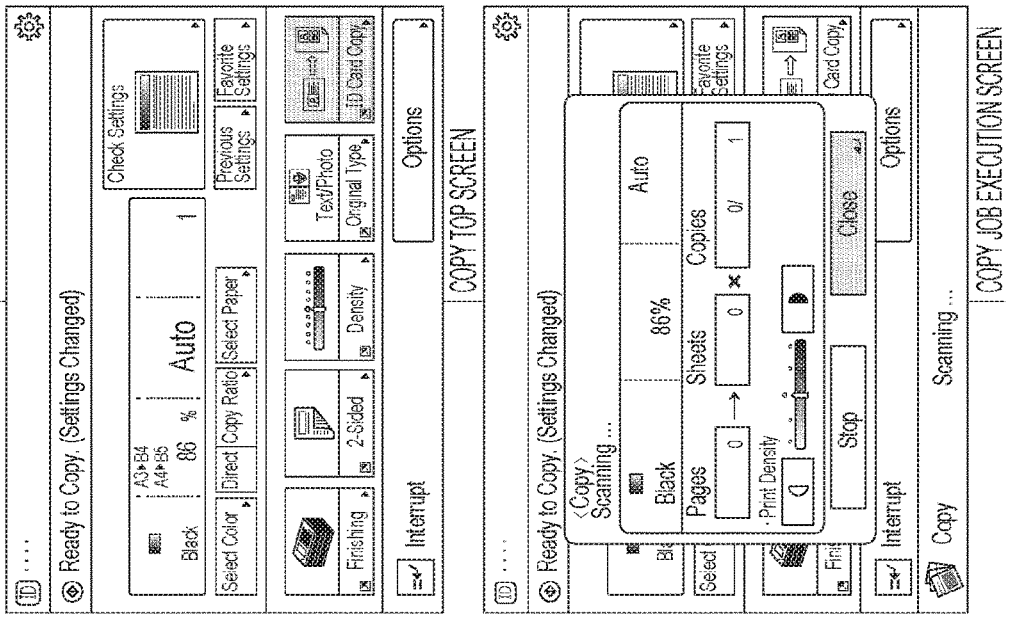
Figure 27D:
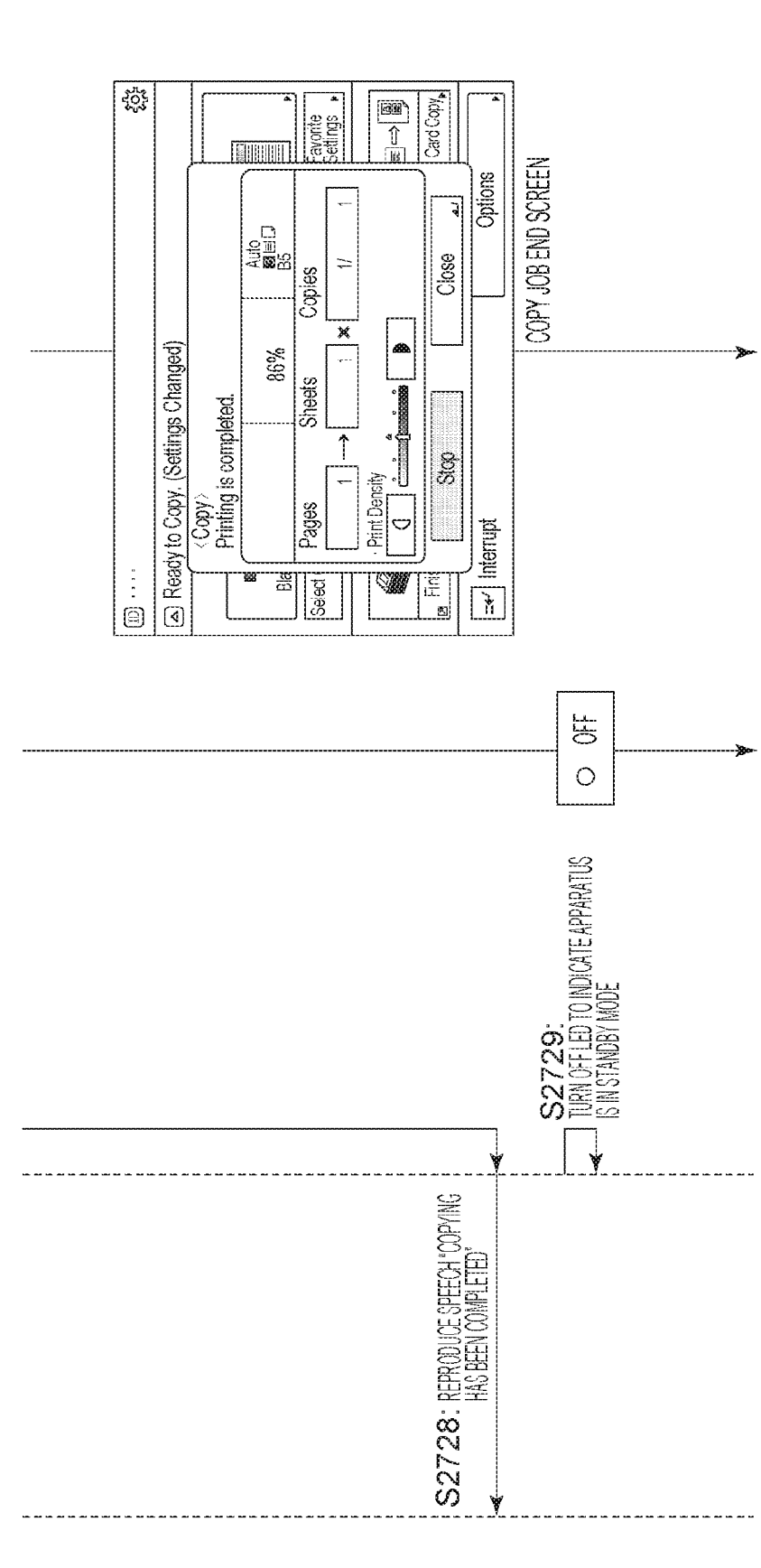

FIG. 25 is a flowchart illustrating processing performed by the device control program 801 of the image forming apparatus 101 for accepting input operation. The processing for accepting input operation is executed after the data transmitting and receiving unit 802 receives a group-ID determination result. Alternatively, this processing is executed after the operation I/F 508 detects a touch operation on the LCD touch panel 200 or a press of any of the hardware keys 201 to 210 on the operation panel 509. For example, FIG. 25 illustrates the processing flow of the device control program 801 corresponding to S914, S915, S923, S928, S933, S943 to S945, and S952 in the sequence diagram of FIGS. 9A to 9C. FIG. 26 is a flowchart illustrating details of operation target determination in S2502, which is part of the processing of the device control program 801 illustrated in FIG. 25.

Hereinafter, a processing flow performed while the display unit 806 is displaying the two-sided copy settings screen 2300 in FIG. 23A will be described as an example.

In S2501, screen control information and operation-target determination information that correspond to the screen displayed by the display unit 806 are acquired. When the display unit 806 displays the two-sided copy settings screen 2300 illustrated in FIG. 23A, the screen control information in FIGS. 23B and 23C and the operation-target determination information in FIG. 23D corresponding to the two-sided copy settings screen 2300 are acquired.

In S2502, the operation-target determining unit 807 performs operation target determination using the operation-target determination information acquired in S2501. The operation target determination involves determining, as an operation target, a UI component of the screen displayed on the LCD touch panel 200 or any of the hardware keys 201 to 210 included in the operation panel 509.

The details of S2502 will now be described with reference to FIG. 26.

First, in S2601, the type of input operation is determined. In the flowchart of FIG. 25, if a group-ID determination result is received by the data transmitting and receiving unit 802, the operation-target determining unit 807 determines that a speech operation has been executed. Alternatively, if the operation IF 508 detects a touch operation on the LCD touch panel 200 or a press of any of the hardware keys 201 to 210 on the operation panel 509, the operation-target determining unit 807 determines that a touch or press operation has been executed. If the type of input operation is speech, that is, if, as in FIG. 9A, the user 106 speaks after instructing to start a speech operation in S905 and the data transmitting and receiving unit 802 receives a group-ID determination result from the server 102, the process proceeds to S2602. If the type of input operation is a touch operation or a press of a hardware key, the process proceeds to S2610.

In S2602 and S2603, the operation-target determining unit 807 determines whether the group-ID determination result received by the data transmitting and receiving unit 802 matches any of the group ID sets in the operation-target determination information acquired in S2501. For example, if the user 106 speaks "Furukara (Full color)" irrelevant to the two-sided copy settings screen 2300 being displayed, the operation-target determining unit 807 determines that the group-ID determination result {ID: COL00201} determined by the group-ID determining unit 707 does not match any of the group ID sets in the operation-target determination information in FIG. 23D, and the process proceeds to S2609.

In S2609, the operation-target determining unit 807 determines that there is no operation target.

For example, if the user 106 speaks "Katamen-genko-o-ryomen-de-kopi-shite (Copy one-sided originals on both sides)" relevant to the operation on the two-sided copy settings screen 2300 being displayed, the group-ID determination result {ID: SID00001, ID: SHT00006, ID: SID00000, ID: FNC00001} determined by the group-ID determining unit 707 is transmitted. The operation-target determining unit 807 determines that the group-ID determination result partially matches the group ID sets associated with the "1-Sided→2-Sided" button 2301 in the operation-target determination information in FIG. 23D. The process then proceeds to S2604, where it is determined whether the "1-Sided→2-Sided" button 2301 is a UI component that can be operated only by speech. Since the "1-Sided→2-Sided" button 2301 corresponding to the group-ID determination result is not included in the screen control information shown in FIG. 23C (but is included in FIG. 23B), the process proceeds to S2608. In S2608, the operation-target determining unit 807 determines the "1-Sided→2-Sided" button 2301 corresponding to the group-ID determination result as the operation target.

Also, for example, if the user 106 speaks "Hiraki-kata-o-joge-biraki-ni-henko (Change the flipping format to calendar type (up and down))" relevant to the operation on the two-sided copy settings screen 2300 being displayed, the group-ID determination result {ID: LYT00023, ID: POS00022, ID: LYT00023, ID: OPR00041} determined by the group-ID determining unit 707 is transmitted. The operation-target determining unit 807 determines that the group-ID determination result partially matches the group ID sets associated with the display label 2311 in the operation-target determination information in FIG. 23D. The process then proceeds to S2604, where it is determined whether the display label 2311 is a UI component that can be operated only by speech. The display label 2311 corresponding to the group-ID determination result is included in FIG. 23C showing the screen control information for UI components that can be operated only by speech. Therefore, the process proceeds to S2605. In S2605, the screen control information (shown in FIGS. 24B and 24C) and the operation-target determination information (shown in FIG. 24D) corresponding to the flipping-format advanced settings screen 2400 relevant to the display label 2311 are acquired. In S2606, the operation-target determining unit 807 determines whether any of the group ID sets in the operation-target determination information acquired in S2605 is included in the group- ID determination result. In this example, the operation-target determining unit 807 determines that the group ID set "POS000022+LYT00023" in the operation-target determination information shown in FIG. 24D is included in the group-ID determination result {ID: LYT00023, ID: POS00022, ID: LYT00023}. In S2607, the label of the UI component having the group ID set determined to be included in the group-ID determination result in S2606 is acquired from the screen control information (FIG. 24B) and stored. In this example, the label "Calendar Type" of the button 2402 is stored. That is, after determining whether a set value to be displayed in the display label 2311 is included in the speech of the user 106, the operation-target determining unit 807 stores the set value for updating the displayed content of the display label 2311 in the subsequent processing. Then in S2608, in this example, the operation-target determining unit 807 determines the display label 2311 as the operation target.

In S2610, the operation-target determining unit 807 determines whether a press of any of the hardware keys 201 to 210 on the operation panel 509 has been detected through the operation I/F 508. If a press of any of the hardware keys 201 to 210 has been detected, the process proceeds to S2613 and otherwise proceeds to S2611.

In S2611, the operation-target determining unit 807 determines whether the user 106 has operated any UI component displayed on the LCD touch panel 200. That is, the operation-target determining unit 807 determines whether there is a UI component whose touch coordinates on the LCD touch panel 200, acquired by the operation IF 508, are within the corresponding touch coordinate range in the operation-target determination information acquired in S2501. For example, if the touch coordinates are (X: 500, Y: 450), the operation-target determining unit 807 determines, as the operation target, the button 2321 included in the touch coordinate range in the operation-target determination information in FIG. 23D (S2612). Also, for example, if the touch coordinates are (X: 600, Y: 200), since there is no UI component included in the touch coordinate range in the operation-target determination information, the operation-target determining unit 807 determines that there is no operation target (S2609).

In S2613, the operation-target determining unit 807 determines whether the hardware key pressed by the user 106 and detected is included in the operation-target determination information acquired in S2501. If the hardware key is included in the operation-target determination information, the process proceeds to S2614, where the hardware key pressed and detected is determined as the operation target. If the hardware key is not included in the operation-target determination information, the process proceeds to S2609, where the operation-target determining unit 807 determines that there is no operation target. For example, if the user 106 has pressed the hardware key (start key) 207, which is included in the operation-target determination information in FIG. 23D, the operation-target determining unit 807 determines the hardware key 207 as the operation target. For example, if the user 106 has pressed the hardware key (or any key of the numeric keypad) 201, which is not included in the operation-target determination information in FIG. 23D, the operation-target determining unit 807 determines that there is no operation target.

The process then returns to S2503 in FIG. 25.

In S2503, it is determined whether, in the operation target determination in S2502 (detailed in FIG. 26), the operation-target determining unit 807 has determined any UI component as the operation target. If the operation-target determining unit 807 has determined that there is no operation target, the process ends here. If the interactive session continues at this point, the data transmitting and receiving unit 802 may transmit the information indicating that "there is no operation target" to the server 102, where, upon receiving this information, the data transmitting and receiving unit 702 synthesizes speech from text data for prompting the user 106 to operate again.

In S2504, the display unit 806 updates the displayed content of the screen on the basis of the result of the operation target determination performed in S2502 and the screen control information acquired in S2501.

For example, if the "1-Sided→2-Sided" button 2301 is determined as the operation target in S2502, the display unit 806 updates the screen to highlight the "1-Sided→2-Sided" button 2301 on the basis of the screen control information in FIG. 23B.

For example, if the display label 2311 is determined as the operation target in S2502 and "Calendar Type" is stored as the label in S2607, the display unit 806 updates the displayed content of the display label 2311 to "Calendar Type".

In S2505, on the basis of the result of the operation target determination performed in S2502 and the screen control information acquired in S2501, it is determined whether to execute a job. If any job is to be executed, the process proceeds to S2507 and otherwise proceeds to S2506. For example, if the "1-Sided→2-Sided" button 2301 is determined as the operation target in S2502, since there is no internal processing in FIG. 23B, it is determined that no job is to be executed. For example, if the start key 207 is determined as the operation target in S2502, since "start execution of copy job" appears as internal processing in FIG. 23B, it is determined that the job is to be executed.

In S2506, the data transmitting and receiving unit 802 transmits the screen update notification to the server 102, as in S916 of FIG. 9A. The screen update notification may be transmitted only when the interactive session is in progress.

In S2507, the job is executed on the basis of set job parameters. Specifically, the image forming apparatus 101 executes a series of image forming operations (e.g., copying, scanning, or printing). For example, when a copy job is to be started while the "1-Sided→2-Sided" button 2301 is being highlighted on the screen as illustrated in FIG. 23A, the job is executed by using set values for the "1-Sided→2-Sided" button 2301 as job parameters.

In S2508, the data transmitting and receiving unit 802 transmits a job state notification to the server 102, as in S946 and S950 described above. The job state notification may be transmitted only when the interactive session is in progress.

(Interactions Between System and User)

FIGS. 27A to 27D present a schematic diagram for describing exemplary interactions between the user 106 who performs speech operations and the information processing system responding thereto, illustrated in the sequence diagram of FIGS. 9A to 9C. FIGS. 27A to 27D illustrate correspondences between, and flows of, speech examples, which are speech operations of the user 106, and the corresponding LED statuses, each presented by the information processing system to indicate the audio processing mode of the audio control apparatus 100. FIGS. 27A to 27D also illustrate correspondences between, and flows of, the screens displayed on the LCD touch panel 200 of the operation panel 509 of the image forming apparatus 101 and the audio responses reproduced by the audio control apparatus 100.

First, the information processing system displays the top screen on the LCD touch panel 200 of the operation panel 509 (S2701). The LED 312 is off and this indicates that the audio control apparatus 100 is in standby mode. If the user 106 speaks a wake word at this point (S2702), the information processing system starts to accept a speech operation and illuminates the LED 312 to indicate that the audio control apparatus 100 is in speech processing mode (S2703). Note that S2702 and S2703 are presented as examples of S905 and S906, respectively, in the sequence diagram of FIG. 9A. When the user 106 speaks "I want to make a copy" (S2704) after the wake word, the information processing system blinks the LED 312 to indicate that the audio control apparatus 100 is in response processing mode (S2705) and displays the copy top screen (S2706). Then, the information processing system reproduces "Copy screen has been displayed" as an audio response (S2707) and illuminates the LED 312 again to prompt the user 106 to speak (S2708). Note that S2704, S2705, S2706, S2707, and S2708 are presented as examples of S907, S908, S915, S919, and S920, respectively, in the sequence diagram of FIG. 9A.

When the user 106 speaks "Change the ratio" (S2709), the information processing system blinks the LED 312 (S2710) and displays a ratio setting screen (S2711). Then, the information processing system reproduces "You can change the copy ratio" as an audio response (S2712) and illuminates the LED 312 (S2713). Note that S2709, S2710, S2711, S2712, and S2713 are presented as examples of S921, S922, S915, S924, and S925, respectively, in the sequence diagram of FIGS. 9A and 9B.

When the user 106 speaks "I want to copy the A4 sheet onto B5 sheet" (S2714), the information processing system blinks the LED 312 (S2715) and updates the screen to reflect the change in set ratio (S2716). Then, the information processing system reproduces "Copy ratio has been set at 86%" as an audio response (S2717) and illuminates the LED 312 (S2718). Note that S2714, S2715, S2716, S2717, and S2718 are presented as examples of S926, S927, S915, S929, and S925, respectively, in the sequence diagram of FIGS. 9A and 9B.

When the user 106 speaks "Ratio setting has been finished" (S2719), the information processing system blinks the LED 312 (S2720) and displays the copy top screen reflecting the change in set ratio (S2721). Then, the information processing system reproduces an audio response "You can start copying" (S2722) and illuminates the LED 312 (S2723). Note that S2719, S2720, S2721, S2722, and S2723 are presented as examples of S931, S932, S915, S934, and S935, respectively, in the sequence diagram of FIGS. 9A to 9C.

When the user 106 speaks "Start copying" (S2724), the information processing system blinks the LED 312 (S2725) and starts to execute the copy job. Upon starting the copy job, the information processing system displays a screen indicating that the copy job is in progress (S2726) and reproduces an initial audio response "Copying will start" (S2727). Upon completion of the copy job, the information processing system displays, for a certain length of time, a screen indicating that the copy job has been completed, reproduces a final audio response "Copying has been completed" (S2728), and turns off the LED 312 to indicate that the audio control apparatus 100 has stopped accepting speech (S2729). Note that S2724, S2725, S2726, S2727, S2728, and S2729 are presented as examples of S936, S937, S944, S949, S954, and S955, respectively, in the sequence diagram of FIG. 9C.

FIGS. 28A to 28E are for explaining an example that can improve operability in making image forming instructions. Specifically, FIGS. 28A to 28E schematically illustrate how the display unit 806 updates the screen in the example illustrated in FIGS. 23A to 23E and FIGS. 24A to 24E.

Figure 28A:
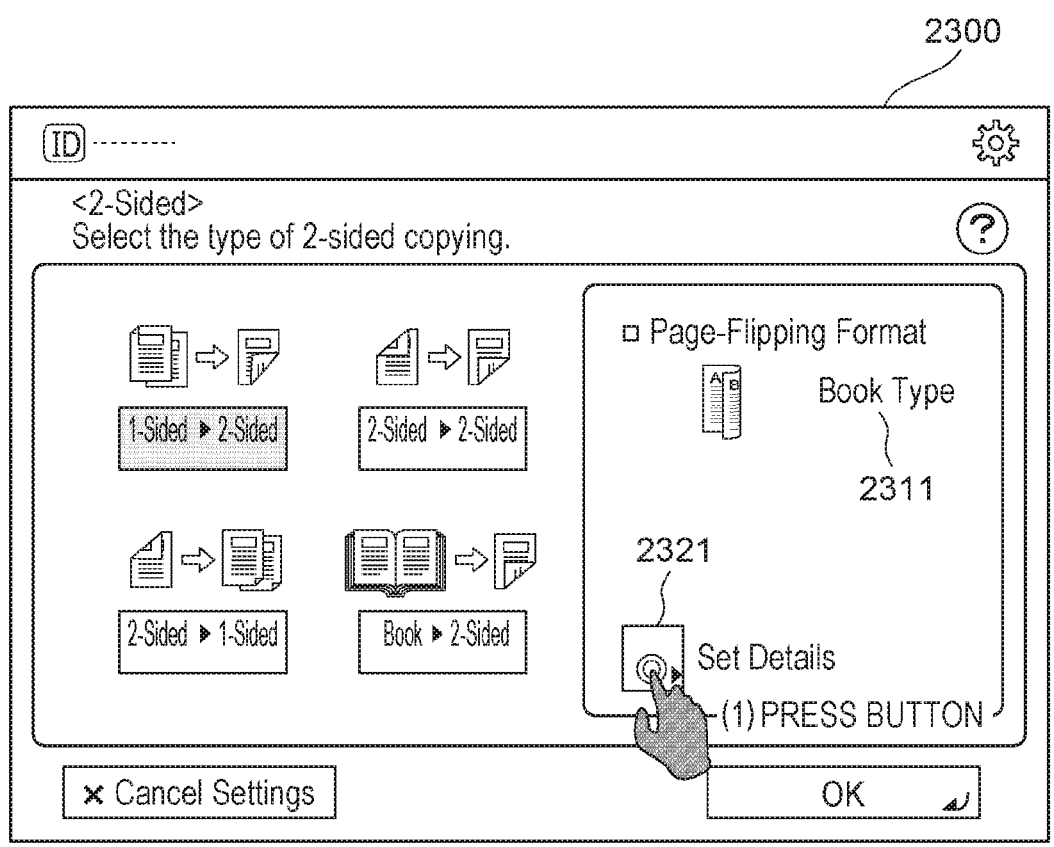
FIGS. 28A, 28B, 28C, 28D, and 28E are diagrams illustrating how a screen displayed by the control program of the image forming apparatus is updated.
Figure 28B:
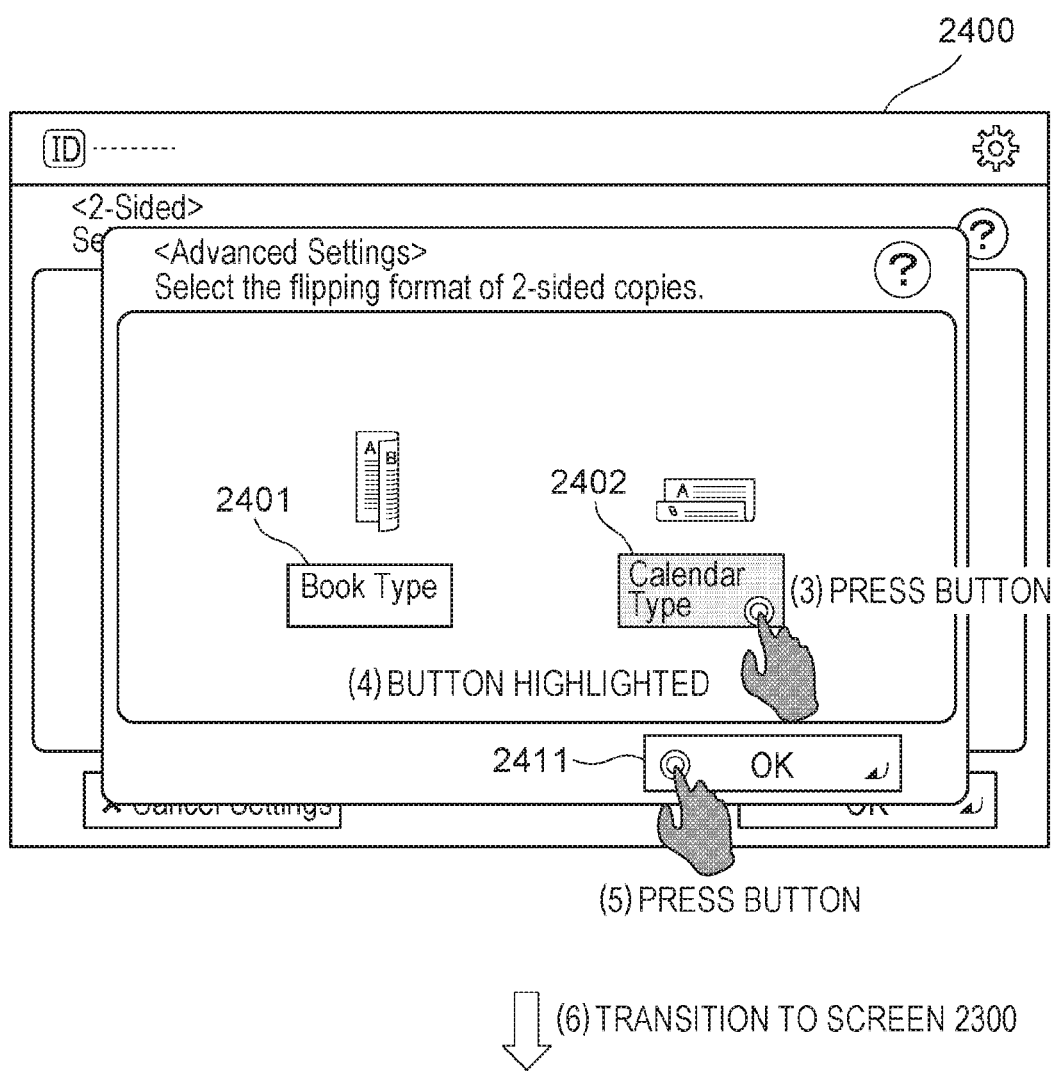
Figure 28C:
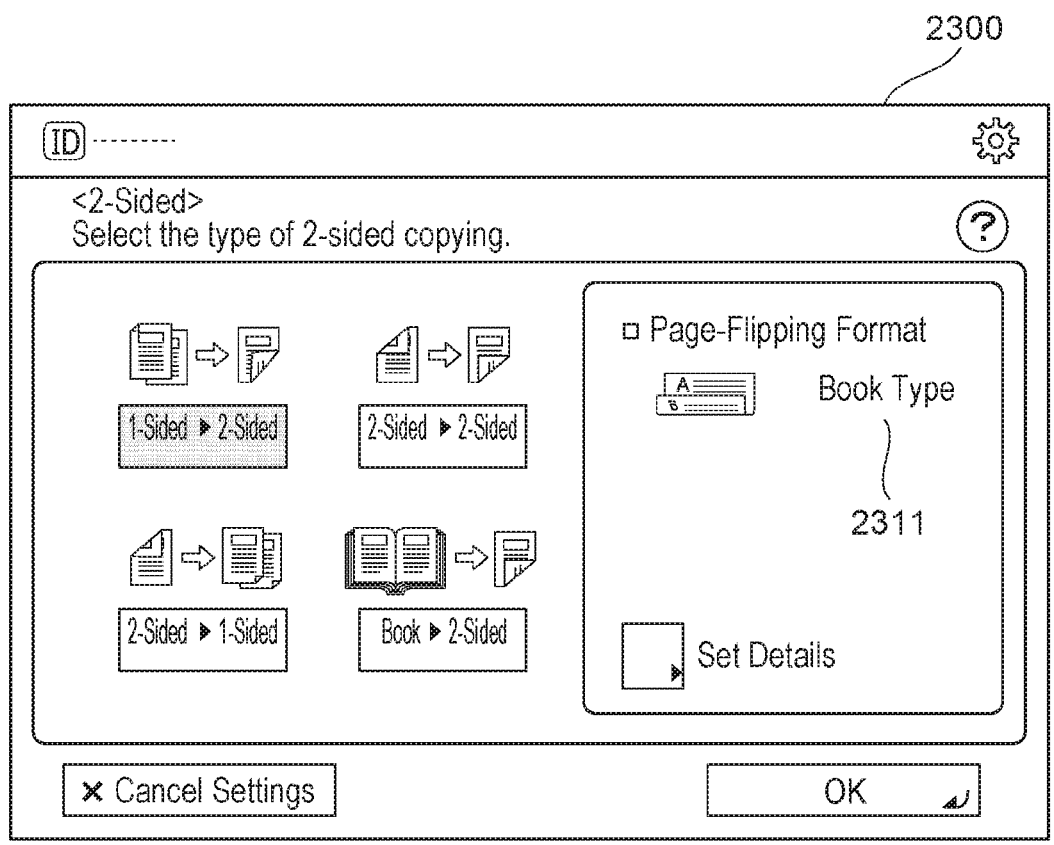

FIGS. 28A to 28C illustrate how, using the screen control information shown in FIG. 23B and FIG. 24B, the display unit 806 updates the screen when an operation for changing the setting of the page-flipping format of two-sided copies is performed. Assume that the user 106 wants to change the set value displayed in the display label 2311 on the two-sided copy settings screen 2300. In the touch operation, for example, after touching the "Set Details" button 2321, the user 106 touches the button 2401 or 2402 on the flipping-format advanced settings screen 2400 subsequently displayed. The set value displayed in the display label 2311 is not changed until the user 106 presses the OK button 2411. Thus, when there is a UI component designed only for displaying a set value that can be set on another screen, the example of touch operation on the two-sided copy settings screen 2300 requires at least three touches and screen updating associated therewith.

Figure 28D:
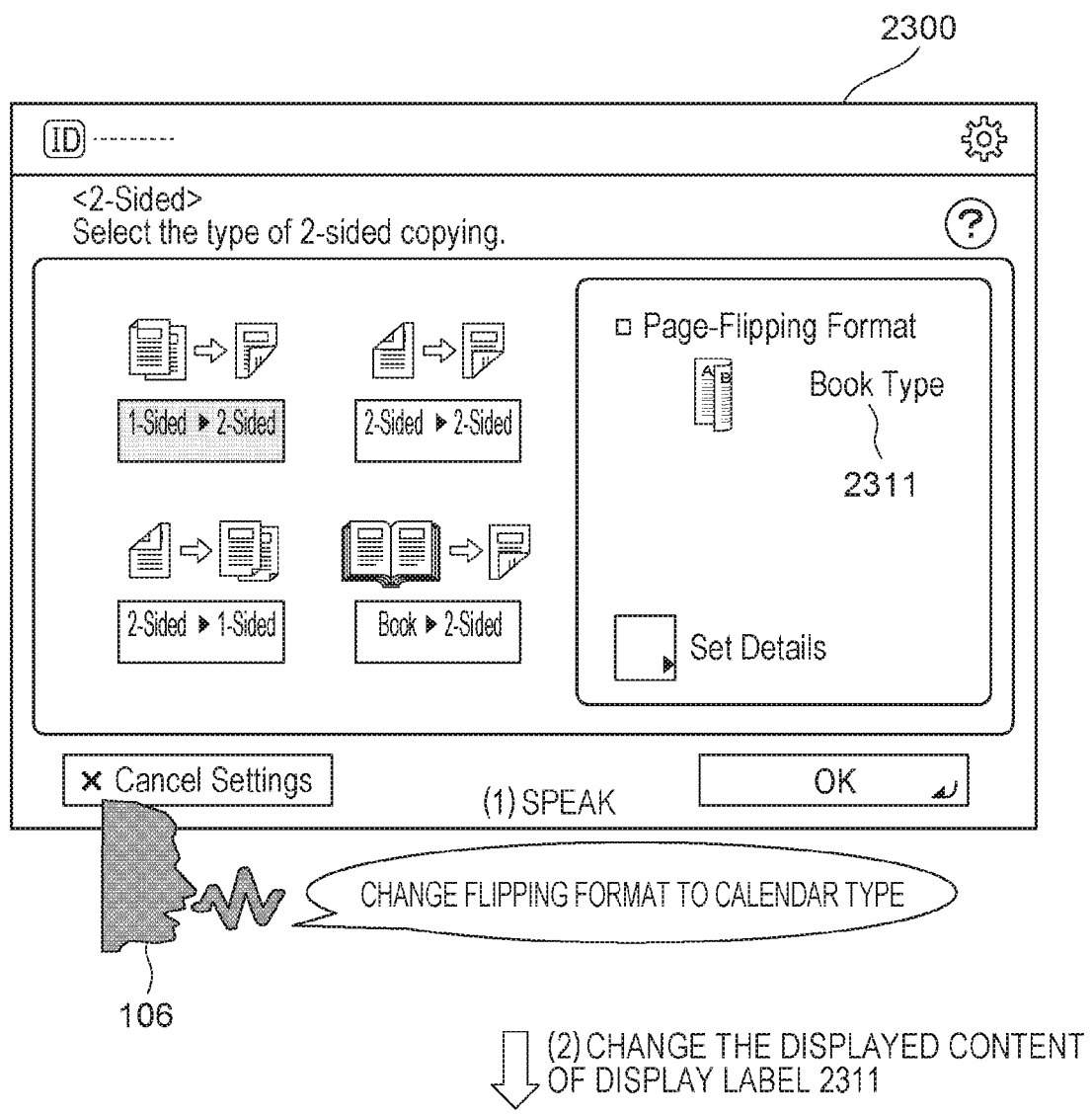
Figure 28E:
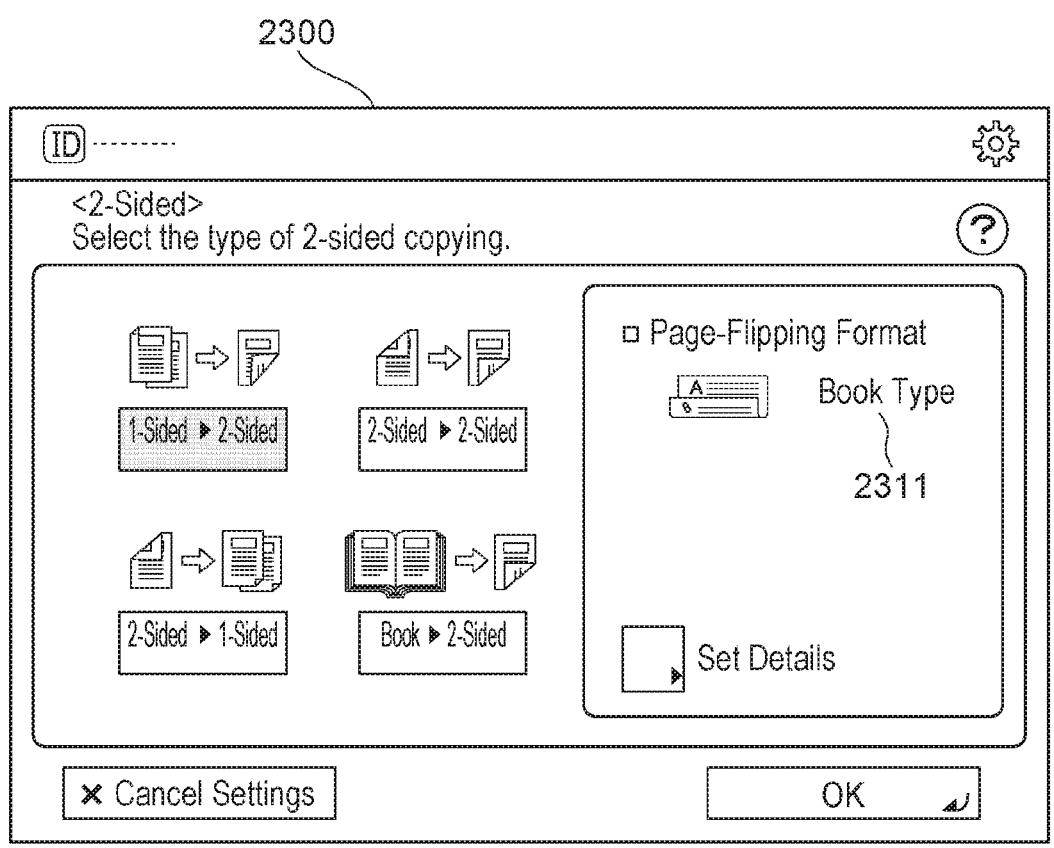

FIGS. 28D and 28E illustrate how, using the screen control information shown in FIG. 23C, the display unit 806 updates the screen when an operation for changing the setting of the page-flipping format of two-sided copies is performed by speech. For example, assume that the user 106 speaks "Hiraki-kata-o-joge-biraki-ni-henko (Change the flipping format to calendar type (up and down))" during display of the two-sided copy settings screen 2300. In this case, as illustrated in FIGS. 28D and 28E, the set value displayed in the display label 2311 is changed from "Book Type" to "Calendar Type" without transition to the flipping-format advanced settings screen 2400 for selecting the page-flipping format of two-sided copies. That is, in this example of speech operation, the displayed set value can be changed by a single speech of the user 106. It is thus possible to improve operability in making image forming instructions.

(Conditions for Applying "Set-Value Change Control without Screen Transition")

Figure 29:
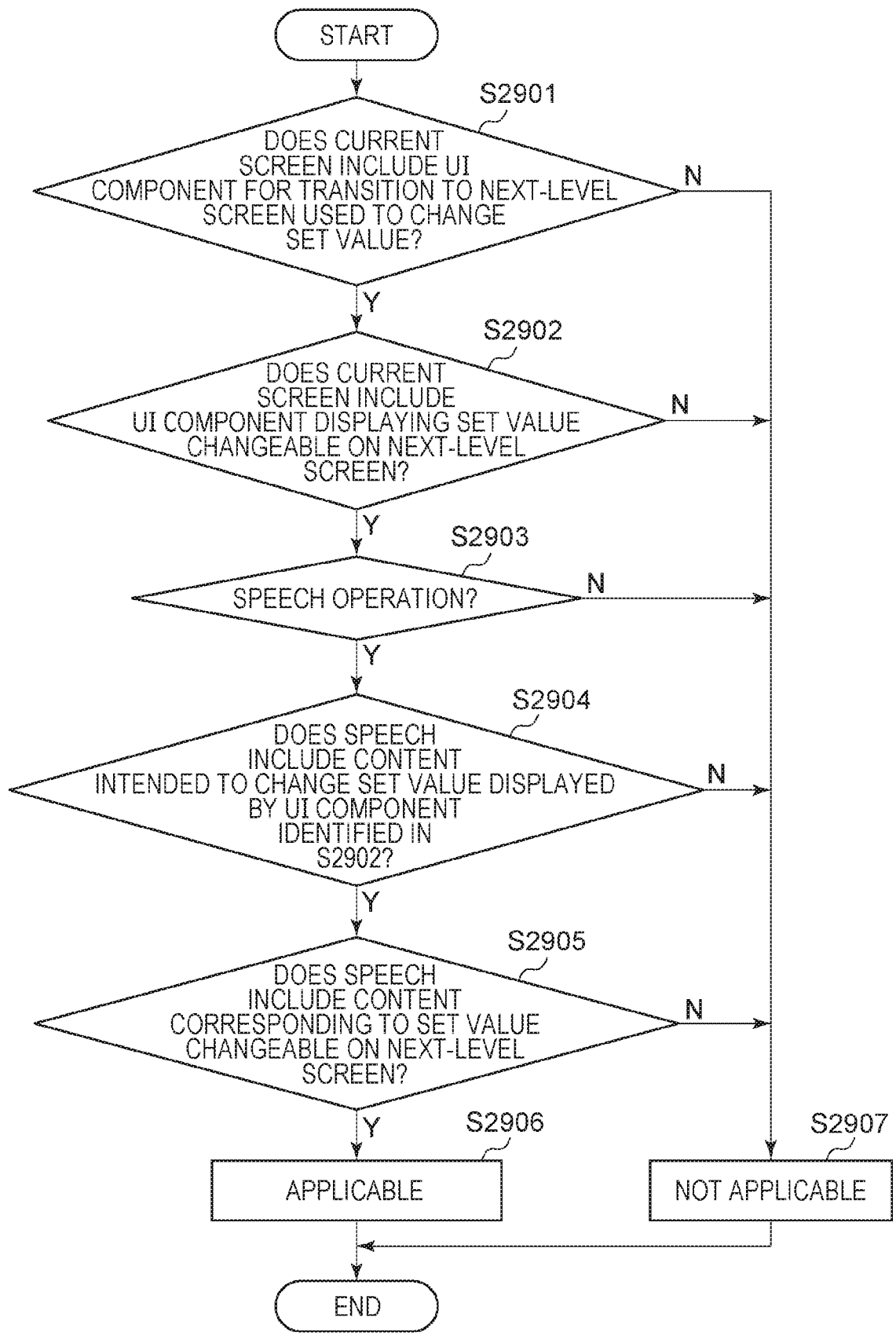
FIG. 29 is a flowchart illustrating conditions under which the control program of the image forming apparatus is applicable.

FIG. 29 is a flowchart for generally explaining conditions under which specific control is applicable. By this control, a displayed set value is changed by a single speech of the user 106. Processing represented by the flowchart of FIG. 29 is executed on the operation screen that includes, as illustrated in FIGS. 28D and 28E, a UI component designed only for displaying a set value that can be set on another screen. Hereinafter, the control described above will be referred to as "set-value change control without screen transition".

To determine whether the "set-value change control without screen transition" is applicable, it is first determined, in S2901, whether a currently displayed screen includes a UI component used to transition to a screen at the next level where a set value is changed. For example, if the currently displayed screen is the two-sided copy settings screen 2300 (see FIG. 23A), which includes the "Set Details" button 2321 for transition to the flipping-format advanced settings screen 2400 (see FIG. 24A) at the next level, the process proceeds to S2902, where the next condition is determined. On the other hand, if the currently displayed screen is the flipping-format advanced settings screen 2400, which does not include a UI component for transition to the setting screen at the next level, the "set-value change control without screen transition" described above is not applicable (S2907).

To determine whether the "set-value change control without screen transition" is applicable, it is further determined, in S2902, whether the currently displayed screen includes, aside from the UI component determined in S2901, a UI component that displays a set value that can be changed on the screen at the next level. For example, if the currently displayed screen is the two-sided copy settings screen 2300 (see FIG. 23A), which includes, aside from the "Set Details" button 2321, the display label 2311 designed only to display a set value that can be changed on the flipping-format advanced settings screen 2400, the process proceeds to S2903, where the next condition is determined. On the other hand, if the currently displayed screen is the color selection screen 2200 (see FIG. 22A), which includes the buttons 2204 and 2205 for transition to the setting screen (not shown) at the next level but does not include any UI component designed only to display a set value that can be changed on the setting screen at the next level, the "set-value change control without screen transition" is not applicable (S2907).

In S2903, it is determined whether the operation accepted from the user 106 is a speech operation. If so, the process proceeds to S2904 where the next condition is determined, and otherwise the "set-value change control without screen transition" is not applicable (S2907).

In S2904, it is determined whether speech spoken as a speech operation by the user 106 includes content intended to change the set value displayed in the UI component determined in S2902. Again, this is to determine whether the "set-value change control without screen transition" is applicable. Then in S2905, it is determined whether speech spoken as a speech operation by the user 106 includes content corresponding to a set value that can be changed on the setting screen at the next level. Again, this is to determine whether the "set-value change control without screen transition" is applicable. For example, if the user 106 speaks "Kopi-no-hiraki-kata-o-joge-biraki-ni-henko (Change the page-flipping format to calendar type (up and down))" during display of the two-sided copy settings screen 2300 (see FIG. 23A), then the "set-value change control without screen transition" is applicable. This is determined using the screen control information and the operation-target determination information for the corresponding screen (acquired in S2501 and S2605) and the group-ID determination result generated from audio data representing speech of the user 106 (see S2602 and S2606). To meet the applicable conditions in S2904 and S2905, the screen control information and the operation-target determination information are managed in advance by the data management unit 803.

(Remarks)

As described above, in the present embodiment, the screen displayed on the operation panel 509 of the image forming apparatus 101 can be operated by speech of the user 106. Particularly in the present embodiment, when a set value (before change) or setting item name is displayed on the current screen and there is another screen (advanced settings screen) for setting the set value, the set value can be changed (updated) without displaying the advanced settings screen. Then, the updated set value is eventually displayed. Thus, by speech of the user 106, operability in making image forming instructions is improved.

Note that a setting item with a set value that can be changed by speech operation may be a setting item with a set value that can be changed on a destination screen reached by transition from the currently displayed screen. In other words, for a setting item with a set value that cannot be changed on a destination screen (first screen) reached by transition from the currently displayed screen (second screen), no speech-based operation is to be accepted. That is, even by speech with the same content, the corresponding setting may not be changed depending on the screen currently displayed. This is to prevent the setting from being accidentally changed in response to users speech that is made on a screen (third screen) irrelevant to the setting to be changed.

Second Embodiment (Screen Control Information and Operation-Target Determination Information)

The first embodiment has described an example in which, for a setting item with a set value that cannot be changed by touch operation on a currently displayed screen (second screen) but can be changed on a transition destination screen (first screen), the set value is changed by speech operation. A second embodiment will describe an example in which, for a setting item with a set value that cannot be changed by touch operation on a currently displayed screen (second screen) but can be partially changed on a transition destination screen (first screen), a procedure for partially changing the setting is performed by speech operation. The setting item for which the procedure for partially changing the setting is performed on the transition destination screen (first screen) is a setting item for which, for example, the procedure for changing the setting is completed on a screen (third screen) reached by transition from the first screen. Note that the components used to provide the second embodiment are basically the same as those of the first embodiment, except some features to be described in detail. The same components as those of the first embodiment are denoted by the same reference numerals and their detailed description will be omitted.

FIG. 30A illustrates a screen displayed by the display unit 806, and FIG. 30D illustrates a Japanese version of the screen illustrated in FIG. 30A.

FIG. 30A illustrates a print job settings screen 3000 that displays print job settings received from the client terminal 103 by the data transmitting and receiving unit 802. The print job settings screen 3000 is used to give an instruction to start printing. The print job settings screen 3000 allows the user 106 to check the print job settings and change the settings as necessary. The print job settings screen 3000 includes UI components 3001, 3002, 3003, 3004, 3011, 3012, 3013, 3014, 3021, 3022, 3031, and 3032 that can be operated by the user 106. Also, the print job settings screen 3000 presents name information, such as "N in 1" (the number of pages to be printed on one sheet of paper), which indicates the name of an item for which an instruction can be given by speech operation.

The screen control information in FIG. 30B shows that when, for example, the button 3002 labeled "Change" is determined as the operation target, the display unit 806 performs control to enable transition to an "N in 1" settings screen 3100 illustrated in FIG. 31A.

The screen control information in FIG. 30C shows that unlike the UI components included in the screen control information in FIG. 30B, the display labels 3011 to 3014 are UI components that cannot be operated by touch of the user 106 and can be operated only by speech of the user 106. For example, the display label 3012 is a UI component for displaying a set value that is set on the "N in 1" settings screen 3100 illustrated in FIG. 31A. The screen control information in FIG. 30C also shows that when the display label 3012 is determined as the operation target, the corresponding control to be performed varies depending on the set value. The data management unit 803 of the present embodiment thus can manage different screen control for each set value set by speech operation.

FIG. 30C shows exemplary speech operations performed by the user 106 who views the screen illustrated in FIG. 30D.

The operation-target determination information in FIG. 30E shows that when the group-ID determination result is {ID: LYT00030, ID: LYT00003, ID: OPR00041} or {ID: LYT00030, ID: LYT00000, ID: OPR00041}, the button 3002 is determined as the operation target. For example, assume that the user 106 speaks "Peji-shuyaku-o-henko (Change the "N in 1" (number of pages to be printed per sheet))" during display of the print job settings screen 3000. In this case, from the group-ID determination result {ID: LYT00030, ID: LYT00003, ID: OPR00041} generated by the group-ID determining unit 707, the operation-target determining unit 807 determines that the button 3002 is the operation target. Then, on the basis of this determination result and the screen control information, the "N in 1" settings screen 3100 illustrated in FIG. 31A is displayed.

Also, the operation-target determination information in FIG. 30E shows that when the group-ID determination result is (ID: LYT00030, ID: LYT0003, ID: LYT00010 to LYT00016, ID: OPR00041), the display label 3012 is determined as the operation target. For example, assume that the user 106 speaks "Peji-shuyaku-o-tsuinwan-ni-henko (Change the "N in 1" (number of pages to be printed per sheet) to "2 in 1")" during display of the print job settings screen 3000. In this case, from the group-ID determination result {ID: LYT00030, ID: LYT0003, ID: LYT00011, ID: OPR00041} generated by the group-ID determining unit 707, the operation-target determining unit 807 determines that the display label 3012 is the operation target. The data management unit 803 manages the group ID sets in the operation-target determination information such that they include group IDs corresponding to UI components of the screen ("N in 1" settings screen 3100) to be subsequently displayed by transition.

The operation-target determination information in FIG. 30E also shows that the buttons 3001, 3002, 3003, 3004, 3021, 3022, 3031, and 3032, each having rectangle information representing the touch coordinate range, are capable of accepting a touch operation on the LCD touch panel 200. The hardware key 203, for which the corresponding cell of the touch coordinate range in FIG. 30E is provided with a diagonal line, is a UI component that is determined as the operation target on the basis of the detection of a press of the hardware key included in the operation panel 509. In FIG. 30E, the touch coordinate range of each of the display labels 3011 to 3014 is indicated by "-". This means that the display labels 3011 to 3014 appear on the LCD touch panel 200, but are not designed to accept a touch operation.

Figure 31E:
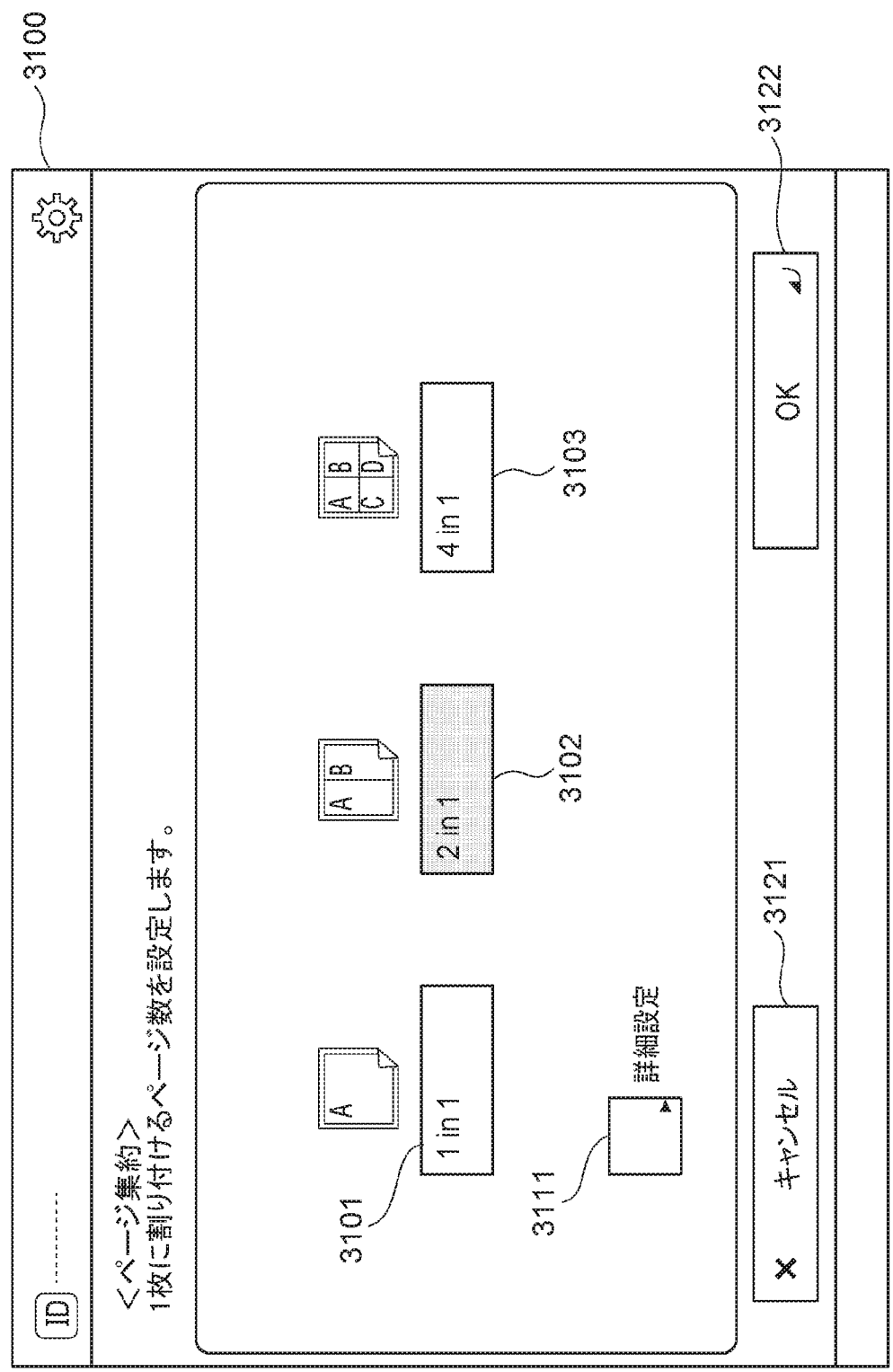
FIG. 31E illustrates a Japanese version of the screen illustrated in FIG. 31A.
Figure 32A:
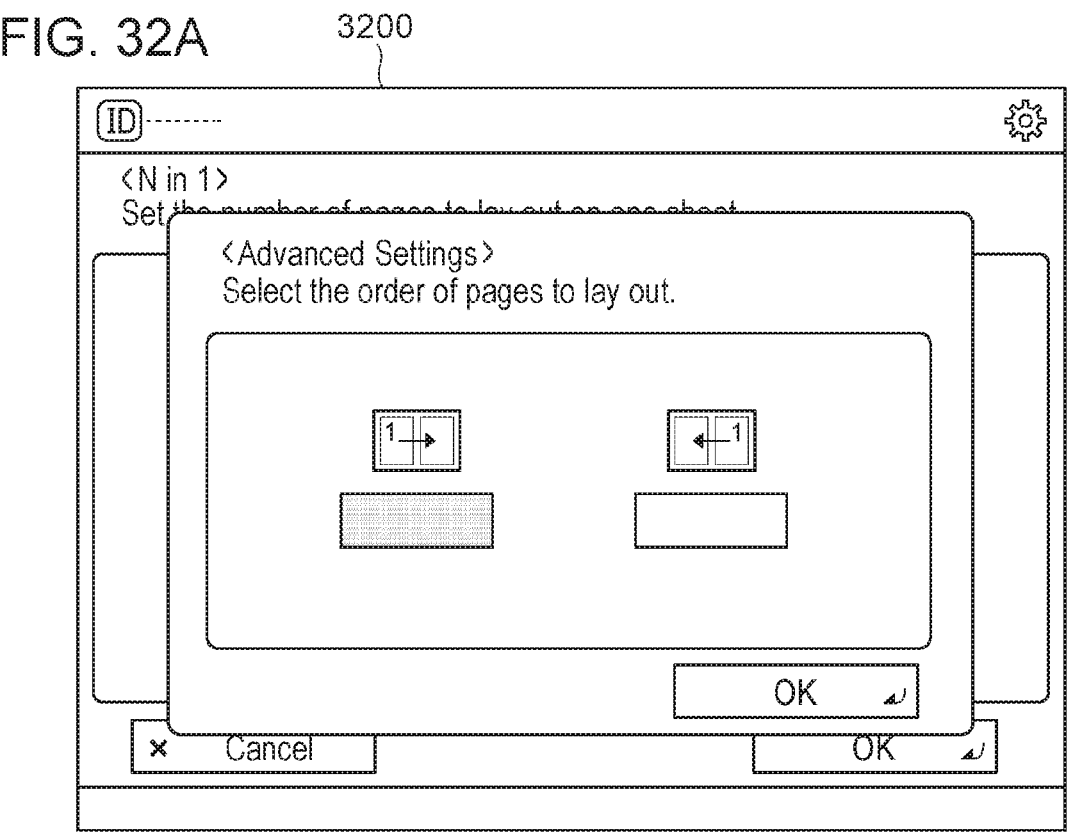
FIG. 32A illustrates a screen displayed by the control program of the image forming apparatus.
Figure 32B:
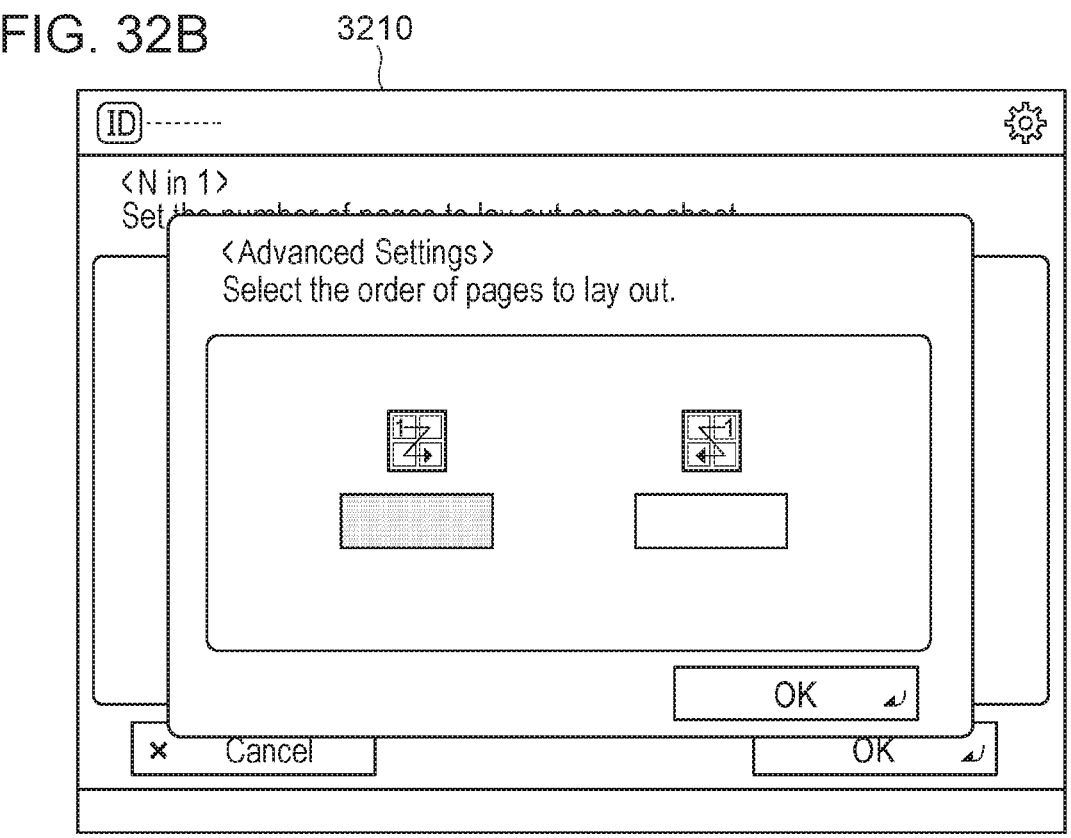
FIG. 32B illustrates another screen displayed by the control program.
Figure 32C:
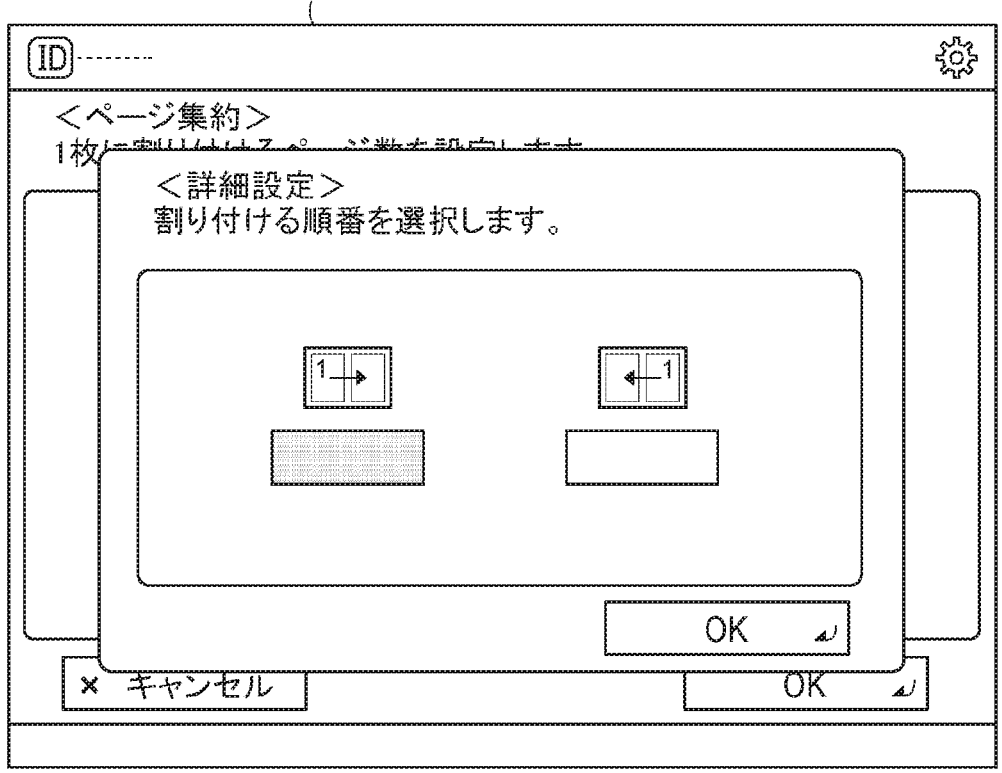
FIG. 32C illustrates a Japanese version of the screen illustrated in FIG. 32A.

FIG. 31A illustrates a screen displayed by the display unit 806, and FIG. 31E illustrates a Japanese version of the screen illustrated in FIG. 31A. FIG. 32A illustrates a screen displayed by the display unit 806, and FIG. 32C illustrates a Japanese version of the screen illustrated in FIG. 32A. FIG. 32B illustrates another screen displayed by the display unit 806, and FIG. 32D illustrates a Japanese version of the screen illustrated in FIG. 32B.

FIG. 31A illustrates the "N in 1" settings screen 3100 displayed by the display unit 806 and configured to allow the user 106 to select the number of pages to lay out on one sheet of paper. The "N in 1" settings screen 3100 includes UI components 3101, 3102, 3103, 3111, 3121, and 3122 that can be operated by the user 106.

FIGS. 31B and 31C show screen control information for the "N in 1" settings screen 3100. FIG. 31D shows operation-target determination information for the "N in 1" settings screen 3100.

Figure 32D:
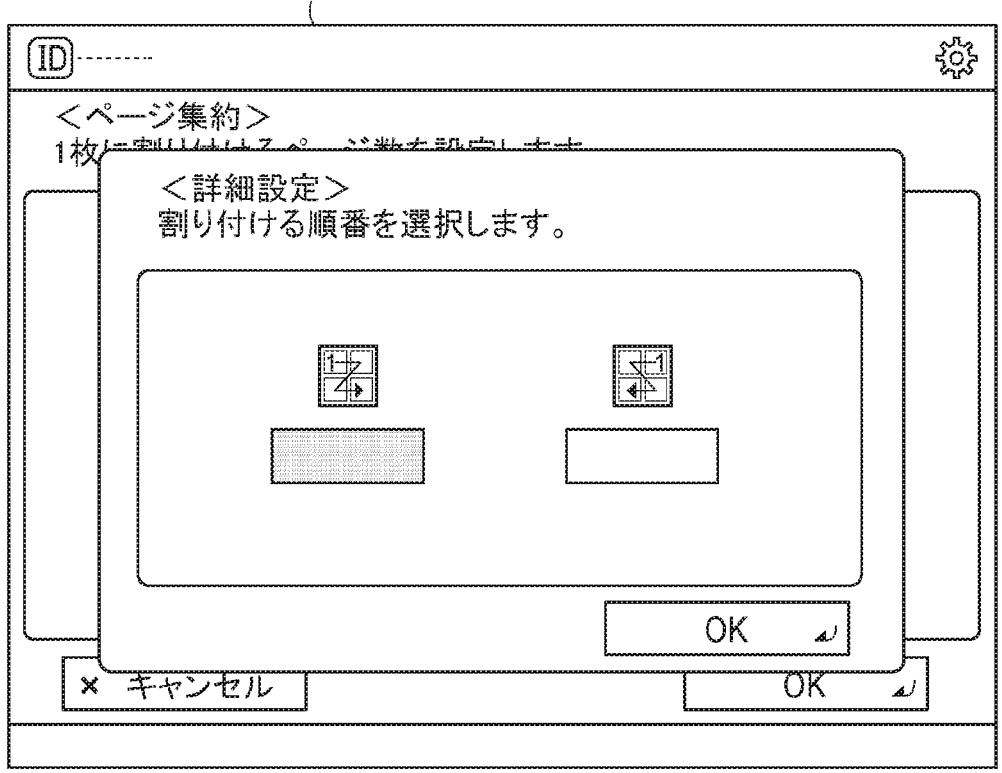
FIG. 32D illustrates a Japanese version of the screen illustrated in FIG. 32B.

FIG. 31D shows exemplary speech operations performed by the user 106 who views any of the screens illustrated in FIG. 31E, FIG. 32C, and FIG. 32D.

When the "Set Details" button 3111 (FIG. 31A) is pressed, with the button 3102 labeled "2 in 1" selected by the user 106, the "N in 1" settings screen 3100 transitions to a "2 in 1" advanced settings screen 3200 (FIG. 32A) for selecting the order of pages to lay out. Similarly, when the "Set Details" button 3111 (FIG. 31A) is pressed, with the button 3103 labeled "4 in 1" selected by the user 106, the "N in 1" settings screen 3100 transitions to a "4 in 1" advanced settings screen 3210 (FIG. 32B) for selecting the order of pages to lay out. In contrast, when the button 3101 labeled "1 in 1" is selected by the user 106, since there is no need to set the order of pages to lay out, the "Set Details" button 3111 is disabled to reject operation from the user 106.

(Processing Flow of Device Control Program of Image Forming Apparatus)

Figure 33:
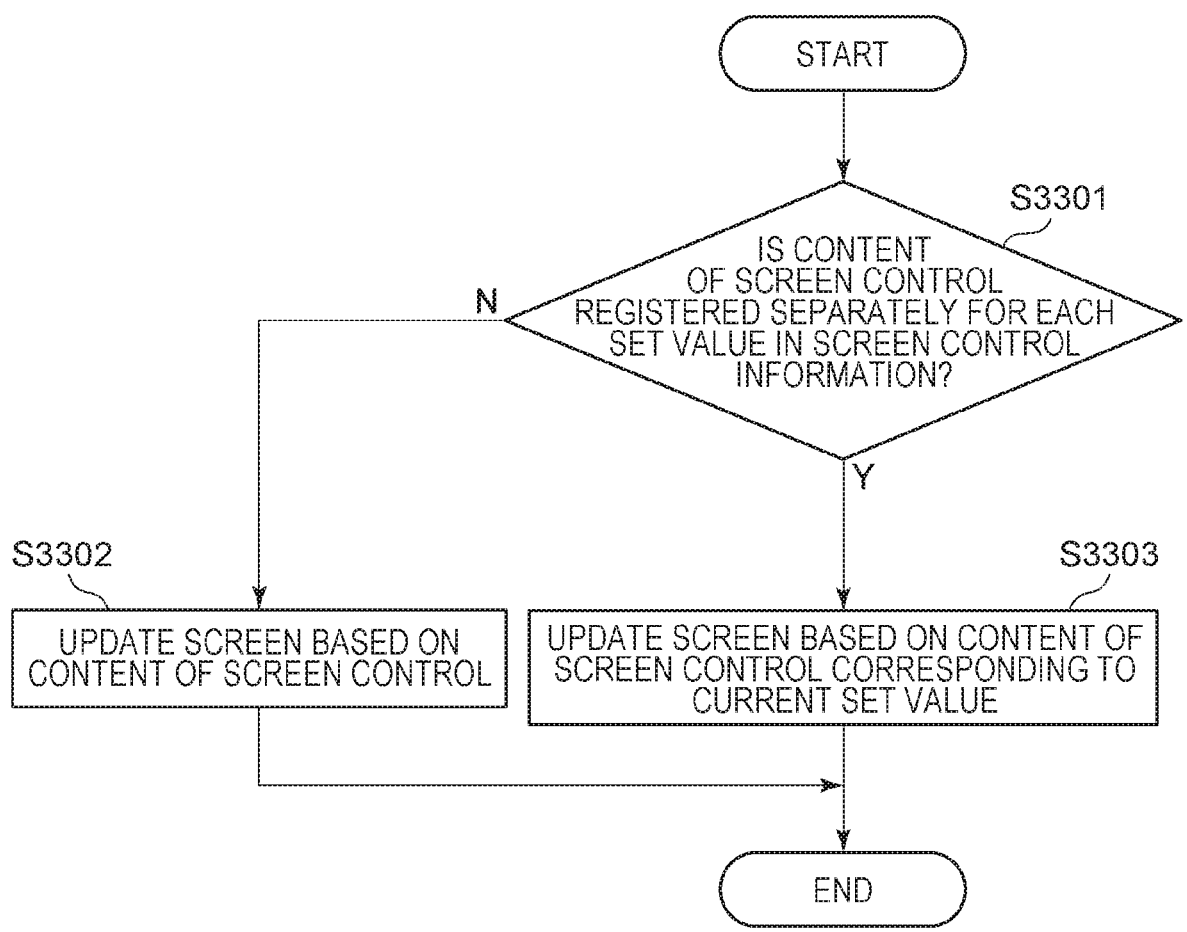
FIG. 33 is a diagram illustrating a processing flow of the control program of the image forming apparatus.

FIG. 33 is a flowchart illustrating an outline of screen update processing performed by the device control program 801 of the image forming apparatus 101. The screen update processing is executed after accepting a user's operation. For example, the screen update processing is executed after the data transmitting and receiving unit 802 receives a group-ID determination result. Alternatively, the screen update processing is executed after the operation I/F 508 detects a touch operation on the LCD touch panel 200 or detects a press of any of the hardware keys 201 to 210 on the operation panel 509. The relation between acceptance of input operation and screen update processing is the same as that illustrated in the flowchart of FIG. 25. The operation target determination is the same as that illustrated in the flowchart of FIG. 26.

FIG. 33 is a flowchart illustrating details of the screen update processing in S2504, which is part of the processing of the device control program 801 illustrated in FIG. 25.

Hereinafter, a processing flow performed while the display unit 806 is displaying the print job settings screen 3000 in FIG. 30A will be described as an example.

In S3301, the display unit 806 reads the screen control information for the UI component determined as the operation target in step S2502 (FIG. 25). The display unit 806 then determines whether the content of screen control information is registered separately for each set value. If the content of screen control information is not registered separately for each set value, the process proceeds to S3302 and otherwise proceeds to S3303. The set value mentioned here is a set value displayed in any of the display labels 3011 to 3014 and determined (in S2605 to S2607) to be included in the speech of the user 106.

For example, assume that the operation-target determining unit 807 determines the display label 3013 as the operation target in S2502. In this case, as shown in the screen control information in FIG. 30C, the content of screen control information is not registered separately for each set value. Accordingly, the set value stored in S2607 is controlled to be displayed in the display label 3013. Specifically, if the user 106 speaks "Hochikisu-o-settei-nashi-ni-henko (Turn stapling off)", the display label 3013 is determined as the operation target. At the same time, the set value "OFF" is stored in S2607 and reflected in the display label 3013.

For example, assume that the operation-target determining unit 807 determines the display label 3012 as the operation target in S2502. In this case, the screen control information is registered separately for each set value. Therefore, the screen control is performed in accordance with the set value stored in S2607. Specifically, if the user 106 speaks "Peji-shuyaku-o-wan'inwan-ni-henko (Change the "N in 1" (number of pages to be printed per sheet) to "1 in 1")", the display label 3012 is determined as the operation target and, at the same time, the set value "1 in 1" is stored in S2607. In accordance with the screen control information in FIG. 30C, the set value "1 in 1" is reflected in the display label 3012. If the user 106 speaks "Peji-shuyaku-o-tsuin-wan-ni-henko (Change the "N in 1" (number of pages to be printed per sheet) to "2 in 1")", the display label 3012 is determined as the operation target and, at the same time, the set value "2 in 1" is stored in S2607. In accordance with the screen control information in FIG. 30C, the display unit 806 enables transition to the "2 in 1" advanced settings screen 3200.

FIGS. 34A to 34E and FIGS. 35A to 35G are for explaining an example that can improve operability in making image forming instructions. Specifically, FIGS. 34A to 34E and FIGS. 35A to 35G schematically illustrate how the display unit 806 updates the screen in the example illustrated in FIGS. 30A to 30E, FIGS. 31A to 31E, and FIGS. 32A to 32D.

Figure 34A:
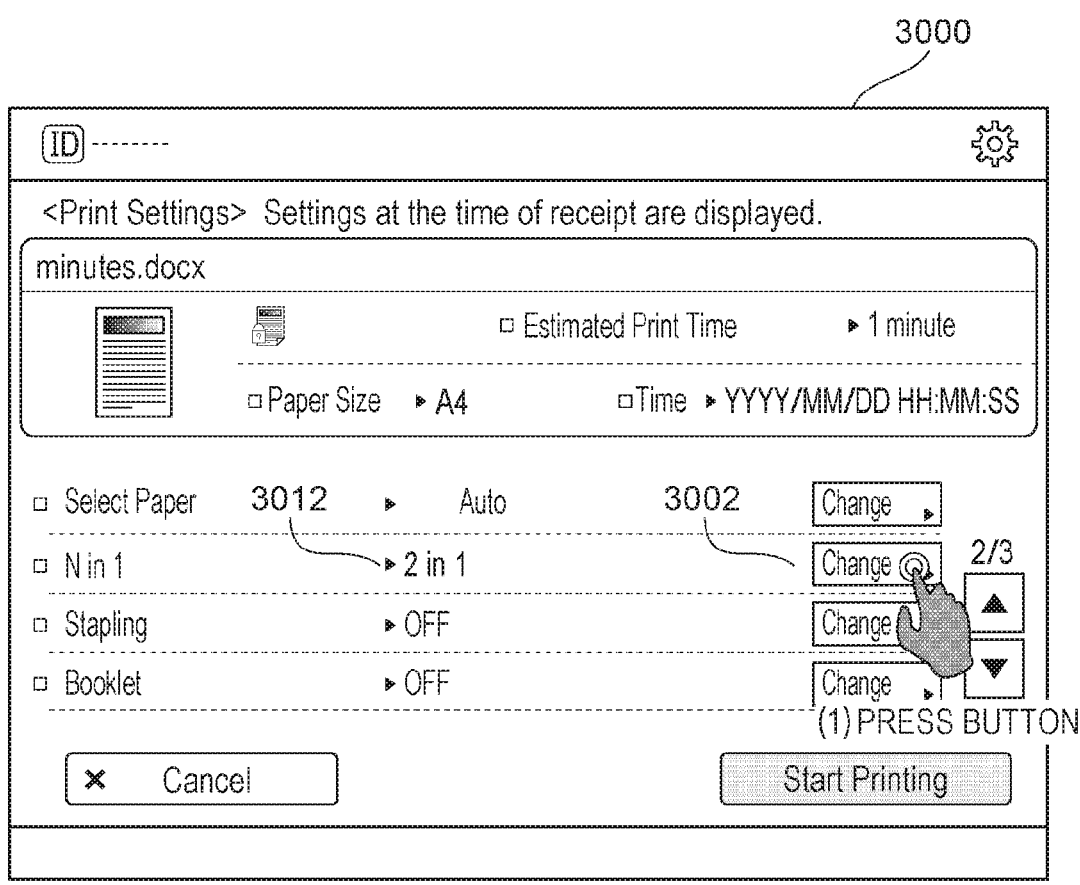
Figure 34C:
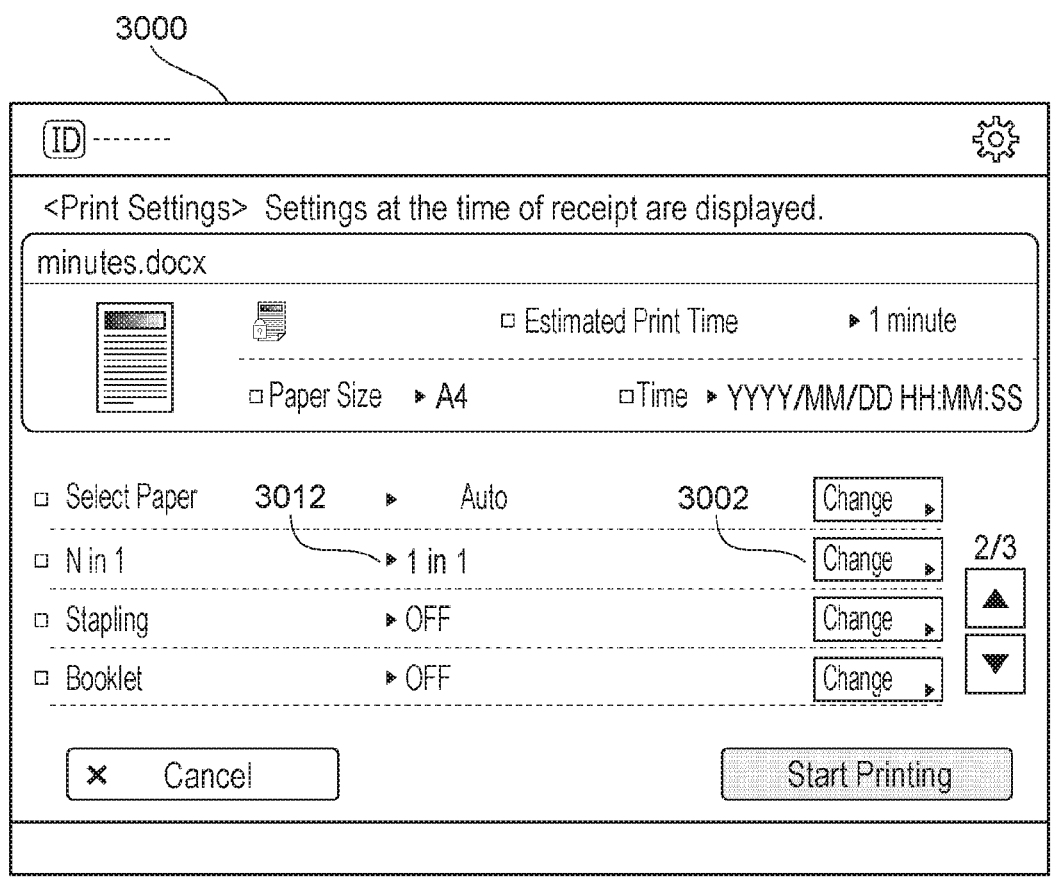

FIGS. 34A to 34C illustrate how, using the screen control information shown in FIG. 30B and FIG. 31B, the display unit 806 updates the screen when an operation for changing the setting of "N in 1" is performed. Assume that the user 106 wants to change the set value displayed in the display label 3012 on the print job settings screen 3000. In the touch operation, for example, after touching the "Change" button 3002, the user 106 touches the button 3101 on the "N in 1" settings screen 3100 subsequently displayed. The set value displayed in the display label 3012 is not changed until the user 106 touches the OK button 3122. Thus, when there is a UI component designed only for displaying a set value that can be set on another screen, the example of touch operation for the print job settings screen 3000 requires at least three touches and screen updating associated therewith. In this example, the user 106 performs an operation for changing the set value to "1 in 1", which does not require additional setting (i.e., selecting the order of pages to lay out). Therefore, the operation for changing the set value is completed by operation on the "N in 1" settings screen 3100 alone.

Figure 34E:
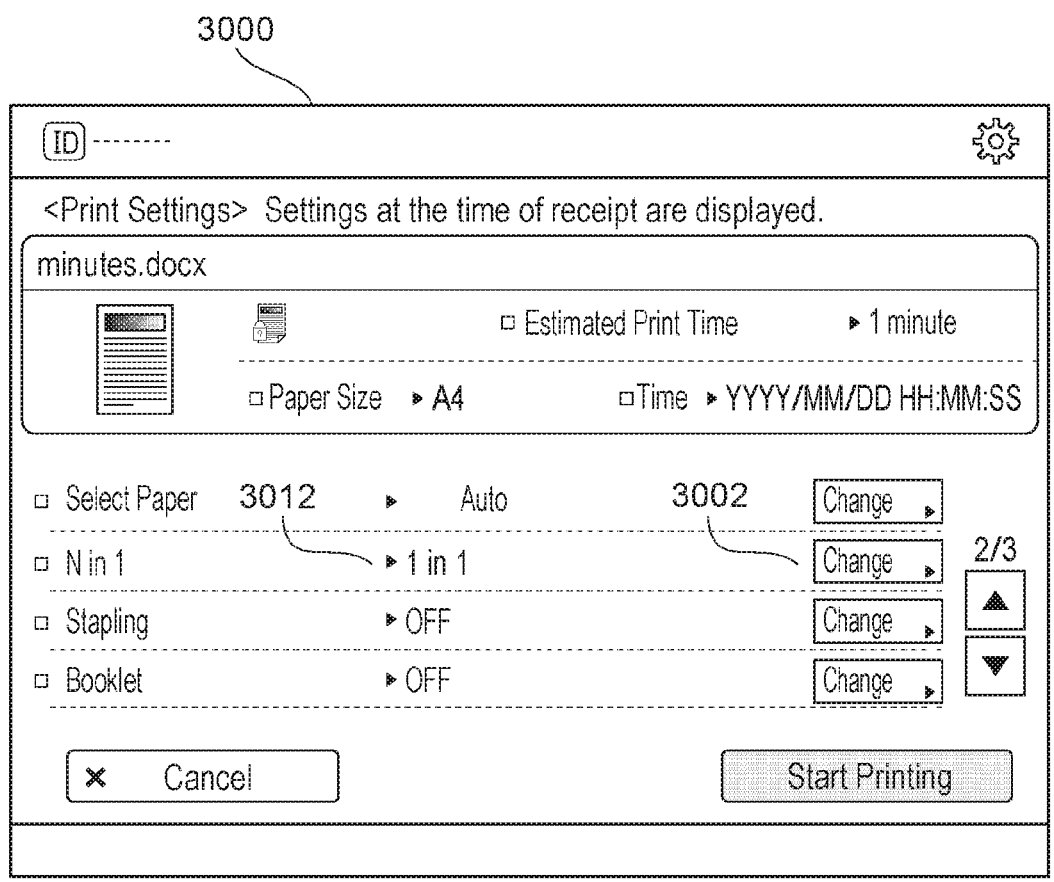
Figure 35A:
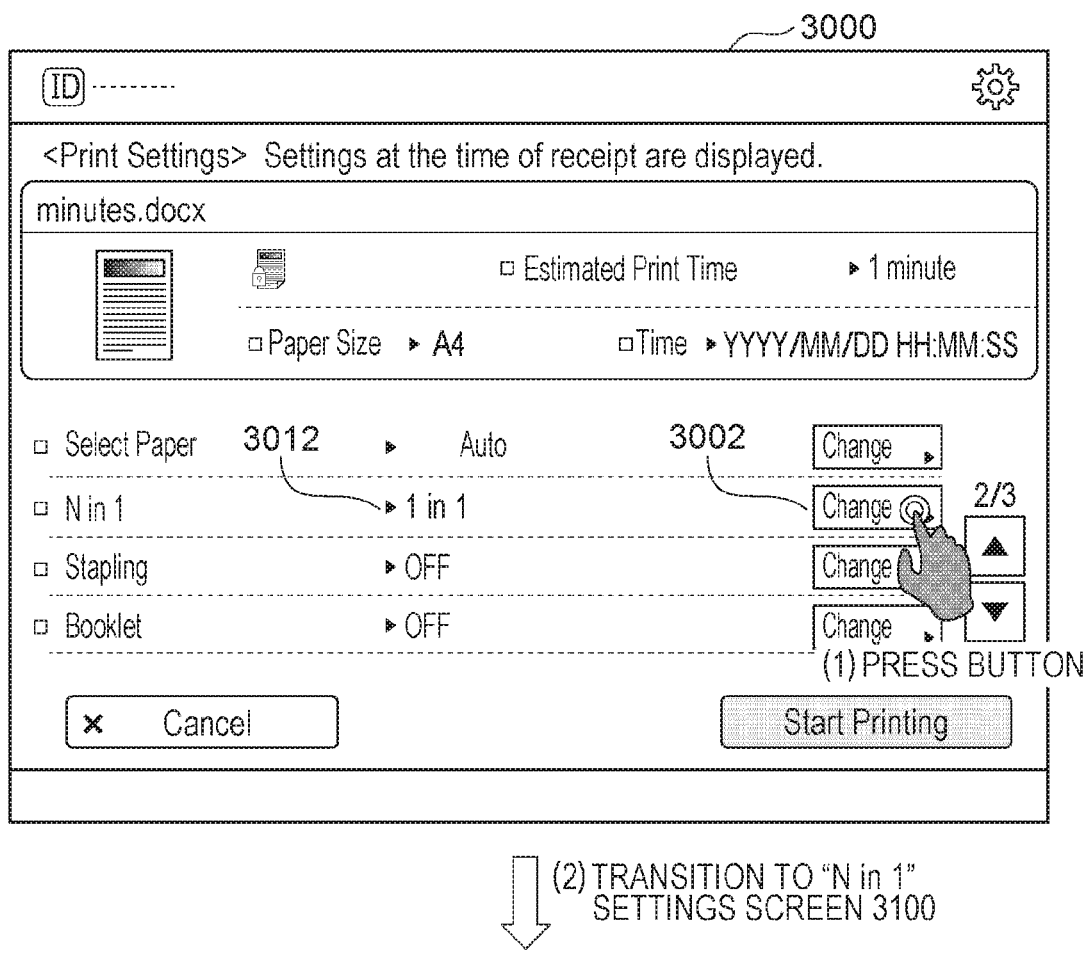
Figure 35B:
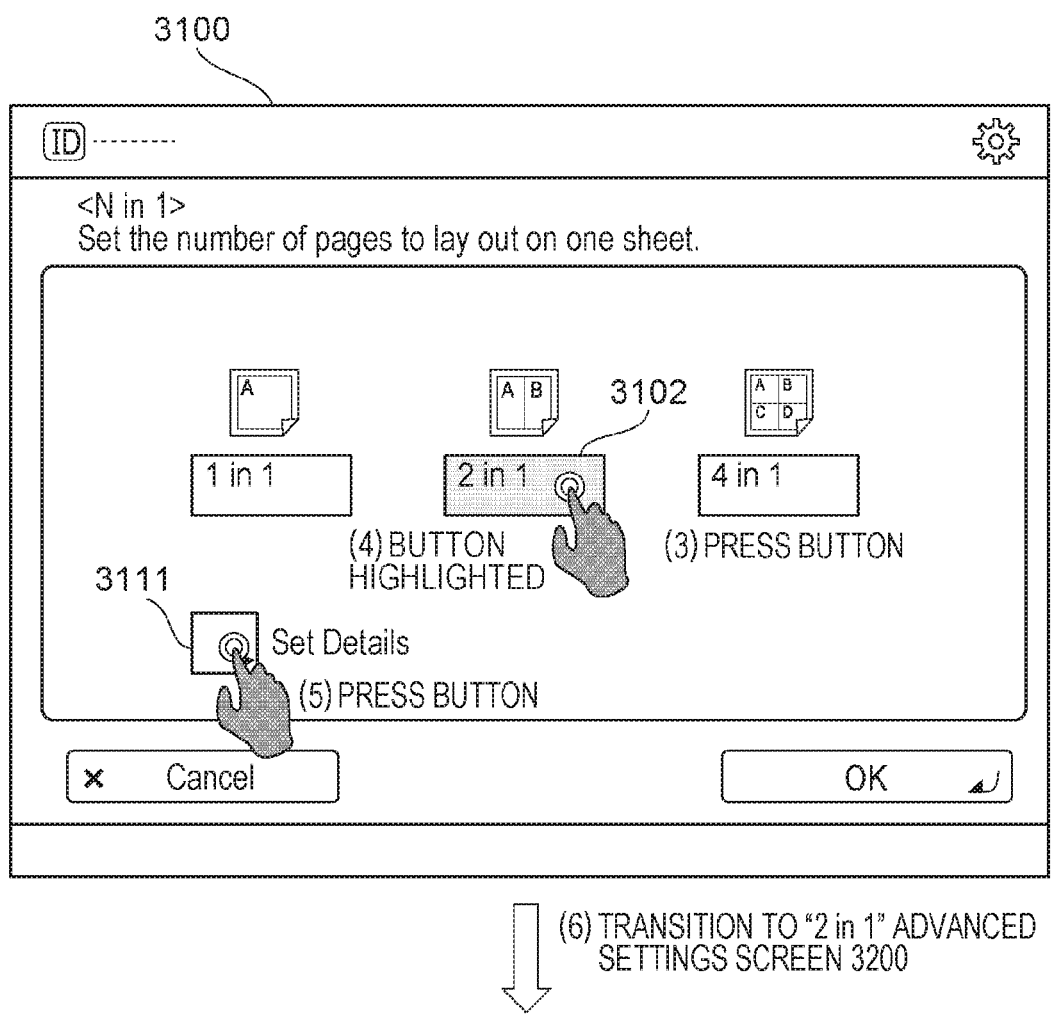
Figure 35C:
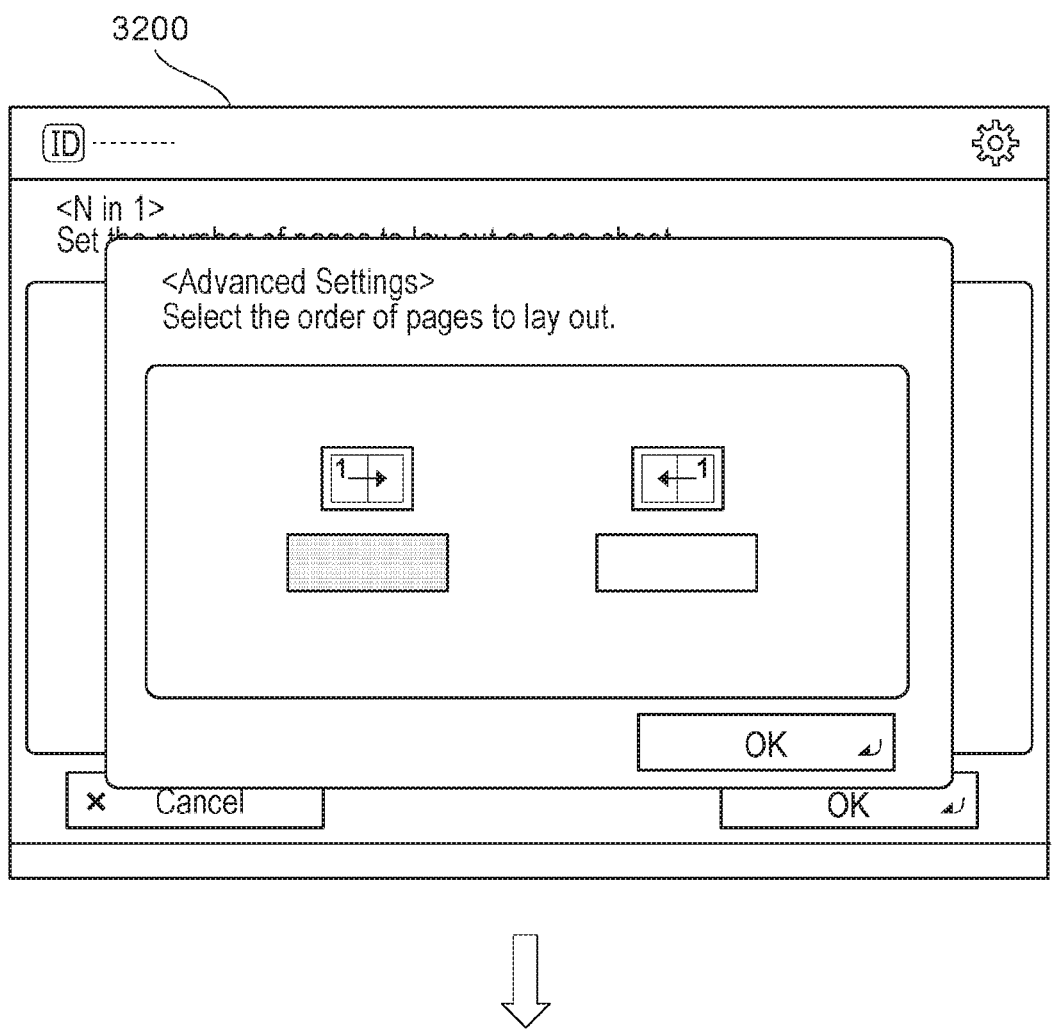
Figure 35D:
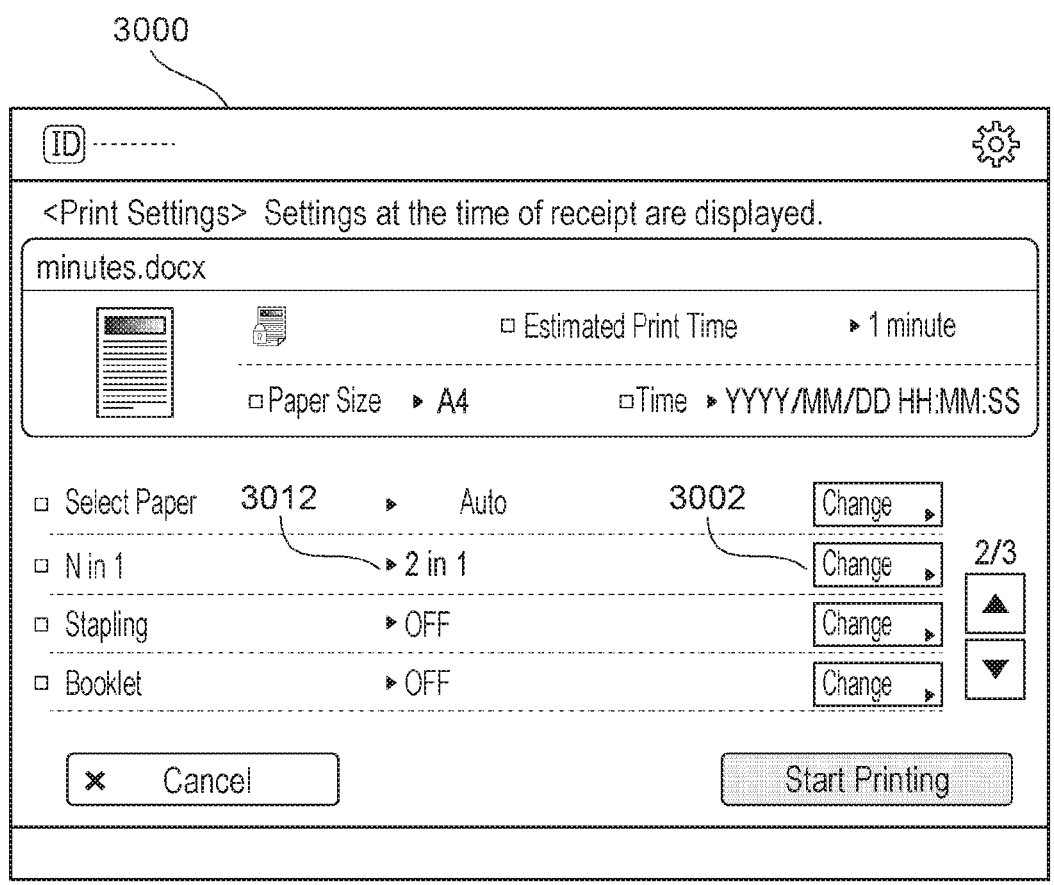
Figure 35F:
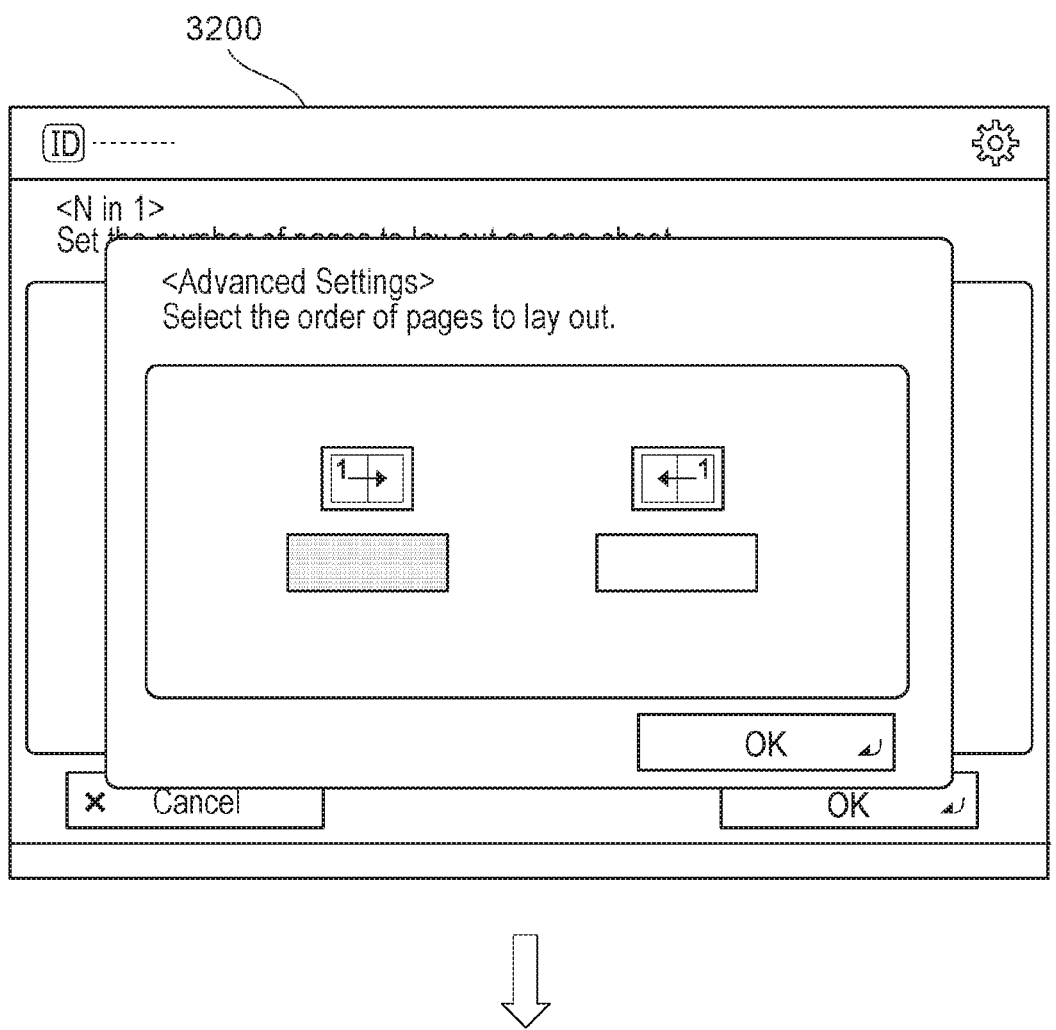
Figure 35G:
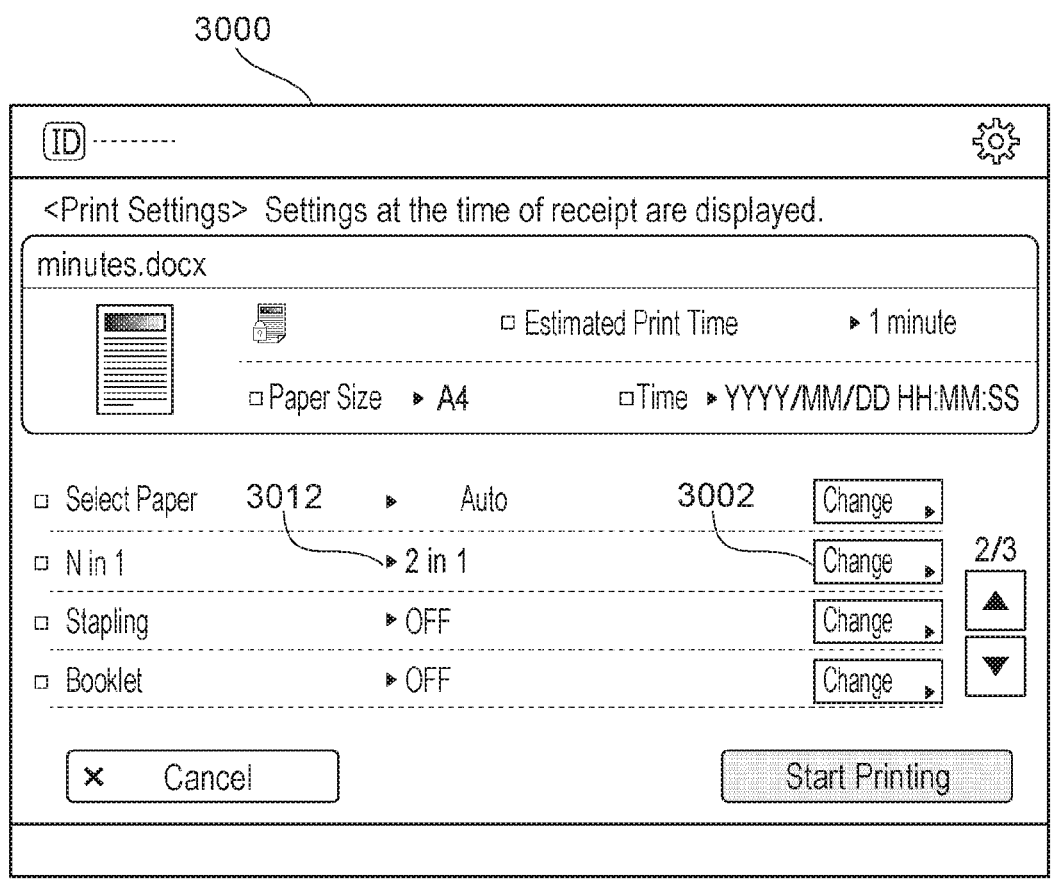

FIGS. 34D and 34E illustrate how, using the screen control information shown in FIG. 30C, the display unit 806 updates the screen when an operation for changing the setting of "N in 1" is performed by speech. For example, assume that the user 106 speaks "Peji-shuyaku-o-wan'inwan-ni-henko (Change the "N in 1" (number of pages to be printed per sheet) to "1 in 1")" during display of the print job settings screen 3000. In this case, as illustrated in FIGS. 34D and 34E, the set value displayed in the display label 3012 is changed from "2 in 1" to "1 in 1" without transition to the "N in 1" settings screen 3100 for selecting the set value for "N in 1". That is, in this example of speech operation, the displayed set value can be changed by a single speech of the user 106. It is thus possible to improve operability in making image forming instructions. Also, when "1 in 1" is selected, no additional setting is required. This means that the set value to be changed can be fully determined only by the speech "Peji-shuyaku-o-wan'inwan-ni-henko (Change the "N in 1" (number of pages to be printed per sheet) to "1 in 1")" of the user 106. The displayed set value can thus be changed by a single speech of the user 106.

Like FIGS. 34A to 34C, FIGS. 35A to 35D illustrate how, using the screen control information shown in FIG. 30B and FIG. 31B, the display unit 806 updates the screen when an operation for changing the setting of "N in 1" is performed. Assume that the user 106 wants to change the set value displayed in the display label 3012 on the print job settings screen 3000. In the touch operation, for example, after touching the "Change" button 3002, the user 106 touches the button 3102 on the "N in 1" settings screen 3100 subsequently displayed. When "2 in 1" is selected, the user 106 needs to select, on the "2 in 1" advanced settings screen 3200, the order of pages to lay out as additional setting. Therefore, the user 106 touches the "Set Details" button 3111 as in FIG. 35B. Then, by a touch operation on the "2 in 1" advanced settings screen 3200, the set value representing the order of pages to lay out is changed, and the set value displayed in the display label 3012 on the print job settings screen 3000 is eventually changed.

Like FIGS. 34D and 34E, FIGS. 35E to 35G illustrate how, using the screen control information shown in FIG. 30C, the display unit 806 updates the screen when an operation for changing the setting of "N in 1" is performed by speech. For example, assume that the user 106 speaks "Peji-shuyaku-o-tsuinwan-ni-henko (Change the "N in 1" (number of pages to be printed per sheet) to "2 in 1")" during display of the print job settings screen 3000. In this case, where "2 in 1" is specified, the user 106 needs to select the order of pages to lay out as additional setting. This means that the set value to be changed has not been fully determined only by the initial speech. In this example, therefore, without transition to the "N in 1" settings screen 3100 for selecting "2 in 1" (already specified by speech), the "2 in 1" advanced settings screen 3200 is displayed which allows additional setting for "2 in 1". After the order of pages to lay out is selected by operation on the "2 in 1" advanced settings screen 3200, the set value displayed in the display label 3012 on the print job settings screen 3000 is eventually changed.

(Remarks)

As described above, in the present embodiment, when a set value is displayed on the current screen and there is another screen for selecting the set value, operability in making image forming instructions is improved by speech of the user 106, as in the first embodiment described above. Moreover, in the present embodiment, when there is still another screen (advanced settings screen) for setting details of the set value selected on the screen described above, screen control that enables direct transition to the advanced settings screen is performed. This improves operability in making image forming instructions. In other words, in the present embodiment, a speech operation can eliminate the need for displaying some of the screens used in a setting change procedure.

As described above, when there is a UI component designed only for displaying a set value that can be set on another screen, a setting change operation may be either completed on this screen or may require an additional operation for changing advanced settings on still another screen. By performing different screen control for each of these cases, operability in making image forming instructions is improved.

Third Embodiment

The first and second embodiments have described techniques in which, by speech operation, a set value can be changed without displaying some or all of setting procedure screens displayed for touch operation. A third embodiment will describe an example which varies a setting procedure screen depending on whether a setting change instruction accepted is either speech or touch-based.

(System Control Sequence)

Figure 7:
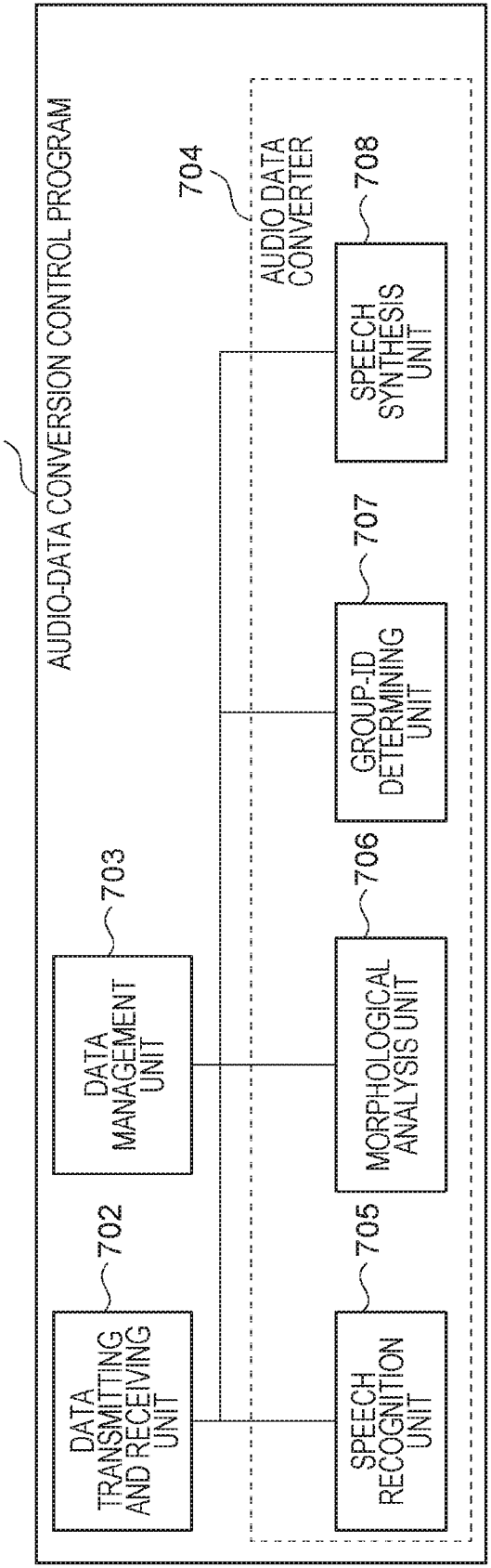
FIG. 7A is a diagram illustrating a functional configuration of a control program of the server.
FIG. 7B shows examples of group ID lists.
Figure 36:
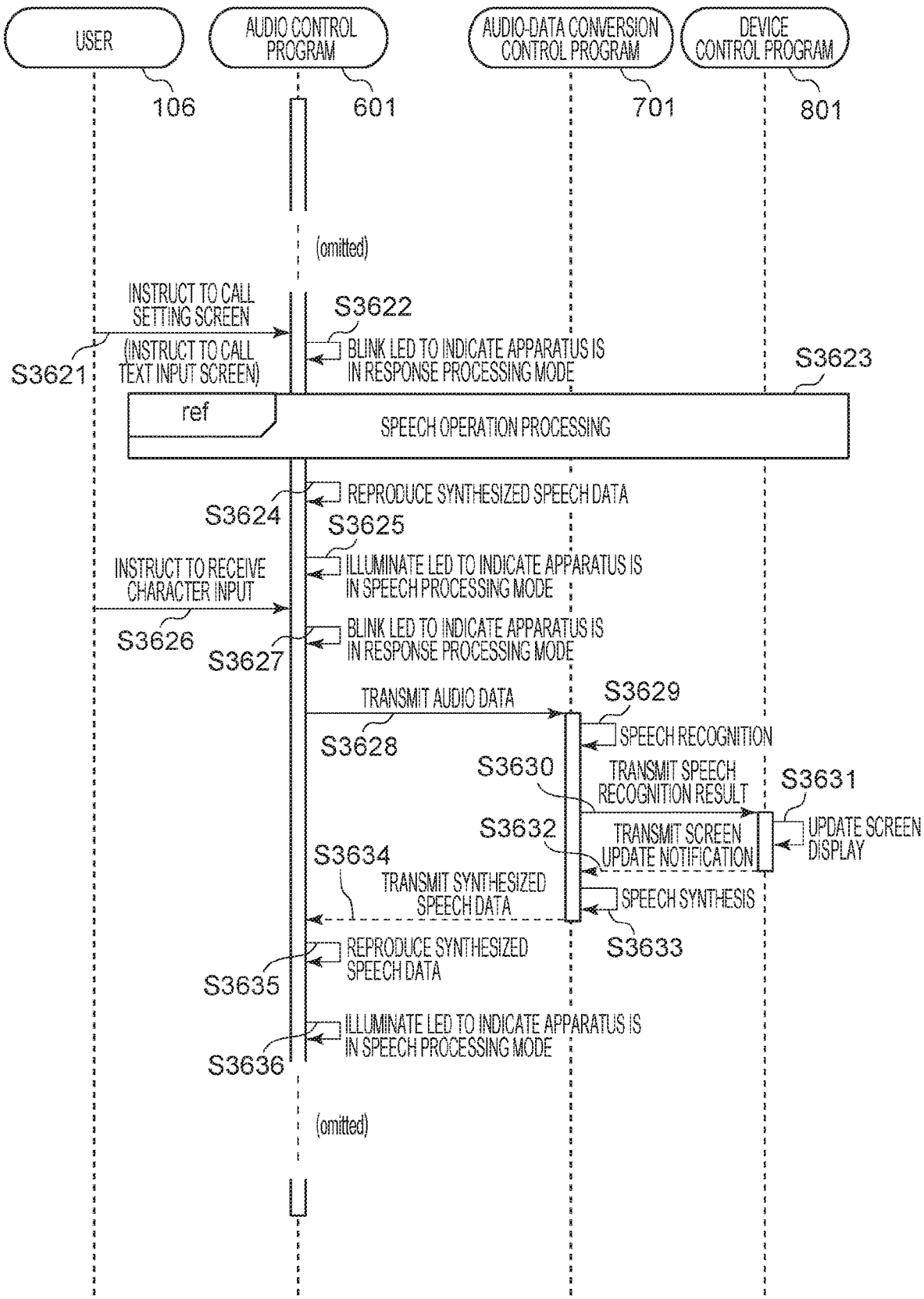
FIG. 36 is a sequence diagram illustrating interactions between the apparatuses included in the information processing system of the present disclosure and also between the control programs of the apparatuses.

FIG. 36 is a sequence diagram illustrating interactions between the apparatuses included in the information processing system illustrated in FIG. 1 and also between the control programs of the apparatuses illustrated in FIG. 6, FIG. 7A, and FIG. 8. FIG. 36 illustrates another example of S921 to S930 in FIGS. 9A and 9B. In FIG. 36, steps equivalent to S905 to S920 in FIG. 9A and S936 to S956 in FIG. 9C are omitted. The description of components, which are the same as those illustrated in FIG. 1 to FIG. 8, will also be omitted.

In S3621, as in S921, the user 106 instructs the audio control apparatus 100 to call a setting screen. For example, assume that a setting screen for adding an e-mail subject and message to be sent is displayed over a screen for executing the function of e-mailing an image of a scanned original. At this point, as an instruction to call a setting screen, the user 106 speaks, for example, "I want to enter the message" with the intention of adding any character string as the e-mail body.

In S3622, the same operation as that in S922 is performed.

In S3623, the speech operation processing similar to that performed in S923 is performed. In S3623, for example, in accordance with the instruction (sent in S3621) to call a setting screen, the display unit 806 updates the screen to display a screen for entering an e-mail message. At the same time, as a screen update notification, the data transmitting and receiving unit 802 transmits text data "message entry screen displayed" to the server 102. Upon receiving this text data, the data transmitting and receiving unit 702 of the audio-data conversion control program 701 remembers that the system is ready to receive input of any text.

In S3624, as in S924, the audio reproducing unit 605 reproduces synthesized speech data. For example, the audio reproducing unit 605 reproduces the synthesized speech data representing "You can type by voice. Please read out the message you want to type in" through the speaker 310.

In S3625, the same operation as that in S925 is performed.

In S3626, the user 106 speaks, toward the audio control apparatus 100, any words or sentences to enter, so as to instruct the audio control apparatus 100 to receive input of any characters. The speech of the user 106 is acquired by the speech acquiring unit 604 and generated as audio data. After the elapse of a predetermined blank period, the speech-end determining unit 608 determines that the speech has ended.

In S3627, the same operation as that in S927 is performed.

After the audio data is generated as an instruction to receive input of any characters in S3626, the data transmitting and receiving unit 602 transmits the generated audio data to the server 102 in S3628.

In S3629, the speech recognition unit 705 of the audio-data conversion control program 701 performs speech recognition on the audio data received by the data transmitting and receiving unit 702. By the speech recognition, for example, text date is generated from the speech "Sakihodo-no-shiryo-o-sofu-itashimasu-node-go-kakunin-kudasai (Please find the attached materials mentioned earlier)" spoken by the user 106. In S3630, the data transmitting and receiving unit 702 of the audio-data conversion control program 701 transmits the text data, which is the speech recognition result, to the image forming apparatus 101.

In S3631, the content of the text data or speech recognition result received by the data transmitting and receiving unit 802 of the device control program 801 is reflected in the screen displayed by the display unit 806. For example, instead of touching a keyboard displayed on the LCD touch panel 200 or pressing the numeric keypad 201 to enter any character string, the user 106 speaks to directly enter the content of the speech as a character string.

In S3632, the data transmitting and receiving unit 802 transmits, to the server 102, a screen update notification indicating that displayed content of the screen has been updated. For example, as a screen update notification, the display unit 806 transmits text data "character input completed".

In S3633, the speech synthesis unit 708 of the audio-data conversion control program 701 performs speech synthesis on the screen update notification received by the data transmitting and receiving unit 702. Specifically, the speech synthesis unit 708 synthesizes speech from predetermined text data corresponding to the screen update notification. For example, if the screen update notification is "message input completed", the speech synthesis unit 708 synthesizes the speech "Please confirm the message entered" from the corresponding text data.

In S3634, the audio data (synthesized speech data) generated through speech synthesis in S3633 by the speech synthesis unit 708 is transmitted by the data transmitting and receiving unit 702 to the audio control apparatus 100. The synthesized speech data is received by the data transmitting and receiving unit 602 of the audio control program 601.

In S3635, the audio reproducing unit 605 reproduces the synthesized speech data received in S3634. For example, the synthesized speech data "Please confirm the message entered" generated in S3633 is reproduced through the speaker 310.

In S3636, after the synthesized speech data is reproduced, the display unit 606 of the audio control program 601 illuminates the LED 312 again to indicate that the audio control apparatus 100 is in the speech processing mode. At the same time, the speech acquiring unit 604 starts processing again.

(Screen Control Information and Operation-Target Determination Information)

Figure 37E:
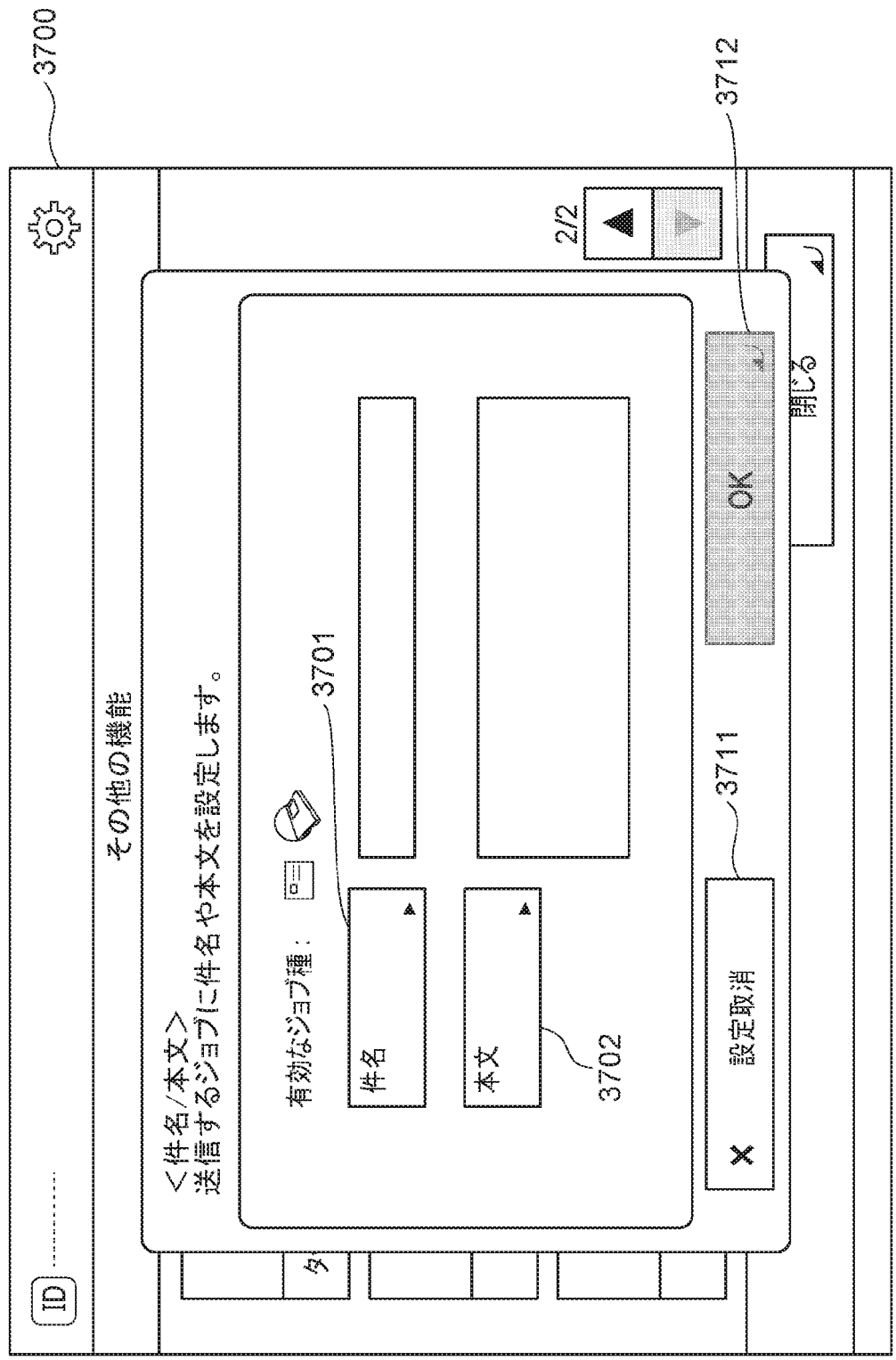
FIG. 37E illustrates a Japanese version of the screen illustrated in FIG. 37A.

FIG. 37A illustrates a screen displayed by the display unit 806, and FIG. 37E illustrates a Japanese version of the screen illustrated in FIG. 37A.

FIG. 37A illustrates an e-mail message setting screen 3700 displayed by the display unit 806 for the user 106 to set a subject and message for e-mail transmission. The e-mail message setting screen 3700 includes UI components 3701, 3702, 3711, and 3712 that can be operated by the user 106.

The screen control information in FIG. 37B shows that when, for example, the button 3711 labeled "Cancel Settings" is determined as the operation target, the display unit 806 performs control so as to enable transition to a send top screen (not shown), which is a top screen for the function of e-mailing an image of a scanned original. The screen control information in FIG. 37B also shows that when, for example, the button 3702 labeled "Message" is determined as the operation target, the screen control to be performed varies depending on whether the type of input operation is touch or speech. The data management unit 803 of the present embodiment is thus capable of managing, as screen control information, the content of screen control that varies depending on the type of input operation. The screen control information in FIG. 37B shows that if, for example, the button 3702 is determined as the operation target in response to touch operation, the screen transitions to a keyboard input screen 3800 (see FIG. 38A), whereas if the button 3702 is determined as the operation target in response to speech operation, the screen transitions to a speech input screen 3810 (see FIG. 38B).

The screen control information in FIG. 37C is empty. This indicates that the e-mail message setting screen 3700 does not include a UI component that can be operated only by speech.

The operation-target determination information in FIG. 37D shows that when the group-ID determination result is {ID: SND00062}, {ID: SND00062, ID: OPR00040}, or (ID: SND00062, ID: OPR00050), the button 3702 is determined as the operation target. For example, assume that the user 106 speaks "Meru-honbun-o-settei (Set the e-mail message)" during display of the e-mail message setting screen 3700. In this case, from the group-ID determination result {ID: SND00062, ID: OPR00040} generated by the group-ID determining unit 707, the operation-target determining unit 807 determines that the button 3702 is the operation target.

The operation-target determination information in FIG. 37D also shows that the buttons 3701, 3702, 3711, and 3712, each having rectangle information representing the touch coordinate range, are capable of accepting the touch operation on the LCD touch panel 200. For example, when touch coordinates are (X: 200, Y: 250), the operation-target determining unit 807 determines the button 3702 included in the touch coordinate range in the operation-target determination information as the operation target. The hardware keys 203 and 207, for which the corresponding cells of the touch coordinate ranges in FIG. 37D are each provided with a diagonal line, are UI components that are each determined as the operation target on the basis of the detection of a press of the hardware key included in the operation panel 509.

Figure 38A:
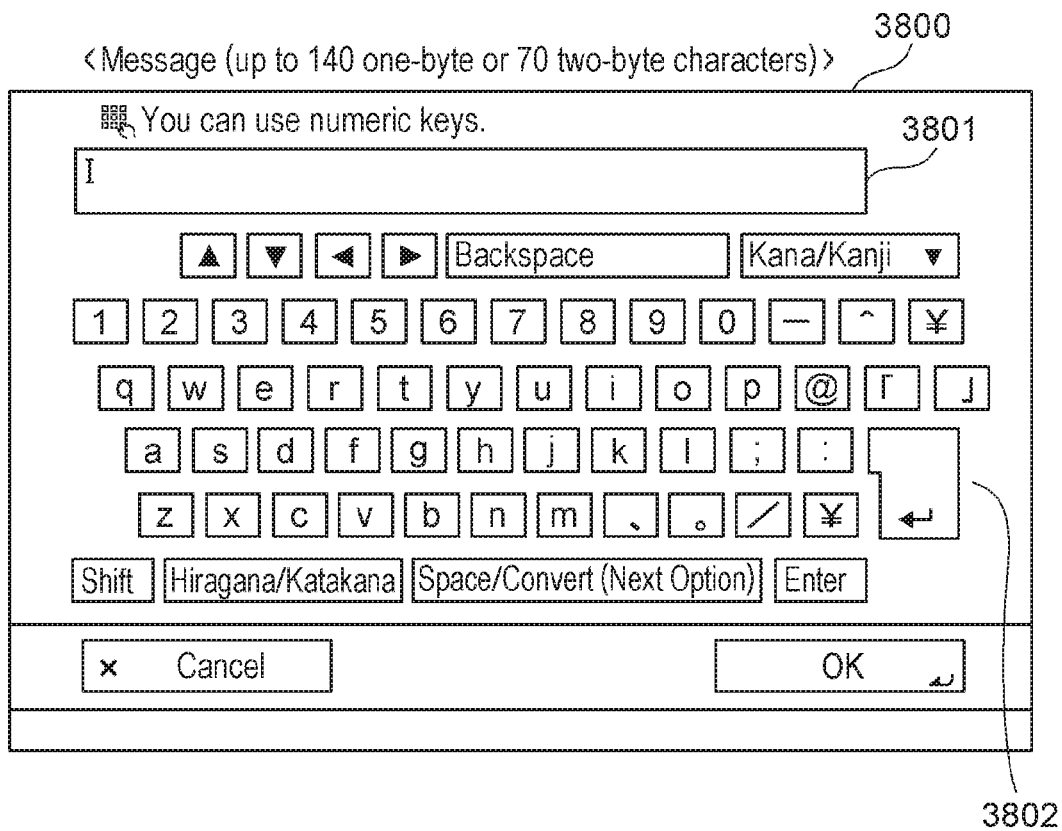
FIG. 38A illustrates a screen displayed by the control program of the image forming apparatus.
Figure 38B:
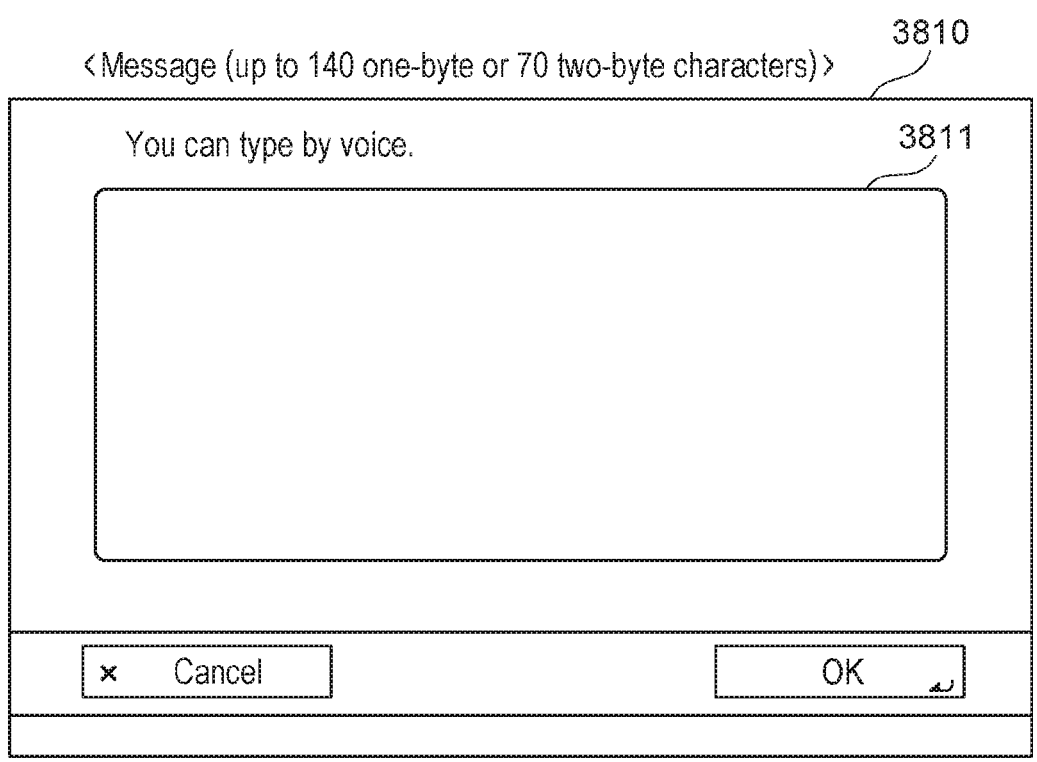
FIG. 38B illustrates another screen displayed by the control program.
Figure 38C:
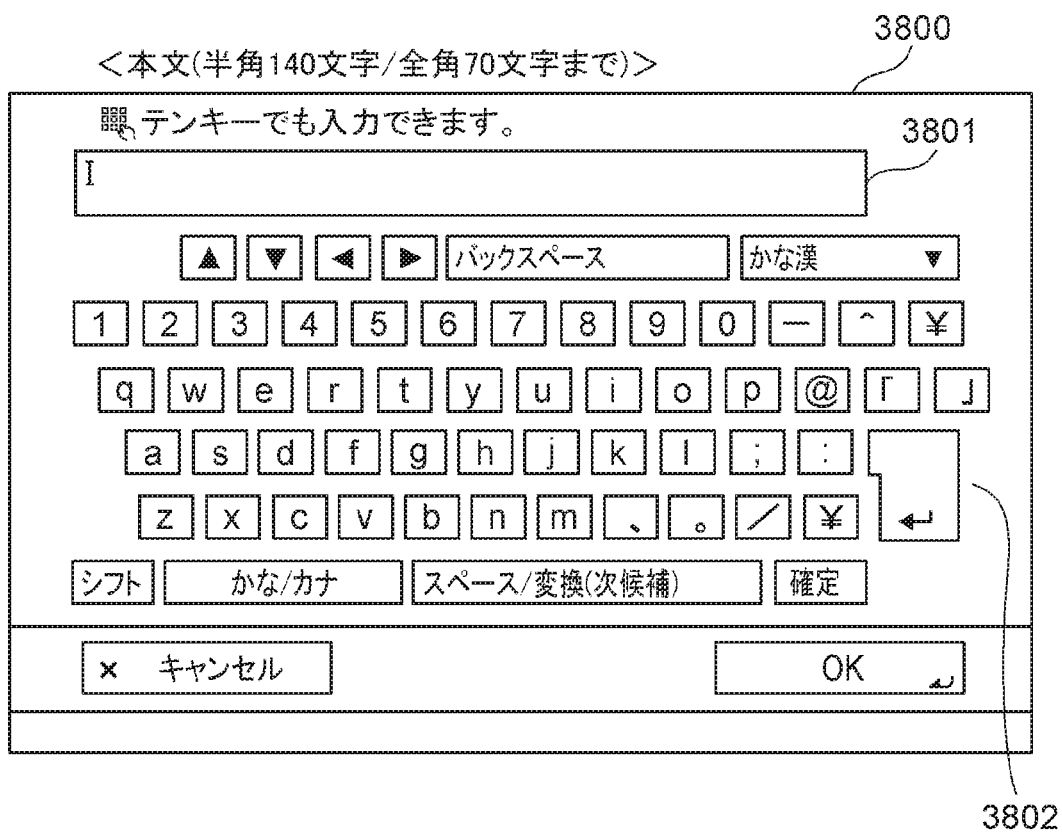
FIG. 38C illustrates a Japanese version of the screen illustrated in FIG. 38A.
Figure 38D:
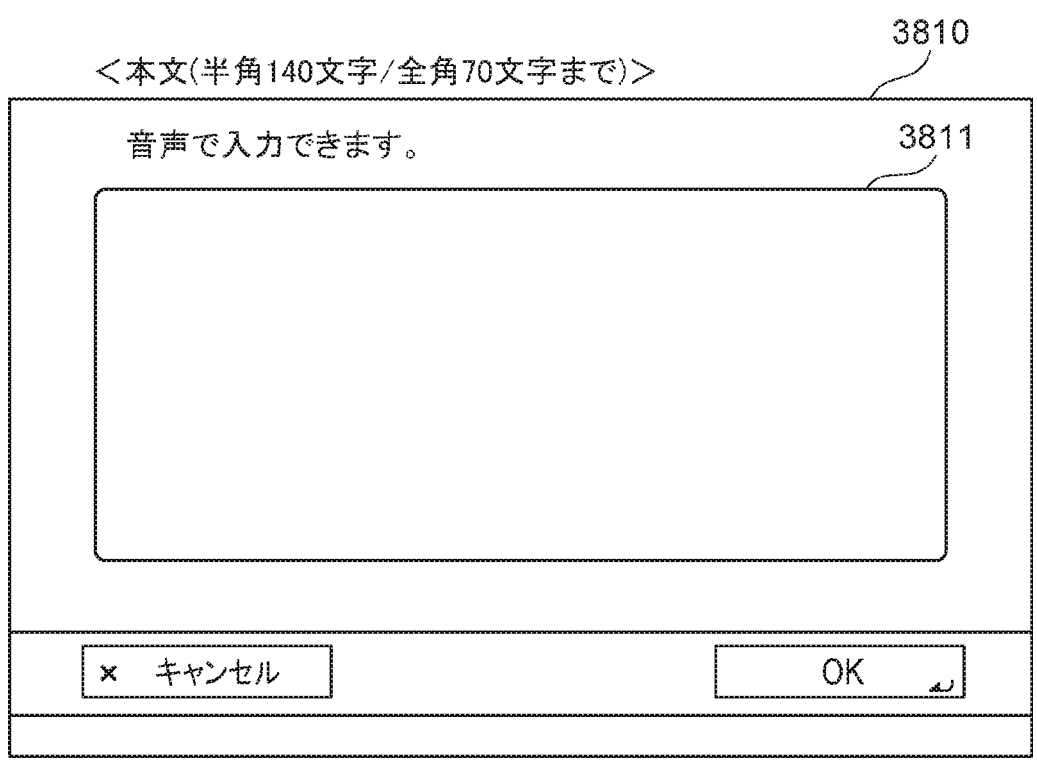
FIG. 38D illustrates a Japanese version of the screen illustrated in FIG. 38B.

FIG. 37D shows exemplary speech operations performed by the user 106 who views any of the screens illustrated in FIG. 37E, FIG. 38C, and FIG. 38D.

FIG. 38A illustrates a screen displayed by the display unit 806, and FIG. 38C illustrates a Japanese version of the screen illustrated in FIG. 38A. FIG. 38B illustrates another screen displayed by the display unit 806, and FIG. 38D illustrates a Japanese version of the screen illustrated in FIG. 38B.

FIG. 38A illustrates the keyboard input screen 3800 described above. The keyboard input screen 3800 includes various keys 3802 of a software keyboard, and a region 3801 that displays any character string set by the user 106. By touching the various keys 3802 of the software keyboard on the keyboard input screen 3800, the user 106 can enter any character string that is to be set as an e-mail message.

FIG. 38B illustrates the speech input screen 3810 described above. The speech input screen 3810 includes a region 3811 that displays any character string set by the user 106. By speaking toward the speech input screen 3810, the user 106 can enter the speech in the form of any character string that is to be set as an e-mail message. The speech input screen 3810 does not include the various keys 3802 of the software keyboard, which is not required for speech operation. This can make the size of the region 3811 for displaying any character string set by the user 106 greater than that of the region 3801. That is, the region 3811 can display more character strings set by the user 106.

(Processing Flow of Device Control Program of Image Forming Apparatus)

FIG. 39 is a flowchart illustrating an outline of screen update processing performed by the device control program 801 of the image forming apparatus 101. The screen update processing is executed after accepting a user's operation. For example, the screen update processing is executed after the data transmitting and receiving unit 802 receives a group-ID determination result. Alternatively, the screen update processing is executed after the operation I/F 508 detects a touch operation on the LCD touch panel 200 or a press of any of the hardware keys 201 to 210 on the operation panel 509. The relation between acceptance of input operation and screen update processing is the same as that illustrated in the flowchart of FIG. 25. The operation target determination is the same as that illustrated in the flowchart of FIG. 26.

Hereinafter, a processing flow performed while the display unit 806 is displaying the e-mail message setting screen 3700 in FIG. 37A will be described as an example.

In S3901, the display unit 806 reads the screen control information for the UI component determined as the operation target in step S2502 (FIG. 25). The display unit 806 then determines whether the content of screen control is registered separately for touch operation and speech operation. If the content of screen control is not registered separately for touch operation and speech operation, the process proceeds to S3903 and otherwise proceeds to S3902. For example, if the operation-target determining unit 807 determines the button 3711 as the operation target in S2502, the content of screen control is not registered separately for touch operation and speech operation in the screen control information. Therefore, in S3903, the display unit 806 performs control, on the basis of the content of screen control, so as to enable transition to the send top screen (not shown). If, for example, the operation-target determining unit 807 determines the button 3702 as the operation target in S2502, the content of screen control is registered separately for touch operation and speech operation in the screen control information. The process thus proceeds to S3902.

In S3902, as in S2601 (FIG. 26), the type of input operation is determined. If the type of input operation is speech, that is, if, as in FIG. 9A, the user 106 speaks after instructing to start a speech operation in S905 and the data transmitting and receiving unit 802 receives a group-ID determination result from the server 102, then the process proceeds to S3905. If the type of input operation is a touch operation or a press of a hardware key, the process proceeds to S3904.

In S3904, the display unit 806 reads the content of screen control for touch operation in the corresponding screen control information and updates the screen on the basis of the read content. For example, if the user 106 touches the button 3702, the display unit 806 performs control to enable transition to the keyboard input screen 3800.

In S3905, the display unit 806 reads the content of screen control for speech operation in the corresponding screen control information and updates the screen on the basis of the read content. For example, if the user 106 speaks "Meru-honbun-o-settei (Set the mail message)" and the button 3702 is determined as the operation target, the display unit 806 performs control to enable transition to the speech input screen 3810.

(Remarks)

Figure 40A:
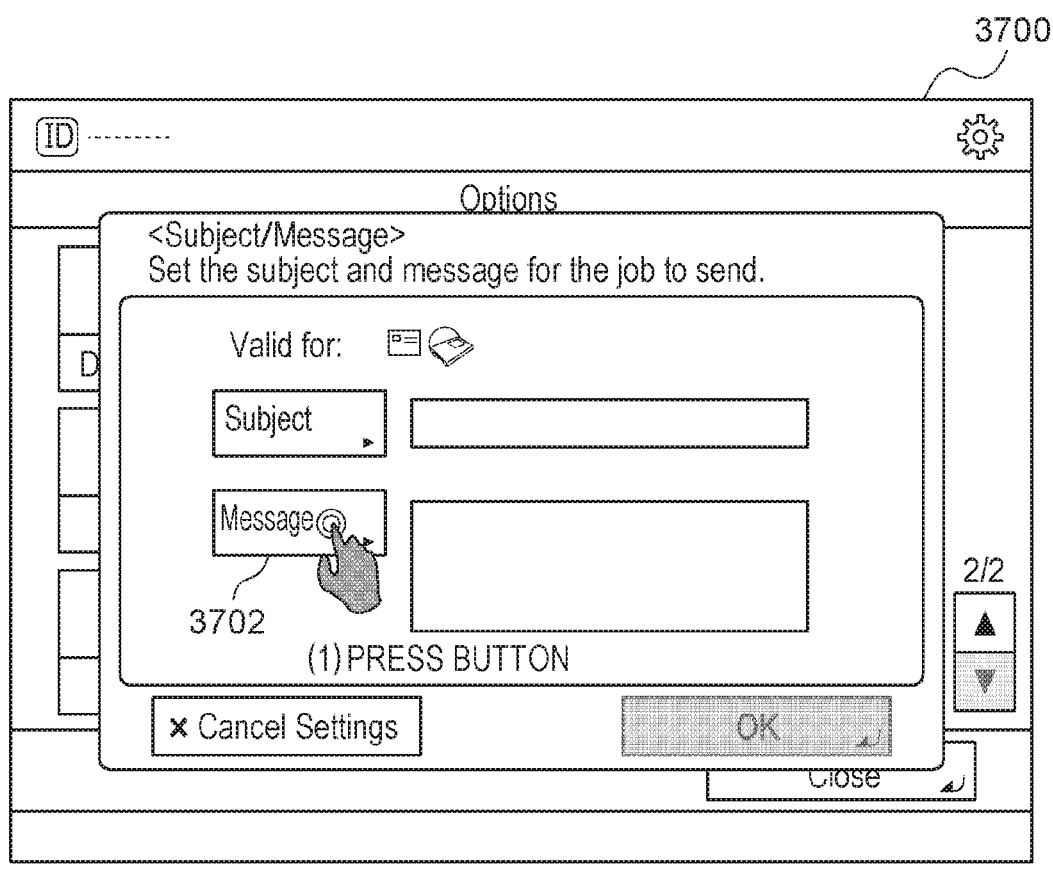
Figure 40B:
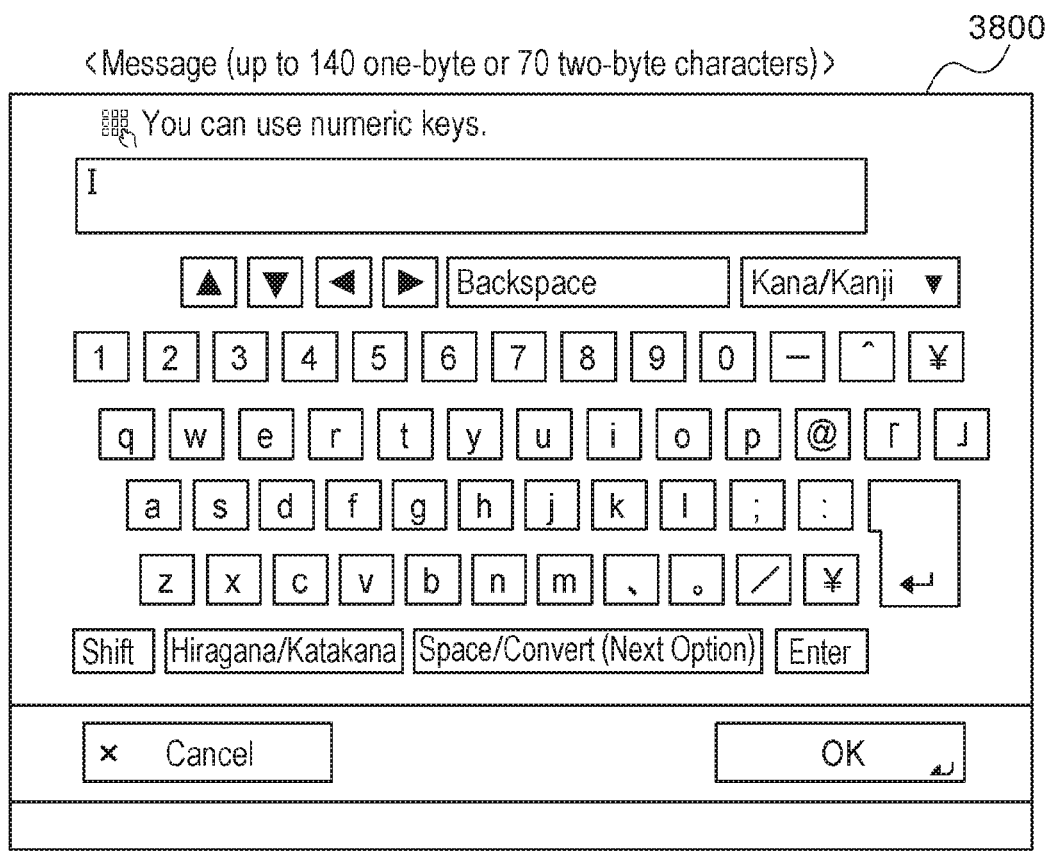
Figure 40D:
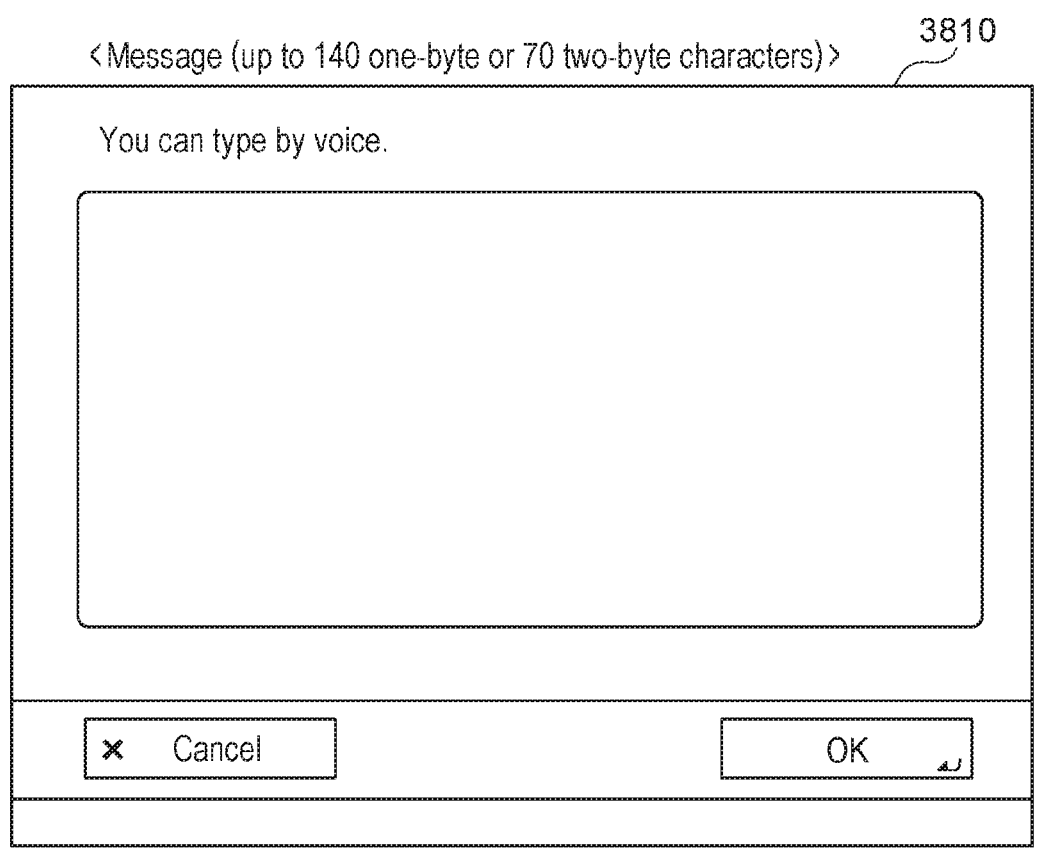

As described above, in the present embodiment, when the user 106 enters any character string by speech during a speech-based interactive session, a screen is displayed, which excludes keys unnecessary for speech operation and provides a large region for displaying a character string entered (see FIGS. 40C and 40D). This improves operability in making image forming instructions in speech operation. When the user 106 enters any character string by traditional touch operation, a screen having a software keyboard is displayed (see FIGS. 40A and 40B). By thus displaying a different screen depending on the type of input operation of the user 106, operability in making image forming instructions is improved.

Other Embodiments

The present disclosure may be applied either to a system including a plurality of devices, or to an apparatus including a single device. In the embodiments described above, the audio control program 601, the device control program 801, and the audio-data conversion control program 701 are executed by the audio control apparatus 100, the image forming apparatus 101, and the server 102, respectively. Alternatively, all the control programs described above may be executed by the image forming apparatus 101 that includes a microphone. The audio control program 601 and the device control program 801 may be executed by the image forming apparatus 101, with the server 102 alone separated.

The present disclosure is not limited to the embodiments described above. Various modifications (including organic combinations of the embodiments) may be made to the present disclosure on the basis of the spirit of the present disclosure, and such modifications should not be excluded from the scope of the present disclosure. That is, all combinations of the aforementioned embodiments and their modifications are included in the present disclosure.

In the embodiments described above, some of the operation screens provided by the image forming apparatus 101 have been presented, and operations performed on the screens have been explained. However, screen operations based on natural language are not limited to those described above, and may include operations on any screens displayed by the image forming apparatus 101. The user 106 may instruct, for example, to change the setting, switch the screen, and execute the processing by speech operation.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-131058 filed Jul. 16, 2019, which is hereby incorporated by reference herein in its entirety.

What is claimed is:

1. An image processing system comprising:
a microphone configured to acquire sound;
a display device configured to display information; and
at least one controller configured to:
cause the display device to display a screen on which a print instruction is receivable and names of a plurality of print setting items are arranged; and
acquire text data including a combination of a name of one setting item of the plurality of print setting items and a word corresponding to a parameter of the one setting item based on speech acquired through the microphone during display of the screen, and change the set value of the one setting item on the basis of the text data,
wherein even when the text data including the combination of the name of the one setting item of the plurality of print setting items and the word corresponding to the parameter of the one setting item is acquired on the basis of speech acquired through the microphone during display of another screen on which the one setting item is not arranged, the set value of the one setting item is not changed.

2. The image processing system according to claim 1, wherein the screen includes name information of the one setting item.

3. The image processing system according to claim 1, wherein the text data is date generated using a learning model learned on the basis of teacher data containing pairs of text information and audio information.

4. The image processing system according to claim 1, further comprising an apparatus including the microphone, the display device, and an acquiring unit configured to acquire the text data.

5. The image processing system according to claim 1, further comprising:
an apparatus including the microphone and the display device; and
another apparatus including an acquiring unit configured to acquire the text data.

6. The image processing system according to claim 1, further comprising:
an apparatus including the microphone; and
another apparatus including the display device and an acquiring unit configured to acquire the text data.

7. The image processing system according to claim 1, wherein the screen includes information showing a set value not yet changed.

8. The image processing system according to claim 1, wherein the at least one controller is further configured to cause the display device to display a changed screen in response to accepting an instruction to change the set value of the one setting item, the changed screen including information showing a changed set value of the one setting item.

9. The image processing system according to claim 1, wherein the screen includes a selection object for transition to a further screen, and the further screen is a screen on which a plurality of candidates for a parameter settable for the one setting item.

10. The image processing system according to claim 1, wherein the at least one controller is further configured to acquire text data including a name of the one setting item of the plurality of print setting items and not including the word corresponding to the parameter of the one setting item based on speech acquired through the microphone during display of the screen, and cause transition to the further screen, and the further screen is a screen on which a plurality of candidates for a parameter settable for the one setting item.

11. The image processing system according to claim 1, wherein the one setting item is a setting item of Select Pages.

12. The image processing system according to claim 1, wherein the one setting item is a setting item of N in 1.

13. The image processing system according to claim 1, wherein the one setting item is a setting item of stapling.

14. The image processing system according to claim 1, wherein the one setting item is a setting item of booklet.

15. An image processing apparatus comprising:
a microphone configured to acquire sound;
a display device configured to display information;
at least one controller configured to:
cause the display device to display a screen on which a print instruction is receivable and names of a plurality of print setting items are arranged; and
acquire text data including a combination of a name of one setting item of the plurality of print setting items and a word corresponding to a parameter of the one setting item based on speech acquired through the microphone during display of the screen, and change the set value of the one setting item on the basis of the text data,
wherein even when the text data including the combination of the name of the one setting item of the plurality of print setting items and the word corresponding to the parameter of the one setting item is acquired on the basis of speech acquired through the microphone during display of another screen on which the one setting item is not arranged, the set value of the one setting item is not changed.

* * * * *